(12) United States Patent
Bleecher et al.

(10) Patent No.: US 9,279,073 B2
(45) Date of Patent: Mar. 8, 2016

(54) METHODS OF MAKING HIGHLY DURABLE SUPERHYDROPHOBIC, OLEOPHOBIC AND ANTI-ICING COATINGS

(71) Applicant: Ross Technology Corporation, Leola, PA (US)

(72) Inventors: Douglas Bleecher, Lititz, PA (US); Philip Harsh, Gilbertsville, PA (US); Michael Hurley, Lancaster, PA (US); Andrew K. Jones, Lancaster, PA (US); Russell Ross, Leola, PA (US); Vinod K. Sikka, Oak Ridge, TN (US); Donald Zielke, Hellam, PA (US)

(73) Assignee: Ross Technology Corporation, Leola, PA (US)

( * ) Notice: Subject to any disclaimer, the term of this patent is extended or adjusted under 35 U.S.C. 154(b) by 0 days.

(21) Appl. No.: 14/320,358

(22) Filed: Jun. 30, 2014

(65) Prior Publication Data

US 2015/0030779 A1    Jan. 29, 2015

Related U.S. Application Data

(60) Division of application No. 13/082,327, filed on Apr. 7, 2011, now Pat. No. 9,067,821, which is a continuation of application No. PCT/US2009/005512, filed on Oct. 7, 2009.

(60) Provisional application No. 61/159,914, filed on Mar. 13, 2009, provisional application No. 61/103,295, filed on Oct. 7, 2008.

(51) Int. Cl.
*B32B 9/04* (2006.01)
*B32B 27/40* (2006.01)
*G11B 5/65* (2006.01)
*C09K 3/18* (2006.01)
*C09D 7/12* (2006.01)
*D06M 11/79* (2006.01)
*D06M 15/564* (2006.01)
*D06M 23/08* (2006.01)
*C03C 15/00* (2006.01)
*C03C 17/30* (2006.01)
*C03C 19/00* (2006.01)
*F25D 25/02* (2006.01)
*C23C 4/10* (2006.01)
*C23C 4/12* (2006.01)
*F25D 23/00* (2006.01)
*C08K 3/22* (2006.01)
*C08K 3/34* (2006.01)
*C08K 3/40* (2006.01)
*C08K 9/08* (2006.01)

(52) U.S. Cl.
CPC . *C09K 3/18* (2013.01); *C03C 15/00* (2013.01); *C03C 17/30* (2013.01); *C03C 19/00* (2013.01); *C09D 7/1225* (2013.01); *C09D 7/1266* (2013.01); *C09D 7/1275* (2013.01); *C09D 7/1283* (2013.01); *C09D 7/1291* (2013.01); *C23C 4/10* (2013.01); *C23C 4/12* (2013.01); *C23C 4/125* (2013.01); *C23C 4/127* (2013.01); *D06M 11/79* (2013.01); *D06M 15/564* (2013.01); *D06M 23/08* (2013.01); *F25D 23/00* (2013.01); *F25D 25/02* (2013.01); *C03C 2217/20* (2013.01); *C03C 2217/76* (2013.01); *C03C 2218/11* (2013.01); *C03C 2218/17* (2013.01); *C03C 2218/31* (2013.01); *C03C 2218/34* (2013.01); *C08K 3/22* (2013.01); *C08K 3/34* (2013.01); *C08K 3/40* (2013.01); *C08K 9/08* (2013.01); *D06M 2200/11* (2013.01); *D06M 2200/12* (2013.01); *F25D 2325/022* (2013.01); *F25D 2400/22* (2013.01); *Y10T 428/24802* (2015.01); *Y10T 428/25* (2015.01); *Y10T 442/2172* (2015.04)

(58) Field of Classification Search
None
See application file for complete search history.

(56) References Cited

U.S. PATENT DOCUMENTS

| | | |
|---|---|---|
| 870,439 A | 11/1907 | Kade |
| 2,191,701 A | 2/1940 | Wood |
| 2,976,386 A | 3/1961 | Salton Lewis |
| 3,185,426 A | 5/1965 | Bjerke |
| 3,244,541 A | 4/1966 | Fain et al. |
| 3,354,022 A | 11/1967 | Dettre et al. |
| 3,579,540 A | 5/1971 | Ohlhausen |
| 3,716,502 A | 2/1973 | Loew |
| 3,931,428 A | 1/1976 | Reick |

(Continued)

FOREIGN PATENT DOCUMENTS

| | | |
|---|---|---|
| CA | 2175848 A1 | 12/1996 |
| DE | 10 2010 022 265 A | 5/2010 |

(Continued)

OTHER PUBLICATIONS

Definition of "primarily" retrieved from http://www.oed.com on Apr. 23, 2015, 1 page.*

(Continued)

*Primary Examiner* — William Phillip Fletcher, III
(74) *Attorney, Agent, or Firm* — Perkins Coie LLP

(57) ABSTRACT

Disclosed are methods of preparing durable hydrophobic, oleophobic, and anti-icing coatings on a substrate comprising the application of a binder containing particles to the substrate and the application of hydrophobic and oleophobic particles to the binder. In the resulting coating, the particles applied with the binder are primarily distributed within and coated by the binder and the hydrophobic/oleophobic particles are distributed on or at the exposed surface where they can interact with liquids.

18 Claims, 17 Drawing Sheets

(56) References Cited

U.S. PATENT DOCUMENTS

| | | |
|---|---|---|
| 3,950,588 A | 4/1976 | McDougal |
| 3,963,349 A | 6/1976 | Albright et al. |
| 3,967,030 A | 6/1976 | Johnson et al. |
| 3,975,197 A | 8/1976 | Mikelsons |
| 3,976,572 A | 8/1976 | Reick |
| 3,980,153 A | 9/1976 | Andrews |
| 4,142,724 A | 3/1979 | Reick |
| 4,151,327 A | 4/1979 | Lawton |
| 4,199,142 A | 4/1980 | Reick |
| 4,301,197 A | 11/1981 | Franz et al. |
| 4,301,213 A | 11/1981 | Davies |
| 4,311,755 A | 1/1982 | Rummel |
| 4,415,405 A | 11/1983 | Ruddle et al. |
| 4,451,619 A | 5/1984 | Heilmann et al. |
| 4,453,533 A | 6/1984 | Scheidler et al. |
| 4,474,852 A | 10/1984 | Craig |
| 4,492,217 A | 1/1985 | Scheidler |
| 4,536,454 A | 8/1985 | Haasl |
| 4,581,149 A | 4/1986 | Horodysky et al. |
| 4,591,530 A | 5/1986 | Lui |
| 4,614,464 A | 9/1986 | Christensen |
| 4,624,900 A | 11/1986 | Fau |
| 4,646,948 A | 3/1987 | Jennings |
| 4,680,173 A | 7/1987 | Burger |
| 4,687,707 A | 8/1987 | Matsuo et al. |
| 4,716,183 A | 12/1987 | Gamarra et al. |
| 4,733,843 A | 3/1988 | Bessinger |
| 4,738,426 A | 4/1988 | Bessinger |
| D295,950 S | 5/1988 | Johnston |
| 4,745,139 A | 5/1988 | Haasl et al. |
| 4,749,110 A | 6/1988 | Maeno et al. |
| 4,753,977 A | 6/1988 | Merrill |
| 4,782,112 A | 11/1988 | Kondo et al. |
| 4,835,014 A | 5/1989 | Roth et al. |
| 4,855,176 A | 8/1989 | Ohwaki et al. |
| 4,870,907 A | 10/1989 | McKee |
| 4,923,260 A | 5/1990 | Poulsen |
| 4,971,912 A | 11/1990 | Buhl et al. |
| 4,983,459 A | 1/1991 | Franz et al. |
| 5,011,727 A | 4/1991 | Kido et al. |
| 5,011,963 A | 4/1991 | Ogawa et al. |
| 5,032,641 A | 7/1991 | Nanishi et al. |
| 5,041,304 A | 8/1991 | Kusano et al. |
| 5,057,050 A | 10/1991 | Hill |
| 5,084,191 A | 1/1992 | Nagase et al. |
| 5,104,938 A | 4/1992 | Toyama et al. |
| 5,121,134 A | 6/1992 | Albinson et al. |
| 5,156,611 A | 10/1992 | Haynes et al. |
| 5,202,361 A | 4/1993 | Zimmerman et al. |
| 5,212,215 A | 5/1993 | Nanri et al. |
| 5,225,274 A | 7/1993 | Ogawa et al. |
| 5,228,764 A | 7/1993 | Cherry et al. |
| 5,228,905 A | 7/1993 | Grunewalder et al. |
| 5,238,746 A | 8/1993 | Soga et al. |
| 5,240,774 A | 8/1993 | Ogawa et al. |
| 5,274,159 A | 12/1993 | Pellerite et al. |
| 5,284,707 A | 2/1994 | Ogawa et al. |
| 5,294,252 A | 3/1994 | Gun |
| 5,300,239 A | 4/1994 | Ozaki et al. |
| 5,308,705 A | 5/1994 | Franz et al. |
| 5,312,573 A | 5/1994 | Rosenbaum et al. |
| 5,314,940 A | 5/1994 | Stone |
| 5,316,799 A | 5/1994 | Brunken et al. |
| 5,317,129 A | 5/1994 | Taplan et al. |
| 5,324,566 A | 6/1994 | Ogawa et al. |
| 5,328,768 A | 7/1994 | Goodwin |
| 5,338,345 A | 8/1994 | Scarborough et al. |
| 5,348,547 A | 9/1994 | Payne et al. |
| 5,352,733 A | 10/1994 | Hart |
| 5,362,145 A | 11/1994 | Bird et al. |
| 5,364,299 A | 11/1994 | Hill et al. |
| 5,366,810 A | 11/1994 | Merrifield et al. |
| 5,368,892 A | 11/1994 | Berquier |
| 5,372,888 A | 12/1994 | Ogawa et al. |
| 5,380,585 A | 1/1995 | Ogawa et al. |
| 5,385,966 A | 1/1995 | Hermansen et al. |
| 5,395,657 A | 3/1995 | Strepparola et al. |
| 5,424,130 A | 6/1995 | Nakanishi et al. |
| 5,429,433 A | 7/1995 | Bird et al. |
| 5,435,839 A | 7/1995 | Ogawa |
| 5,437,894 A | 8/1995 | Ogawa et al. |
| 5,437,900 A | 8/1995 | Kuzowski |
| 5,441,338 A | 8/1995 | Kane et al. |
| 5,458,976 A | 10/1995 | Horino et al. |
| 5,466,770 A | 11/1995 | Audenaert et al. |
| 5,489,328 A | 2/1996 | Ono et al. |
| 5,500,216 A | 3/1996 | Julian et al. |
| 5,540,493 A | 7/1996 | Kane et al. |
| 5,556,667 A | 9/1996 | Teranishi et al. |
| 5,558,940 A | 9/1996 | Michels et al. |
| 5,564,809 A | 10/1996 | Kane et al. |
| 5,576,096 A | 11/1996 | Ono et al. |
| 5,578,361 A | 11/1996 | Tsujioka et al. |
| 5,584,957 A | 12/1996 | Schultheis et al. |
| 5,585,896 A | 12/1996 | Yamazaki et al. |
| 5,599,893 A | 2/1997 | Asai et al. |
| 5,612,433 A | 3/1997 | Ono et al. |
| 5,618,627 A | 4/1997 | Merrifield et al. |
| 5,651,921 A | 7/1997 | Kaijou |
| 5,658,969 A | 8/1997 | Gerace |
| 5,674,967 A | 10/1997 | Goodwin |
| 5,679,460 A | 10/1997 | Schakenraad et al. |
| 5,688,864 A | 11/1997 | Goodwin |
| 5,697,991 A | 12/1997 | Frazer |
| 5,707,740 A | 1/1998 | Goodwin |
| 5,725,789 A | 3/1998 | Huber et al. |
| 5,735,589 A | 4/1998 | Herrmann et al. |
| 5,747,561 A | 5/1998 | Smirnov et al. |
| 5,753,734 A | 5/1998 | Maruyama |
| 5,798,144 A | 8/1998 | Varanasi et al. |
| 5,800,918 A | 9/1998 | Chartier et al. |
| 5,813,741 A | 9/1998 | Fish et al. |
| 5,814,411 A | 9/1998 | Merrifield et al. |
| 5,824,421 A | 10/1998 | Kobayashi et al. |
| 5,830,529 A | 11/1998 | Ross |
| 5,840,201 A | 11/1998 | Elledge |
| 5,843,338 A | 12/1998 | Inoue et al. |
| 5,853,690 A | 12/1998 | Hibino et al. |
| 5,853,800 A | 12/1998 | Dombrowski et al. |
| 5,856,378 A | 1/1999 | Ring et al. |
| 5,858,551 A | 1/1999 | Salsman |
| 5,876,806 A | 3/1999 | Ogawa |
| 5,890,907 A | 4/1999 | Minasian |
| 5,910,557 A | 6/1999 | Audenaert et al. |
| 5,921,411 A | 7/1999 | Merl |
| 5,924,359 A | 7/1999 | Watanabe |
| 5,945,482 A | 8/1999 | Fukuchi et al. |
| 5,947,574 A | 9/1999 | Avendano |
| 5,948,685 A | 9/1999 | Angros |
| 5,952,053 A | 9/1999 | Colby |
| 5,958,601 A | 9/1999 | Salsman |
| 5,980,990 A | 11/1999 | Goodwin |
| 6,013,724 A | 1/2000 | Mizutani et al. |
| 6,017,609 A | 1/2000 | Akamatsu et al. |
| 6,017,831 A | 1/2000 | Beardsley et al. |
| 6,017,997 A | 1/2000 | Snow et al. |
| 6,024,948 A | 2/2000 | Samain et al. |
| 6,025,025 A | 2/2000 | Bartrug et al. |
| 6,033,738 A | 3/2000 | Teranishi et al. |
| 6,045,650 A | 4/2000 | Mitchnick et al. |
| 6,068,911 A | 5/2000 | Shouji et al. |
| 6,090,447 A | 7/2000 | Suzuki et al. |
| 6,093,559 A | 7/2000 | Bookbinder et al. |
| 6,096,380 A | 8/2000 | Takebe et al. |
| 6,105,233 A | 8/2000 | Neal |
| 6,114,446 A | 9/2000 | Narisawa et al. |
| 6,117,555 A | 9/2000 | Fujimori et al. |
| 6,119,626 A | 9/2000 | Miyazawa et al. |
| 6,120,720 A | 9/2000 | Meier et al. |
| 6,136,210 A | 10/2000 | Biegelsen et al. |
| 6,153,304 A | 11/2000 | Smith et al. |
| 6,187,143 B1 | 2/2001 | Juppo et al. |
| 6,191,122 B1 | 2/2001 | Lux et al. |
| 6,201,058 B1 | 3/2001 | Mahr et al. |

(56) References Cited

U.S. PATENT DOCUMENTS

| | | |
|---|---|---|
| 6,207,236 B1 | 3/2001 | Araki et al. |
| 6,221,434 B1 | 4/2001 | Visca et al. |
| 6,224,974 B1 | 5/2001 | Wuu |
| 6,228,435 B1 | 5/2001 | Yoshikawa et al. |
| 6,228,972 B1 | 5/2001 | Hikita et al. |
| 6,235,383 B1 | 5/2001 | Hong et al. |
| 6,235,833 B1 | 5/2001 | Akamatsu et al. |
| 6,245,387 B1 | 6/2001 | Hayden |
| 6,264,751 B1 | 7/2001 | Kamura et al. |
| 6,280,834 B1 | 8/2001 | Veerasamy et al. |
| 6,288,149 B1 | 9/2001 | Kroll |
| 6,291,054 B1 | 9/2001 | Thomas et al. |
| 6,333,074 B1 | 12/2001 | Ogawa et al. |
| 6,333,558 B1 | 12/2001 | Hasegawa |
| 6,337,133 B1 | 1/2002 | Akamatsu et al. |
| 6,340,502 B1 | 1/2002 | Azzopardi et al. |
| 6,342,268 B1 | 1/2002 | Samain |
| 6,352,758 B1 | 3/2002 | Huang et al. |
| 6,358,569 B1 | 3/2002 | Badyal et al. |
| 6,361,868 B1 | 3/2002 | Bier et al. |
| 6,376,592 B1 | 4/2002 | Shimada et al. |
| 6,379,751 B1 | 4/2002 | Schaefer et al. |
| 6,383,642 B1 | 5/2002 | Le Bellac et al. |
| 6,403,397 B1 | 6/2002 | Katz |
| 6,419,985 B1 | 7/2002 | Ishizuka |
| 6,423,372 B1 | 7/2002 | Genzer et al. |
| 6,423,381 B1 | 7/2002 | Colton et al. |
| 6,432,181 B1 | 8/2002 | Ludwig |
| 6,451,432 B1 | 9/2002 | Azzopardi et al. |
| 6,451,876 B1 | 9/2002 | Koshy |
| 6,458,420 B1 | 10/2002 | Akamatsu et al. |
| 6,461,537 B1 | 10/2002 | Turcotte et al. |
| 6,461,670 B2 | 10/2002 | Akamatsu et al. |
| 6,462,115 B1 | 10/2002 | Takahashi et al. |
| 6,471,761 B2 | 10/2002 | Fan et al. |
| 6,476,095 B2 | 11/2002 | Simendinger, III |
| 6,479,612 B1 | 11/2002 | Del Pesco et al. |
| 6,482,524 B1 | 11/2002 | Yamamoto et al. |
| 6,488,347 B1 | 12/2002 | Bienick |
| 6,564,935 B1 | 5/2003 | Yamamoto et al. |
| 6,579,620 B2 | 6/2003 | Mizuno et al. |
| 6,582,825 B2 | 6/2003 | Amarasekera et al. |
| 6,584,744 B1 | 7/2003 | Schultheis et al. |
| 6,589,641 B1 | 7/2003 | Stirniman et al. |
| 6,596,060 B1 | 7/2003 | Michaud |
| 6,610,363 B2 | 8/2003 | Arora et al. |
| 6,613,860 B1 | 9/2003 | Dams et al. |
| 6,623,863 B2 | 9/2003 | Kamitani et al. |
| 6,641,654 B2 | 11/2003 | Akamatsu et al. |
| 6,649,222 B1 | 11/2003 | D'Agostino et al. |
| 6,652,640 B2 | 11/2003 | Asai et al. |
| 6,660,339 B1 | 12/2003 | Datta et al. |
| 6,660,363 B1 | 12/2003 | Barthlott |
| 6,660,686 B2 | 12/2003 | Inagaki et al. |
| 6,683,126 B2 | 1/2004 | Keller et al. |
| 6,685,992 B1 | 2/2004 | Ogawa et al. |
| 6,689,200 B2 | 2/2004 | Scarborough et al. |
| 6,692,565 B2 | 2/2004 | Johansen, Jr. et al. |
| 6,706,798 B2 | 3/2004 | Kobayashi et al. |
| 6,720,371 B2 | 4/2004 | Furuta et al. |
| 6,729,704 B2 | 5/2004 | Ames |
| 6,733,892 B1 | 5/2004 | Yoneda et al. |
| 6,743,467 B1 | 6/2004 | Jones et al. |
| 6,767,984 B2 | 7/2004 | Toui et al. |
| 6,770,323 B2 | 8/2004 | Genzer et al. |
| 6,780,497 B1 | 8/2004 | Walter |
| 6,786,562 B2 | 9/2004 | Obrock et al. |
| 6,793,821 B2 | 9/2004 | Lee et al. |
| 6,800,354 B2 | 10/2004 | Baumann et al. |
| 6,806,299 B2 | 10/2004 | Baumann et al. |
| 6,808,835 B2 | 10/2004 | Green et al. |
| 6,811,716 B1 | 11/2004 | Stengaard et al. |
| 6,811,844 B2 | 11/2004 | Trouilhet |
| 6,811,884 B2 | 11/2004 | Goodwin |
| 6,845,788 B2 | 1/2005 | Extrand |
| 6,852,389 B2 | 2/2005 | Nun et al. |
| 6,852,390 B2 | 2/2005 | Extrand |
| 6,855,375 B2 | 2/2005 | Nakagawa et al. |
| 6,855,759 B2 | 2/2005 | Kudo et al. |
| 6,858,284 B2 | 2/2005 | Nun et al. |
| 6,871,923 B2 | 3/2005 | Dietz et al. |
| 6,872,441 B2 | 3/2005 | Baumann et al. |
| 6,884,904 B2 | 4/2005 | Smith et al. |
| 6,890,360 B2 | 5/2005 | Cote et al. |
| 6,923,216 B2 | 8/2005 | Extrand et al. |
| 6,926,946 B2 | 8/2005 | Ogawa et al. |
| 6,931,888 B2 | 8/2005 | Shekunov et al. |
| 6,938,774 B2 | 9/2005 | Extrand |
| 6,942,746 B2 | 9/2005 | Niejelow et al. |
| 6,966,990 B2 | 11/2005 | Chattopadhyay et al. |
| 6,976,585 B2 | 12/2005 | Extrand |
| 6,976,998 B2 | 12/2005 | Rizzo et al. |
| 6,982,242 B2 | 1/2006 | Liss et al. |
| 6,992,858 B2 | 1/2006 | Kaneko |
| 6,994,033 B2 | 2/2006 | Kweon |
| 6,994,045 B2 | 2/2006 | Paszkowski |
| 6,998,051 B2 | 2/2006 | Chattopadhyay et al. |
| 7,004,184 B2 | 2/2006 | Handique et al. |
| 7,005,372 B2 | 2/2006 | Levy et al. |
| 7,019,069 B2 | 3/2006 | Kobayashi et al. |
| 7,022,416 B2 | 4/2006 | Teranishi |
| 7,026,018 B2 | 4/2006 | Kranovich |
| 7,037,591 B2 | 5/2006 | Henze et al. |
| 7,048,889 B2 | 5/2006 | Arney et al. |
| 7,052,244 B2 | 5/2006 | Fouillet et al. |
| 7,056,409 B2 | 6/2006 | Dubrow |
| 7,057,832 B2 | 6/2006 | Wu et al. |
| 7,057,881 B2 | 6/2006 | Chow et al. |
| 7,074,273 B2 | 7/2006 | Shimomura et al. |
| 7,074,294 B2 | 7/2006 | Dubrow |
| 7,083,748 B2 | 8/2006 | Chattopadhyay et al. |
| 7,083,828 B2 | 8/2006 | Muller et al. |
| 7,109,256 B2 | 9/2006 | Amano et al. |
| 7,112,369 B2 | 9/2006 | Wang et al. |
| 7,141,276 B2 | 11/2006 | Lehmann et al. |
| 7,148,181 B2 | 12/2006 | Tanaka et al. |
| 7,150,904 B2 | 12/2006 | D'Urso et al. |
| 7,153,357 B2 | 12/2006 | Baumgart et al. |
| 7,157,018 B2 | 1/2007 | Scheidler |
| 7,166,235 B2 | 1/2007 | Majeti et al. |
| 7,175,723 B2 | 2/2007 | Jones et al. |
| 7,179,758 B2 | 2/2007 | Chakrapani et al. |
| 7,179,864 B2 | 2/2007 | Wang |
| 7,188,917 B2 | 3/2007 | Bienick |
| 7,198,855 B2 | 4/2007 | Liebmann-Vinson et al. |
| 7,204,298 B2 | 4/2007 | Hodes et al. |
| 7,211,223 B2 | 5/2007 | Fouillet et al. |
| 7,211,313 B2 | 5/2007 | Nun et al. |
| 7,211,329 B2 | 5/2007 | Metz et al |
| 7,211,605 B2 | 5/2007 | Coronado et al. |
| 7,213,309 B2 | 5/2007 | Wang et al. |
| D547,640 S | 7/2007 | Remmers |
| 7,238,751 B2 | 7/2007 | Wang et al. |
| 7,253,130 B2 | 8/2007 | Chiang et al. |
| 7,258,731 B2 | 8/2007 | D'Urso et al. |
| 7,264,845 B2 | 9/2007 | Papadaki et al. |
| 7,265,468 B1 | 9/2007 | Mancl et al. |
| 7,268,179 B2 | 9/2007 | Brown |
| 7,273,658 B2 | 9/2007 | Banayoun et al. |
| 7,285,331 B1 | 10/2007 | Reihs et al. |
| 7,288,311 B2 | 10/2007 | Kawashima et al. |
| 7,288,592 B2 | 10/2007 | Stark et al. |
| 7,291,653 B2 | 11/2007 | Baumann et al. |
| 7,306,895 B2 | 12/2007 | Kano et al. |
| 7,309,278 B2 | 12/2007 | Shibata |
| 7,312,057 B2 | 12/2007 | Bookbinder et al. |
| 7,323,033 B2 | 1/2008 | Kroupenkine et al. |
| 7,338,835 B2 | 3/2008 | Bao |
| 7,342,551 B2 | 3/2008 | King |
| 7,344,619 B2 | 3/2008 | Helmeke |
| 7,344,758 B2 | 3/2008 | Franchina et al. |
| 7,344,783 B2 | 3/2008 | Shea |
| 7,354,328 B2 | 4/2008 | Lee |
| 7,354,624 B2 | 4/2008 | Millero et al. |

(56) References Cited

U.S. PATENT DOCUMENTS

| | | |
|---|---|---|
| 7,354,650 B2 | 4/2008 | Nakajima et al. |
| D568,344 S | 5/2008 | Baacke et al. |
| 7,368,510 B2 | 5/2008 | Lee et al. |
| 7,393,515 B2 | 7/2008 | Hoshino et al. |
| 7,396,395 B1 | 7/2008 | Chen et al. |
| 7,419,615 B2 | 9/2008 | Strauss |
| 7,449,233 B2 | 11/2008 | Arora |
| 7,468,333 B2 | 12/2008 | Kimbrell, Jr. et al. |
| 7,524,531 B2 | 4/2009 | Axtell, III et al. |
| 7,527,832 B2 | 5/2009 | Sakoske et al. |
| 7,544,411 B2 | 6/2009 | Baumann et al. |
| D596,931 S | 7/2009 | Fernandez |
| D596,932 S | 7/2009 | Kleinsasser |
| 7,563,505 B2 | 7/2009 | Reihs |
| 7,568,583 B2 | 8/2009 | Wing et al. |
| 7,607,744 B2 | 10/2009 | Casoli et al. |
| D607,020 S | 12/2009 | Baacke et al. |
| D612,404 S | 3/2010 | Picken et al. |
| D612,405 S | 3/2010 | Eicher |
| D613,316 S | 4/2010 | Schmidt |
| 7,726,615 B2 | 6/2010 | Rutz |
| 7,731,316 B2 | 6/2010 | Wing |
| 7,748,806 B2 | 7/2010 | Egan |
| 7,767,758 B2 | 8/2010 | Moorlag et al. |
| 7,901,731 B2 | 3/2011 | Russell et al. |
| 7,919,180 B2 | 4/2011 | Furukawa |
| 7,935,209 B2 | 5/2011 | Ward |
| 7,943,234 B2 | 5/2011 | Lawin et al. |
| 7,950,756 B2 | 5/2011 | Collins et al. |
| 7,989,619 B2 | 8/2011 | Guire et al. |
| 8,231,191 B2 | 7/2012 | Leconte et al. |
| 8,258,206 B2 | 9/2012 | Kanagasabapathy et al. |
| 8,286,561 B2 | 10/2012 | Driver et al. |
| 8,513,342 B2 | 8/2013 | Gao et al. |
| 8,596,205 B2 | 12/2013 | Driver et al. |
| 8,779,025 B1 | 7/2014 | Stone |
| 8,899,704 B2 | 12/2014 | Bienick |
| 9,067,821 B2 | 6/2015 | Bleecher et al. |
| 9,096,786 B2 | 8/2015 | Sikka et al. |
| 2001/0018130 A1 | 8/2001 | Hayden |
| 2001/0019773 A1 | 9/2001 | Akamatsu et al. |
| 2001/0024728 A1 | 9/2001 | Kamitani et al. |
| 2001/0030808 A1 | 10/2001 | Komatsu et al. |
| 2001/0055677 A1 | 12/2001 | Wuu |
| 2002/0001676 A1 | 1/2002 | Hayden |
| 2002/0034627 A1 | 3/2002 | Jacquiod et al. |
| 2002/0045007 A1 | 4/2002 | Arora et al. |
| 2002/0077412 A1 | 6/2002 | Kobayashi et al. |
| 2002/0111402 A1 | 8/2002 | Mizuno et al. |
| 2002/0115736 A1 | 8/2002 | Koshy |
| 2002/0177655 A1 | 11/2002 | Pratt et al. |
| 2002/0192472 A1 | 12/2002 | Metz et al. |
| 2002/0197490 A1 | 12/2002 | Amidaiji et al. |
| 2003/0009049 A1 | 1/2003 | Smith et al. |
| 2003/0021902 A1 | 1/2003 | Yamamoto et al. |
| 2003/0026972 A1 | 2/2003 | Reihs |
| 2003/0040243 A1 | 2/2003 | Ward |
| 2003/0040568 A1 | 2/2003 | Furuta et al. |
| 2003/0070677 A1 | 4/2003 | Handique et al. |
| 2003/0072723 A1 | 4/2003 | Gers-Barlag et al. |
| 2003/0073067 A1 | 4/2003 | Bookfinder et al. |
| 2003/0077533 A1 | 4/2003 | Murota et al. |
| 2003/0091809 A1 | 5/2003 | Scarborough et al. |
| 2003/0110976 A1 | 6/2003 | Abidh et al. |
| 2003/0117051 A1 | 6/2003 | Kweon |
| 2003/0119684 A1 | 6/2003 | Tsao |
| 2003/0125656 A1 | 7/2003 | Davankov et al. |
| 2003/0143339 A1 | 7/2003 | Kobayashi |
| 2003/0149218 A1 | 8/2003 | Cote' et al. |
| 2003/0166840 A1 | 9/2003 | Urry et al. |
| 2003/0170401 A1 | 9/2003 | Shimomura et al. |
| 2003/0176572 A1 | 9/2003 | Maekawa et al. |
| 2003/0179494 A1 | 9/2003 | Kaneko |
| 2003/0203771 A1 | 10/2003 | Rosenberg et al. |
| 2004/0005469 A1 | 1/2004 | Metz et al. |
| 2004/0020104 A1 | 2/2004 | Feldhege et al. |
| 2004/0025747 A1 | 2/2004 | Kamitani et al. |
| 2004/0050297 A1 | 3/2004 | Kobayashi et al. |
| 2004/0053058 A1 | 3/2004 | Kamitani et al. |
| 2004/0056575 A1 | 3/2004 | Dietz et al. |
| 2004/0097616 A1 | 5/2004 | Hoppler et al. |
| 2004/0102124 A1 | 5/2004 | Suzuki |
| 2004/0121168 A1 | 6/2004 | Goodwin et al. |
| 2004/0137814 A1 | 7/2004 | Kimbrell, Jr. et al. |
| 2004/0138083 A1 | 7/2004 | Kimbrell, Jr. et al. |
| 2004/0142557 A1 | 7/2004 | Levy et al. |
| 2004/0154106 A1 | 8/2004 | Oles et al. |
| 2004/0201048 A1 | 10/2004 | Seki et al. |
| 2004/0202872 A1 | 10/2004 | Fang et al. |
| 2004/0209203 A1 | 10/2004 | Kano et al. |
| 2004/0213904 A1 | 10/2004 | Muller et al. |
| 2004/0216227 A1 | 11/2004 | Papadaki et al. |
| 2005/0000463 A1 | 1/2005 | Mochizuki |
| 2005/0004264 A1 | 1/2005 | Tanabe |
| 2005/0008859 A1 | 1/2005 | Forgacs |
| 2005/0009953 A1 | 1/2005 | Shea |
| 2005/0020763 A1 | 1/2005 | Milic |
| 2005/0022313 A1 | 2/2005 | Scheidler |
| 2005/0053793 A1 | 3/2005 | Benay-Oun et al. |
| 2005/0075020 A1 | 4/2005 | Benayoun et al. |
| 2005/0106762 A1 | 5/2005 | Chakrapani et al. |
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |
| 2006/0029808 A1 | 2/2006 | Zhai et al. |
| 2006/0040164 A1 | 2/2006 | Vyas et al. |
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0058458 A1 | 3/2006 | Hasskerl et al. |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0151739 A1 | 7/2006 | Sandner et al. |
| 2006/0154048 A1 | 7/2006 | Teranishi et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0207032 A1 | 9/2006 | Reiners et al. |
| 2006/0213849 A1 | 9/2006 | Bienick |
| 2006/0222865 A1 | 10/2006 | Hoshino et al. |
| 2006/0240218 A1 | 10/2006 | Parce |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0036906 A1 | 2/2007 | Reeve |
| 2007/0046160 A1 | 3/2007 | Egan |
| 2007/0065668 A1 | 3/2007 | Idei |
| 2007/0075199 A1 | 4/2007 | Stewart et al. |
| 2007/0141114 A1 | 6/2007 | Muisener et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear, III et al. |
| 2007/0172658 A1 | 7/2007 | Deruelle et al. |
| 2007/0172661 A1 | 7/2007 | Fechner et al. |

(56) References Cited

U.S. PATENT DOCUMENTS

| | | |
|---|---|---|
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0275245 A1 | 11/2007 | Persson et al. |
| 2007/0298216 A1 | 12/2007 | Jing et al. |
| 2008/0008838 A1 | 1/2008 | Arpac et al. |
| 2008/0012459 A1 | 1/2008 | Picken et al. |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0081858 A1 | 4/2008 | Okazaki |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0160257 A1* | 7/2008 | Takada et al. ............ 428/145 |
| 2008/0166549 A1 | 7/2008 | Shieh et al. |
| 2008/0171805 A1 | 7/2008 | Mingarelli |
| 2008/0172937 A1 | 7/2008 | Palmer et al. |
| 2008/0176991 A1 | 7/2008 | Osawa et al. |
| 2008/0199657 A1 | 8/2008 | Capron et al. |
| 2008/0199659 A1 | 8/2008 | Zhao |
| 2008/0205950 A1 | 8/2008 | Moorlag et al. |
| 2008/0206550 A1 | 8/2008 | Borlner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |
| 2008/0226694 A1 | 9/2008 | Gelbert et al. |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1 | 10/2008 | Baumgart et al. |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280699 A1 | 11/2008 | Jarvholm |
| 2008/0286556 A1 | 11/2008 | D'urso et al. |
| 2008/0295347 A1 | 12/2008 | Braham |
| 2008/0296252 A1 | 12/2008 | D'Urso et al. |
| 2008/0306202 A1 | 12/2008 | Lin et al. |
| 2008/0310660 A1 | 12/2008 | Lin |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084574 A1 | 4/2009 | Balfour et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0115302 A1 | 5/2009 | Benz et al. |
| 2009/0123728 A1 | 5/2009 | Cheung et al. |
| 2009/0134758 A1 | 5/2009 | Vardon |
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0195136 A1 | 8/2009 | Wing et al. |
| 2009/0212505 A1 | 8/2009 | McMillin et al. |
| 2009/0240004 A1 | 9/2009 | Maier et al. |
| 2009/0298369 A1* | 12/2009 | Koene et al. ............ 442/79 |
| 2009/0324910 A1 | 12/2009 | Gemici et al. |
| 2010/0001625 A1 | 1/2010 | Eckartsberg et al. |
| 2010/0003493 A1 | 1/2010 | Cheng et al. |
| 2010/0004373 A1 | 1/2010 | Zhu et al. |
| 2010/0026156 A1 | 2/2010 | Leconte et al. |
| 2010/0052491 A1 | 3/2010 | Vardon |
| 2010/0102693 A1 | 4/2010 | Driver et al. |
| 2010/0109498 A1 | 5/2010 | Ramm et al. |
| 2010/0117502 A1 | 5/2010 | Kang et al. |
| 2010/0133970 A1 | 6/2010 | Shin et al. |
| 2010/0176703 A1 | 7/2010 | Kim |
| 2010/0181884 A1 | 7/2010 | De La Garza et al. |
| 2010/0196702 A9 | 8/2010 | Furukawa |
| 2010/0213334 A1 | 8/2010 | Davenport |
| 2010/0272913 A1 | 10/2010 | Russell et al. |
| 2010/0314575 A1 | 12/2010 | Gao et al. |
| 2010/0330347 A1 | 12/2010 | Badyal et al. |
| 2011/0111656 A1 | 5/2011 | Gao et al. |
| 2011/0217544 A1 | 9/2011 | Young et al. |
| 2012/0009396 A1 | 1/2012 | Sikka et al. |
| 2012/0040577 A1 | 2/2012 | Kissel et al. |
| 2012/0045954 A1 | 2/2012 | Bleecher et al. |
| 2013/0216820 A1 | 8/2013 | Riddle et al. |
| 2014/0087134 A1 | 3/2014 | Gesford et al. |
| 2014/0205804 A1 | 7/2014 | Jones et al. |
| 2014/0296409 A1 | 10/2014 | Sikka et al. |
| 2015/0005424 A1 | 1/2015 | Jones et al. |
| 2015/0030779 A1 | 1/2015 | Bleecher et al. |

FOREIGN PATENT DOCUMENTS

| | | |
|---|---|---|
| EP | 0 166 363 A2 | 1/1986 |
| EP | 0 207 282 A2 | 7/1987 |
| EP | 0 307 915 A2 | 3/1989 |
| EP | 0 317 057 A2 | 5/1989 |
| EP | 0 332 141 A2 | 9/1989 |
| EP | 0 399 568 A2 | 11/1990 |
| EP | 0 446 391 A1 | 9/1991 |
| EP | 0 452 723 A1 | 10/1991 |
| EP | 0 472 215 A2 | 2/1992 |
| EP | 0 476 510 A1 | 3/1992 |
| EP | 0 493 270 A2 | 7/1992 |
| EP | 0 545 201 A2 | 6/1993 |
| EP | 0 623 656 A2 | 11/1994 |
| EP | 0 649 887 A2 | 4/1995 |
| EP | 0 657 393 A1 | 6/1995 |
| EP | 0 714 870 A1 | 6/1996 |
| EP | 0 714 921 A1 | 6/1996 |
| EP | 0 719 743 A1 | 7/1996 |
| EP | 0 719 821 A1 | 7/1996 |
| EP | 0 739 714 A2 | 10/1996 |
| EP | 0 745 567 A1 | 12/1996 |
| EP | 0 745 568 A1 | 12/1996 |

(56) References Cited

FOREIGN PATENT DOCUMENTS

| | | |
|---|---|---|
| EP | 0 752 459 A2 | 1/1997 |
| EP | 0 770 706 A1 | 5/1997 |
| EP | 0 799 791 A1 | 10/1997 |
| EP | 0 811 430 A1 | 12/1997 |
| EP | 0 863 191 A2 | 9/1998 |
| EP | 0 903 389 A1 | 3/1999 |
| EP | 0 904 343 A1 | 3/1999 |
| EP | 0 914 873 A1 | 5/1999 |
| EP | 0 915 103 A1 | 5/1999 |
| EP | 0 930 351 A1 | 7/1999 |
| EP | 1 047 735 A2 | 11/2000 |
| EP | 1 048 696 A2 | 11/2000 |
| EP | 1 097 979 A1 | 5/2001 |
| EP | 1 108 735 A1 | 6/2001 |
| EP | 1 113 064 A1 | 7/2001 |
| EP | 1 136 539 A1 | 9/2001 |
| EP | 1 180 533 A1 | 2/2002 |
| EP | 1 187 872 A1 | 3/2002 |
| EP | 1 193 289 A1 | 4/2002 |
| EP | 1 215 252 A2 | 6/2002 |
| EP | 1 261 559 A1 | 12/2002 |
| EP | 1 360 253 A2 | 11/2003 |
| EP | 1 362 904 A1 | 11/2003 |
| EP | 1 387 011 A1 | 2/2004 |
| EP | 1 387 169 A1 | 2/2004 |
| EP | 1 392 619 A1 | 3/2004 |
| EP | 1 392 772 A1 | 3/2004 |
| EP | 1 401 903 A2 | 3/2004 |
| EP | 1 407 792 A1 | 4/2004 |
| EP | 1 429 919 A1 | 6/2004 |
| EP | 1 433 821 A1 | 6/2004 |
| EP | 0 969 718 B1 | 9/2004 |
| EP | 1 473 355 A1 | 11/2004 |
| EP | 1 475 234 A1 | 11/2004 |
| EP | 1 479 738 A1 | 11/2004 |
| EP | 1 492 837 A1 | 1/2005 |
| EP | 1 503 813 A1 | 2/2005 |
| EP | 1 524 290 A1 | 4/2005 |
| EP | 1 583 615 A1 | 10/2005 |
| EP | 1 902 091 A2 | 1/2007 |
| EP | 1 752 284 A1 | 2/2007 |
| EP | 1 857 497 A2 | 11/2007 |
| EP | 1 873 218 A1 | 1/2008 |
| EP | 1 875 279 A1 | 1/2008 |
| EP | 1 883 669 A1 | 2/2008 |
| EP | 1 902 091 | 3/2008 |
| EP | 1 908 804 A1 | 4/2008 |
| EP | 1 988 129 A2 | 11/2008 |
| EP | 1 997 619 A1 | 12/2008 |
| EP | 2 346 678 | 7/2011 |
| EP | 2 678 400 | 8/2012 |
| EP | 2 791 255 | 6/2013 |
| GB | 1 341 605 A | 12/1973 |
| GB | 2 484 751 A | 4/2012 |
| JP | 62-246960 A | 10/1987 |
| JP | H05-186738 A | 7/1993 |
| JP | H07-090691 A | 4/1995 |
| JP | H10-309768 A | 11/1998 |
| JP | 2004162133 A | 6/2004 |
| JP | 2004308984 A | 11/2004 |
| JP | 2005082616 A | 3/2005 |
| JP | 2006131938 A | 5/2006 |
| JP | 2007144917 A | 6/2007 |
| JP | 2007182491 A | 7/2007 |
| JP | 2008228958 A | 10/2008 |
| JP | 2009071672 A | 4/2009 |
| KR | 10-2003-052853 | 6/2003 |
| KR | 10-2009-90240 | 10/2010 |
| KR | 1020090089157 * | 10/2010 |
| MX | 175646 | 8/1994 |
| MX | 183533 | 12/1996 |
| MX | 192053 | 5/1999 |
| MX | 195031 | 1/2000 |
| MX | 199899 | 11/2000 |
| MX | 201072 | 3/2001 |
| MX | 203880 | 8/2001 |
| MX | 205074 | 11/2001 |
| MX | PA01011653 A | 12/2002 |
| MX | 215752 | 8/2003 |
| MX | PA02006399 A | 9/2003 |
| MX | PA04010165 A | 2/2005 |
| MX | PA05006898 A | 8/2005 |
| MX | PA02012841 A | 1/2006 |
| MX | 234477 | 2/2006 |
| MX | PA06003323 A | 3/2006 |
| WO | WO 91-04305 A1 | 4/1991 |
| WO | WO 93-16131 A1 | 8/1993 |
| WO | WO 94-13734 A1 | 6/1994 |
| WO | WO 96-04123 A1 | 2/1996 |
| WO | WO 96-07621 A1 | 3/1996 |
| WO | WO 97-07993 A1 | 3/1997 |
| WO | WO 98-20960 A1 | 5/1998 |
| WO | WO 99-23137 A1 | 5/1999 |
| WO | WO 99-23437 A1 | 5/1999 |
| WO | WO 99-40431 A1 | 8/1999 |
| WO | WO 99-47578 A1 | 9/1999 |
| WO | WO 99-48339 A1 | 9/1999 |
| WO | WO 99-57185 A1 | 11/1999 |
| WO | WO 99-64363 A1 | 12/1999 |
| WO | WO 00-05321 A1 | 2/2000 |
| WO | WO 00-14297 A1 | 3/2000 |
| WO | WO 00-25938 A1 | 5/2000 |
| WO | WO 00-34361 A1 | 6/2000 |
| WO | WO 00-39240 A1 | 7/2000 |
| WO | WO 00-46464 A1 | 8/2000 |
| WO | WO 00-66241 A1 | 11/2000 |
| WO | WO 01-19745 A1 | 3/2001 |
| WO | WO 01-62682 A1 | 8/2001 |
| WO | WO 01-74739 A1 | 10/2001 |
| WO | WO 01-79142 A1 | 10/2001 |
| WO | WO 01-79371 A2 | 10/2001 |
| WO | WO 01-98399 A1 | 12/2001 |
| WO | WO 02-14417 A1 | 2/2002 |
| WO | WO 02-28951 A1 | 4/2002 |
| WO | WO 02-062910 A2 | 8/2002 |
| WO | WO 02-074869 A1 | 9/2002 |
| WO | WO 02-098983 A1 | 12/2002 |
| WO | WO 03-010255 A2 | 2/2003 |
| WO | WO 03-012004 A1 | 2/2003 |
| WO | WO 03-030879 A1 | 4/2003 |
| WO | WO 03-037702 A1 | 5/2003 |
| WO | WO 03-045693 A1 | 6/2003 |
| WO | WO 03-063646 A2 | 8/2003 |
| WO | WO 03-080258 A2 | 10/2003 |
| WO | WO 03-082998 A1 | 10/2003 |
| WO | WO 03-093568 A1 | 11/2003 |
| WO | WO 2004-012625 A2 | 2/2004 |
| WO | WO 2004-043319 A2 | 5/2004 |
| WO | WO 2004-058418 A1 | 7/2004 |
| WO | WO 2004-104116 A1 | 12/2004 |
| WO | WO 2004-110132 A2 | 12/2004 |
| WO | WO 2005-021843 A1 | 3/2005 |
| WO | WO 2005-023935 A1 | 3/2005 |
| WO | WO 2005-028562 A1 | 3/2005 |
| WO | WO 2005-068399 A1 | 7/2005 |
| WO | WO 2005-077429 A1 | 8/2005 |
| WO | WO 2006/044641 A2 | 4/2006 |
| WO | WO 2006-044642 A2 | 4/2006 |
| WO | WO 2006-081891 A1 | 8/2006 |
| WO | WO 2006-083600 A1 | 8/2006 |
| WO | WO 2006-101934 A1 | 9/2006 |
| WO | WO 2006-135755 A2 | 12/2006 |
| WO | WO 2007-011731 A2 | 1/2007 |
| WO | WO 2007-027276 A1 | 3/2007 |
| WO | WO 2007-052260 A2 | 5/2007 |
| WO | WO 2007-053266 A1 | 5/2007 |
| WO | WO 2007-056057 A1 | 5/2007 |
| WO | WO 2007-070801 A2 | 6/2007 |
| WO | WO 2007-075407 A1 | 7/2007 |
| WO | WO 2007-092746 A2 | 8/2007 |
| WO | WO 2007-102960 A2 | 9/2007 |
| WO | WO 2007-104494 A1 | 9/2007 |
| WO | WO 2007-126432 A1 | 11/2007 |
| WO | WO 2007-126743 A1 | 11/2007 |

(56) References Cited

FOREIGN PATENT DOCUMENTS

| | | |
|---|---|---|
| WO | WO 2007-130294 A2 | 11/2007 |
| WO | WO 2007-149617 A1 | 12/2007 |
| WO | WO 2008-004827 A1 | 1/2008 |
| WO | WO 2008-004828 A1 | 1/2008 |
| WO | WO 2008-006078 A2 | 1/2008 |
| WO | WO 2008-021791 A2 | 2/2008 |
| WO | WO 2008-035347 A2 | 3/2008 |
| WO | WO 2008-035917 A1 | 3/2008 |
| WO | WO 2008-050895 A1 | 5/2008 |
| WO | WO 2008-051221 A2 | 5/2008 |
| WO | WO 2008-066828 A2 | 6/2008 |
| WO | WO 2008-078346 A1 | 7/2008 |
| WO | WO 2008-106494 A1 | 9/2008 |
| WO | WO 2008-112158 A1 | 9/2008 |
| WO | WO 2008-123650 A1 | 10/2008 |
| WO | WO 2008-123955 A1 | 10/2008 |
| WO | WO 2008-123961 A1 | 10/2008 |
| WO | WO 2008-134243 A1 | 11/2008 |
| WO | WO 2008-137973 A1 | 11/2008 |
| WO | WO 2008-151991 A1 | 12/2008 |
| WO | WO 2008-153687 A2 | 12/2008 |
| WO | WO 2009-003847 A1 | 1/2009 |
| WO | WO 2009-005465 A1 | 1/2009 |
| WO | WO 2009-012116 A2 | 1/2009 |
| WO | WO 2009-018327 A2 | 2/2009 |
| WO | WO 2009-032988 A1 | 3/2009 |
| WO | WO 2009-037717 A2 | 3/2009 |
| WO | WO 2009-041752 A1 | 4/2009 |
| WO | WO 2009-061199 A1 | 5/2009 |
| WO | WO 2009-148611 A1 | 12/2009 |
| WO | WO 2009-158567 A1 | 12/2009 |
| WO | WO 2010/033288 A2 | 3/2010 |
| WO | WO 2010-042191 A1 | 4/2010 |
| WO | WO 2010-042668 A1 | 4/2010 |
| WO | WO 2011-151151 A1 | 12/2011 |
| WO | WO 2012-115986 A1 | 8/2012 |
| WO | WO 2013-090939 A1 | 6/2013 |
| WO | WO 2014-003852 A9 | 1/2014 |

OTHER PUBLICATIONS

U.S. Appl. No. 60/699,200, filed Jul. 14, 2005, Guire et al. (Innovative Surface Technologies, Inc.).

U.S. Appl. No. 60/807,143, filed Jul. 12, 2006, Guire et al. (Innovative Surface Technologies, Inc.).

U.S. Appl. No. 60/891,876, filed Feb. 27, 2007, Lawin et al. (Innovative Surface Technology, Inc.).

U.S. Appl. No. 61/058,902, filed Jun. 4, 2008, Driver et al.

U.S. Appl. No. 61/090,002, filed Aug. 19, 2008, Driver et al.

U.S. Appl. No. 61/133,273, filed Jun. 27, 2008, Driver et al.

U.S. Appl. No. 61/198,414, filed Jun. 16, 2009, Gao.

U.S. Appl. No. 61/216,540, filed May 18, 2008, Driver et al.

U.S. Appl. No. 61/252,229, filed Oct. 16, 2009, Gao.

"Composition," in *Collins English Dictionary*, found at http://www.credoreference.com/entry/hcengdict/composition, 2000 (viewed Aug. 26, 2013).

"NeverWet—product characteristics," found at http://www.neverwet.com/product-characteristics.php, NeverWet LLC (viewed Mar. 7, 2013).

"Yield strength, elastic limit, and ultimate strength," found at http://inventor.grantadesign.com/en/notes/science/material/S04%20strength.htm, Granta Design Ltd. (viewed Feb. 10, 2015).

2009 R&D 100 Award Entry Form (p. 5 excerpt from another document) showing Fig. 1 Schematic of NICE ("no ice nanocoating") (2009).

Bae et al., "Superhydrophobicity of cotton fabrics treated with silica nanoparticles and water-repellent agent," *J Colloid Interface Sci*, abstract only (May 3, 2009; epublication ahead of print).

Bayer Materials Science product information on Bayhydrol® 110 polyurethane dispersion (two first pages of this brochure) (Aug. 2002).

Bayer Materials Science product information on Bayhydrol® 122 polyurethane dispersion (Jan. 2004).

Bayer Materials Science product information on Bayhydrol® 124 polyurethane dispersion (Jan. 2004).

Bayer Materials Science product information on Bayhydrol® 140AQ, polyurethane dispersion (Aug. 2002).

Bayer Materials Science product information on Bayhydrol® A145, aqueous hydroxyl-functional polyurethane dispersion (Jan. 2010).

Beyler et al, "Thermal Decomposition of Polymers," Chapter 7 of *The SFPE Handbook of Fire Protection Engineering* ($3^{rd}$ ed.), pp. 1-110-1-131 (2002).

Bliznakov et al., "Double-scale roughness and superhydrophobicity on metalized Toray carbon fiber paper," *Langmuir*, 25(8):4760-4766, abstract only (Apr. 21, 2009).

Boinovich et al., "Principles of design of superhydrophobic coatings by deposition from dispersions," *Langmuir*, 25(5):2907-2912, abstract only (Mar. 3, 2009).

Boinovich et al., "Principles of Design of Superhydrophobic Coatings by Deposition from Dispersions," *Langmuir*, abstract only (Feb. 10, 2009; epublication ahead of print).

Bravo et al., "Transparent superhydrophobic films based on silica nanoparticles," *Langmuir*, 23(13):7293-7298, abstract only (Jun. 19, 2007; epublished May 25, 2007).

Choi et al., "Large slip of aqueous liquid flow over a nanoengineered superhydrophobic surface," *Phys Rev Lett*, 96(6):066001, abstract only (Feb. 17, 2006; epublished Feb. 16, 2006).

Clark, M.D.T. et al. "Paints and Pigments" available at nzic.org.nz/ChemProcesses/polymers/10D.pdf (copyright 2005-2008 at http://nzic.org.nz/ChemProcesses/polymers/).

de Givenchy et al., "Fabrication of Superhydrophobic PDMS Surfaces by Combining Acidic Treatment and Perfluorinated Monolayers," *Langmuir*, 25(11):6448-6453, abstract only (Jun. 2, 2009).

Du, "Surfactants, Dispersants, and Defoamers for the Coatings, Inks, and Adhesives Industries," in *Coatings Technology Handbook, Third Edition*, Tracton (ed.), CRC Press (2005).

EPO Communication dated Dec. 5, 2011, regarding third-party observations filed in European Application No. 09771098.2.

Expancel DE product list, "Product Specification for Expancel® Microspheres," Issue Oct. 2010, AkzoNobel (Oct. 2010).

Extended European search report for European Application No. 920119918, dated Jul. 22, 1997.

Extended European search report for European Application No. 09771098.2, dated Dec. 27, 2011.

Extended European search report for European Application No. 09819518, dated Jul. 22, 2014.

Fürstner et al., "Wetting and self-cleaning properties of artificial superhydrophobic surfaces," *Langmuir*, 21(3):956-961, abstract only (Feb. 1, 2005).

García et al., "Use of p-toluenesulfonic acid for the controlled grafting of alkoxysilanes onto silanol containing surfaces; preparation of tunable hydrophilic, hydrophobic, and super-hydrophobic silica," *J Am Chem Soc*, 129(16):5052-5060, abstract only (Apr. 25, 2007; epublished Mar. 31, 2007).

Gonçalves et al., "Superhydrophobic cellulose nanocomposites," *J. Colloid Interface Sci*, 324(1-2):42-46, abstract only (Aug. 2008; epublished May 7, 2008).

Guo et al., "A novel approach to stable superhydrophobic surfaces," *Chemphyschem*, 7(8):1674-1677, abstract only (Aug. 11, 2006; epublished Jul. 17, 2006).

In re *Inter Partes* Review of U.S. Pat. No. 8,286,561, Amended Petition for *Inter Partes* Review of U.S. Pat. No. 8,286,561 Under 35 U.S.C. §§ 311-319 and 37 C.F.R. § 42.100 *et seq.*, Trial No. IPR2013-00358 (Jun. 21, 2013).

In re *Inter Partes* Review of U.S. Pat. No. 8,286,561, Christopher B. Schechter Deposition, Trial No. IPR2013-00358 (Jan. 23, 2014).

In re *Inter Partes* Review of U.S. Pat. No. 8,286,561, Decision, Trial No. IPR2013-00358 (Nov. 14, 2013).

In re *Inter Partes* Review of U.S. Pat. No. 8,286,561, Decision: Institution of Inter Partes Review of the Trial Board under 37 C.F.R. § 42.108, Trial No. IPR2014-00367 (Jun. 12, 2014).

In re *Inter Partes* Review of U.S. Pat. No. 8,286,561, Declaration of Bradley M. Nall—Redacted Version, Trial No. IPR2013-00358 (Jan. 17, 2014).

(56) References Cited

OTHER PUBLICATIONS

In re *Inter Partes* Review of U.S. Pat. No. 8,286,561, Declaration of Chris B. Schechter, Trial No. IPR2014-00367 (Jan. 21, 2014).
In re *Inter Partes* Review of U.S. Pat. No. 8,286,561, Declaration of John Driver, Trial No. IPR2013-00358 (Feb. 7, 2014).
In re *Inter Partes* Review of U.S. Pat. No. 8,286,561, Final Written Decision of the Trial Board under 35 U.S.C. § 318(a) and 37 C.F.R. § 42.73, Trial No. IPR2013-00358 (Aug. 20, 2014).
In re *Inter Partes* Review of U.S. Pat. No. 8,286,561, Patent Owner Preliminary Response Under 37 C.F.R. §§ 42.107, Trial No. IPR2013-00358 (Aug. 14, 2013).
In re *Inter Partes* Review of U.S. Pat. No. 8,286,561, Patent Owner Preliminary Response, Trial No. IPR2014-00367 (Apr. 29, 2014).
In re *Inter Partes* Review of U.S. Pat. No. 8,286,561, Patent Owner Response Under 37 C.F.R. §§ 42.120, Trial No. IPR2013-00358 (Feb. 7, 2014).
In re *Inter Partes* Review of U.S. Pat. No. 8,286,561, Patent Owner's Motion for Additional Discovery Pursuant to 37 C.F.R. §42. 51(b)(2)—Redacted Version, Trial No. IPR2013-00358 (Aug. 14, 2013).
In re *Inter Partes* Review of U.S. Pat. No. 8,286,561, Paul Saunders Deposition, Trial No. IPR2013-00358 (Apr. 11, 2014).
In re *Inter Partes* Review of U.S. Pat. No. 8,286,561, Petition for Inter Partes Review of U.S. Pat. No. 8,286,561 Under 35 U.S.C. §§ 311-319 and 37 C.F.R. § 42.100 et seq., Trial No. IPR2013-00358 (Jun. 14, 2013).
In re *Inter Partes* Review of U.S. Pat. No. 8,286,561, Petition for *Inter Partes* Review of U.S. Pat. No. 8,286,561.
In re *Inter Partes* Review of U.S. Pat. No. 8,286,561, Petitioner's Reply to Patent Owner's Response to Petition—Public Redacted Version, Trial No. IPR2013-00358 (Apr. 22, 2014).
In re *Inter Partes* Review of U.S. Pat. No. 8,286,561, Second Declaration of Bradley M. Nall, Trial No. IPR2013-00358 (Feb. 6, 2014).
In re *Inter Partes* Review of U.S. Pat. No. 8,286,561, Second Notice of Deposition of Paul Saunders Pursuant to 37 C.F.R. § 42.53, Trial No. IPR2013-00358 (Apr. 10, 2014).
In re *Inter Partes* Review of U.S. Pat. No. 8,286,561. Petitioner's Corrected Reply to Patent Owner's Response to Petition, Redacted Public Version, Trial No. IPR2013-00367 (Feb. 13, 2015) (Case in Progress, Oral Hearing held Feb. 11, 2015).
International Preliminary Report on Patentability for International Application No. PCT/US2009/048775, dated Jan. 13, 2011.
International Search Report and Written Opinion for International Application No. PCT/US2009/005512, dated Dec. 8, 2009.
International Search Report and Written Opinion for International Application No. PCT/US2009/048775, dated Nov. 19, 2009.
International Search Report and Written Opinion for International Application No. PCT/US2009/059909, dated Dec. 4, 2009.
International Search Report and Written Opinion for International Application No. PCT/US2010/048711, dated Mar. 17, 2011.
International Search Report and Written Opinion for International Application No. PCT/US2010/054936, dated Feb. 16, 2011.
International Preliminary Report on Patentability for International Application No. PCT/US2009/59909, dated Apr. 21, 2011.
International Search Report and Written Opinion for International Application No. PCT/US2012/025982, dated Jun. 13, 2012.
International Search Report and Written Opinion for International Application No. PCT/US2012/070200, dated Feb. 27, 2013.
International Search Report and Written Opinion for International Application No. PCT/US2013/031751, dated Dec. 23, 2013.
International Search Report and Written Opinion for International Application No. PCT/US2014/057848, dated Dec. 29, 2014.
Jauregui-Beloqui et al., "Thermoplastic polyurethane-fumed silica composites: influence of the specific surface area of fumed silica on the viscoelastic and adhesion properties," *Journal of Adhesive Science and Technology*, 13(6):695-711, abstract only (1999).
Kietzig et al., "Patterned superhydrophobic metallic surfaces," *Langmuir*, 25(8):4821-4827, abstract only (Apr. 21, 2009).

Kim et al., "A simple fabrication route to a highly transparent superhydrophobic surface with a poly(dimethylsiloxane) coated flexible mold," *Chem Commun (Camb)*, 22:2237-2239, abstract only (Jun. 14, 2007; published Mar. 6, 2007).
Kobayashi et al., Surface Tension of Poly[(3,3,4,4,5,5,6,6,6-nonafluorohexyl)-methylsiloxane], *Macromolecules*, 23:4929-4933 (1990).
Kraton® FG1924 G Polymer, Data Document, Identifier K123DDe09U, the Kraton Polymers Group of Companies (Aug. 10, 2009).
Le Marechal et al., "Textile Finishing Industry as an Important Source of Organic Pollutants," in *Organic Pollutants Ten Years After the Stockholm Convention—Environmental and Analytical Update*, Puzyn (ed.), Chapter 2, pp. 29-54, InTech (2012).
Lee et al., "Impact of a superhydrophobic sphere onto water," *Langmuir*, 24(1):142-145, abstract only (Jan. 1, 2008; epublished Nov. 14, 2007).
Li et al., "Conversion of a metastable superhydrophobic surface to an ultraphobic surface," *Langmuir*, 24(15):8008-8012, abstract only (Aug. 5, 2008; epublished Jul. 8, 2008).
Ling et al., "Stable and transparent superhydrophobic nanoparticle films," *Langmuir*, 25(5):3260-3263, abstract only (Mar. 3, 2009).
Litvinov et al., "Structure of a PDMS Layer Grafted onto a Silica Surface Studied by Means of DSC and Solid-State NMR," *Macromolecules*, 35(11):4356-4364 (2002).
Manca et al., "Durable superhydrophobic and antireflective surfaces by trimethylsilanized silica nanoparticles-based sol-gel processing," *Langmuir*, 25(11):6357-6362, abstract only (Jun. 2, 2009).
Marmur, "Super-hydrophobicity fundamentals: implications to biofouling prevention," *Biofouling*, 22(1-2):107-115, abstract only (2006).
Ming et al., "Toward Superlyophobic Surfaces," *Contact Angle, Wettability and Adhesion* (ed. Mittal), vol. 6, pp. 191-205, Koninklijke Brill NV, Leiden (2009).
Nosonovsky et al., "Patterned nonadhesive surfaces: superhydrophobicity and wetting regime transitions," *Langmuir*, 24(4):1525-1533, abstract only (Feb. 19, 2008; epublished Dec. 12, 2007).
Park et al., "Wetting transition and optimal design for microstructured surfaces with hydrophobic and hydrophilic materials," *J. Colloid Interface Sci*, 336(1):298-303, abstract only (Aug. 1, 2009; epublished Apr. 15, 2009).
Perez, Jr., et al., "Performance and Processing Enhancements of Aromatic Polyurea Elastomer Systems Prepared from High 2,4'-MDI Isocyanates," in *Polyurethanes Conference 2000: Defining the Future Through Technology*, Boston, Massachusetts, pp. 219-232 (Oct. 8-11, 2000).
Piret et al., "Biomolecule and nanoparticle transfer on patterned and heterogeneously wetted superhydrophobic silicon nanowire surfaces," *Langmuir*, 24(5):1670-1672, abstract only (Mar. 4, 2008; epublished Feb. 6, 2008).
Puukilainen et al., "Superhydrophobic polyolefin surfaces: controlled micro- and nanostructures," *Langmuir*, 23(13):7263-7268, abstract only (Jun. 19, 2007; epublished May 23, 2007).
Sakai et al., "Direct observation of internal fluidity in a water droplet during sliding on hydrophobic surfaces," *Langmuir*, 22(11):4906-4909, abstract only (May 23, 2006).
Sherwin Williams Chemical Coatings product information for CC-D14, Polane® 2.8T, plus polyurethane enamel (Oct. 19, 2006).
Sherwin Williams Chemical Coatings product information for CC-D5, Polane® T, polyurethane enamel (Sep. 2001).
Sherwin Williams Chemical Coatings product information for CC-E14, Polane® 700T, water reducible enamel (May 2010).
Shirtcliffe et al., "Wetting and wetting transitions on copper-based super-hydrophobic surfaces," *Langmuir*, 21(3):937-943, abstract only (Feb. 1, 2005).
Smith et al., "Modeling of PDMS—Silica Nanocomposites," *NSTI-Nanotech*, 3:115-118 (2004).
*SSW Holding Company, Inc. v. Schott Gemtron Corporation*, Civil Docket, Civil Action No. 3:12-cv-00661-CRS (as of Dec. 6, 2013).
*SSW Holding Company, Inc. v. Schott Gemtron Corporation*, Complaint for Patent Infringement, Demand for Jury Trial, Civil Action No. 3:12-cv-00661-CRS (Oct. 16, 2012).

(56) References Cited

OTHER PUBLICATIONS

Su et al., "From Suerhydrophophilic to Superhydrophobic: Controlling Wettability of Hydroxide Zinc Carbonate Film on Zinc Plates," *Langmuir*, abstract only (Feb. 10, 2009; epublication ahead of print).

Synytska et al., "Wetting on Fractal Superhydrophobic Surfaces from 'Core-Shell' Particles: A Comparison of Theory and Experiment," *Langmuir*, abstract only (Feb. 10, 2009; epublication ahead of print).

Torró-Palau et al., "Characterization of polyurethanes containing different silicas," *International Journal of Adhesion and Adhesives*, 21(1):1-9, abstract only (2001).

Two webpages re pigment particle size: http://www.specialchem4coatings.com/tc/color-handbook/index.aspx?id=size and http://www.specialchem4coatings.com/tc/tio2/index.aspx?id=whiteness, SpecialChem, S.A. (printed on Jul. 9, 2013).

Venkateswara et al., "Preparation of MTMS based transparent superhydrophobic silica films by sol-gel method," *J Colloid Interface Sci*, 332(2):484-490, abstract only (Apr. 15, 2009; epublished Jan. 14, 2009).

Wang et al., "One-step coating of fluoro-containing silica nanoparticles for universal generation of surface superhydrophobicity," *Chem Commun (Camb)*,7:877-879, abstract only (Feb. 21, 2008; epublished Dec. 18, 2007).

Yang et al., "Influence of surface roughness on superhydrophobicity," *Phys Rev Lett*, 97(11):116103, abstract only (Sep. 15, 2006; epublished Sep. 14, 2006).

Zhang et al., "Application of superhydrophobic edge effects in solving the liquid outflow phenomena," *Langmuir*, 23(6):3230-3235, abstract only (Mar. 13, 2007; epublished Jan. 25, 2007).

Zhou et al., "Study on the morphology and tribological properties of acrylic based polyurethane/fumed silica composite coatings," *Journal of Materials Science*, 39:1593-1594, abstract only (2004).

Extended European search report for European Application No. 12857248, dated Apr. 7, 2015.

* cited by examiner

Figure 3: Taber cycles as affected by concentration of M5 and the amount of M5 used per 4- × 4-in. aluminum plate.

METHODS OF MAKING HIGHLY DURABLE SUPERHYDROPHOBIC, OLEOPHOBIC AND ANTI-ICING COATINGS

This application is a divisional of U.S. Ser. No. 13/082,327, filed on Apr. 7, 2011, which is a continuation of PCT/US2009/005512, filed Oct. 7, 2009, which claims the benefit of priority to U.S. Provisional Application No. 61/159,914, filed Mar. 13, 2009, and U.S. Provisional application No. 61/103,295, filed on Oct. 7, 2008, the contents of each of which are hereby incorporated by reference in their entireties.

BACKGROUND

Consumer and industrial products are made from a variety of materials including: metals and alloys, wood, glass, ceramics, cement and other masonry products, fabrics, plastics, paper, and composites. Composites of such materials can be composed of, for example, metals, masonry, or polymer based products. In all cases, surfaces of the products that are exposed to the environment may come into contact with a variety of agents, including dust, moisture, water, and oils. In industrial applications, surfaces may be exposed to a variety of agents such as water, aqueous salt solutions, solutions of aqueous acid or base, and chemicals that may be dissolved or suspended in aqueous compositions or other liquids that are used in manufacturing processes. Not only are product surfaces exposed to a variety of agents, but the temperatures to which surfaces are exposed can also affect their performance. For example, freezing liquids, such as water, can result in frozen deposits tightly attached to the surfaces exposed to the liquids, preventing access to the surface and preventing proper operation of equipment bound by the frozen liquids. In addition, elevated temperatures can accelerate processes such as corrosion or preferential surface leaching effects.

SUMMARY

Highly durable coatings and surface treatments are provide having a variety of surface properties including, but not limited to: hydrophobicity/superhydrophobicity, oleophobicity, resistance to ice formation and/or ice deposition (adherence). Compositions that are hydrophobic and/or oleophobic and/or anti-icing ("HP/OP") may be applied to a surface using single-step or multiple steps (e.g., two-step coating processes). Methods of applying such coatings and surface treatments also are provided, together with compositions for applying such coatings and surface treatments, and objects comprising coated and treated surfaces.

DETAILED DESCRIPTION

Figure 1:
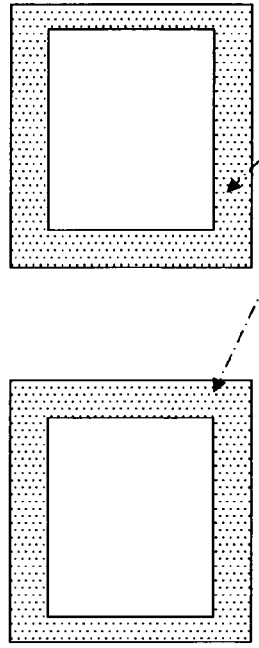
FIG. 1 shows two types of coatings on glass plates. Shown in FIG. 1 (perspective vertically down) are three glass plates. Panel A depicts the plates in the absence of liquid and Panel B depicts the plates in the presence of liquid. Plate "(A)" is a "control" glass plate without any spill-resistant border; plate "(B)" is a glass plate bearing a spill-resistant HP/OP border prepared by applying a coating to the border region; and plate "(C)" is a glass plate bearing a spill-resistant HP/OP border prepared by applying a tape bearing a HP/OP coating to the border region.
Figure 1:
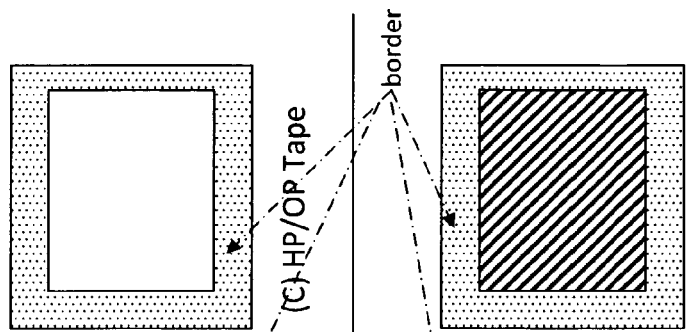
Figure 1:
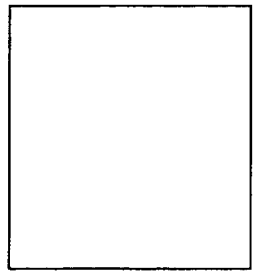
Figure 1:
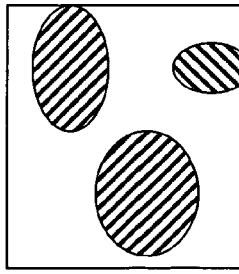

Coating methods and compositions/treatments are provided that impart a variety of desirable characteristics to objects and their surfaces, including hydrophobicity (e.g., superhydrophobicity), oleophobicity and anti-icing. Those characteristics can result in objects and surfaces with a variety of desirable properties including, but not limited to, resistance to: wetting, corrosion, swelling, rotting, cracking or warping, exfoliation, fouling, dust and/or dirt accumulation on surfaces (self cleaning), and surface ice formation adherence and accumulation. The coating compositions and treatments not only provide hydrophobicity and/or oleophobicity and/or anti-icing properties, but are durable in that they resist mechanical abrasion while retaining those properties The coatings may be applied using a variety of techniques that can be grouped into three categories: one-step processes; two-step processes; and thermal deposition processes, which may in some instances be considered a special case of one-step or two-step processes. Within each of those categories numerous variations and embodiments are provided.

In some embodiments, the coatings may be applied using a one-step method, where a binder, first particles, and second particles are mixed to provide a coating composition that is then applied to the surface.

For example, a one-step method of applying a coating to a substrate may apply a coating composition to a substrate where the components include: i) a binder; ii) first particles having a size of about 30 microns to about 225 microns; and iii) second particles having a size of about 1 nanometer to 25 microns. Optionally, one or more independently selected alkyl, haloalkyl, or perfluoroalkyl groups may be covalently bound, either directly or indirectly, to the second particles. The composition optionally may contain 5% to 10% of a block copolymer on a weight basis. The composition may also contain any necessary solvents/liquids to assist in the application process.

Particles suitable for use in these compositions are described in detail below.

Where second particles are not HP/OP (e.g., untreated with a silanizing agent) prior to their incorporation into a coatings formed in one or two step processes, the coatings formed in those processes may be treated to apply chemical moieties (groups) such alkyl, haloalkyl, fluoroalkyl or perfluoroalkyl groups to the second particles at the surface of the coating (e.g., treating with silanizing agents such as compounds of formula (I), SIT7184.0 and the like).

In some embodiments, the coatings may be applied using two-step methods, where, in a first step, a binder and first particles are mixed to form a coating composition, which does not contain the second particles prior to the application of the coating composition to the surface. Once applied, the coating composition is termed a "substrate coating" or a "base coat." Following the application of that coating composition, a composition comprising second particles is applied in a second step to the surface over the coating composition.

In some embodiments a two-step method of applying a coating to a substrate comprises:
a) applying to the substrate a coating composition comprising i) a binder and ii) first particles having a size of about 30 microns to about 225 microns, to provide a base coating; and
b) applying to this base coating a composition containing second particles having a size of about 1 nanometer to 25 microns. The second particles may have one or more independently selected alkyl, haloalkyl or perfluoroalkyl groups (e.g., polydimethylsiloxane) covalently bound, either directly or indirectly, to the second particles.

The composition may also contain any necessary solvents/liquids to assist in the application process.

In some embodiments of a two-step application method, the base coating is treated with the composition containing second particles after drying and curing the base coating at room temperatures (about 18-22° C.) or elevated temperatures (e.g., about 93° C.). In other embodiments, solvent used to apply the base coat is allowed to evaporate until the coating is no longer liquid and cannot be removed by contact; however, the base coating is not cured, when treated with the composition containing second particles. In still other embodiments, the composition comprising second particles may be applied directly to the base coat before solvents used in the application of the base coating have evaporated fully, substantially or even partly.

In one embodiment where HP/OP coatings are prepared using thermal spray processes, the process is a two step process. In such processes the metals and other materials applied to a substrate by thermal spray processes may be considered as binders for first particles added to the composition sprayed in the first step (e.g., $Al_2O_3$, silica or other metalloid oxides, or metal oxides). Alternatively the materials applied to the substrate may be considered as a binder for materials formed in the spraying process (e.g., metal or metalloid oxides formed in the spray process with oxidizing fuel). In addition to applying first particles, thermal spraying processes can also apply second particles and materials formed in the spraying process (e.g., metal oxides or metalloid oxides from the spraying composition). In each of those instances, following thermal spray treatment, the surface will contain materials (e.g., metal oxides) that can bind the materials or react with reagents that will enhance or impart HP/OP properties to the substrate's surface. Alternatively, the materials applied as a base coating, which form a rough surface, may be considered to comprise first particles formed from the materials applied in the partly melted and fused coating composition. In either case, following thermal spray deposition the surface is subject to a second treatment to enhance or impart HP/OP properties to the surface.

In one embodiment a method for thermal deposition of a coating to a surface may include the steps of:
a) applying to the substrate by a thermal spray process a base coating spray composition optionally comprising one or more independently selected first particles having a size of about 1 micron to about 100 microns, to provide a base coating; and
b) applying to this base coating one or more of: i) a composition comprising one or more independently selected second particles having a size of about 1 nanometer to 25 microns that optionally comprise one or more independently selected alkyl, haloalkyl, fluoroalkyl, or perfluoroalkyl groups covalently bound, either directly or indirectly, to the second particles; ii) a composition comprising one or more independently selected silanizing agents or iii) a composition comprising a silicon-containing reagent that will increase the number of Si—OH sites, followed by a composition containing a silanizing agent.

Diverse binders, first particles, second particles and block copolymers may be employed in the methods and compositions described herein. In some embodiments, first particles may be considered filler particles. Similarly, in some embodiments second particles may be considered nanoparticles. In each instance, those materials are described more fully below.

A skilled artisan will understand that the selection of first particles and second particles needs to consider not only the desired properties of the coating and the ultimate conditions to which the coating will be subject in use, but also the process used to prepare the coating. Where, for example, particles must withstand elevated temperatures or specific solvents in the coating process, they need to be suitable for use in the required temperature ranges or in the required solvents. For example, in those embodiments where first and/or second particles are used with a thermoplastic binder, the particles need to be compatible with the elevated temperatures that are required to cure thermoplastic binders. In other embodiments where, for example, first particles or second particles are applied as part of a thermal spray composition, the particles need to withstand the high temperatures associated with those processes.

The one-step and two-step methods described herein can in some embodiments be used to produce coatings where the coating has (i) a surface in contact with said substrate and (ii) an exposed surface that is not is not in contact with the substrate where these surfaces bear different amounts of first particles, second particles, or both first and second particles. In such embodiments the exposed surface can have a greater amount of second and/or first particles on, at, or adjacent to the exposed surface, compared to the amount of first and/or second particles at or adjacent to the surface of the coating that is in contact with the substrate.

In other embodiments, the one-step and two-step methods described herein can be used to produce coatings where the coating has (i) a surface in contact with said substrate, (ii) an exposed surface that is not in contact with the substrate and a (iii) central portion of the coating that is between these surfaces. In such embodiments the exposed surface can have a greater amount of second and/or first particles on, at, or adjacent to the exposed surface, compared to the amount of first and/or second particles in the central region of the coating.

In embodiments where a greater amount of first and/or second particles may be present at the exposed surface, the coatings may be considered composite coatings. Such composite coatings may be formed using either one- or two-step application processes.

In one-step coating processes the incorporation of a block copolymer in a range selected from: about 35 to about 15%; from about 4% to about 13%; from about 5% to about 10% or 4% to about 7% (by weight of the final cured coating) can result in the movement of first or second particles to the surface of the coating. Without wishing to be bound by any theory, it is believed that block copolymers may form aggregates in the binder composition, which can cause localization of at least second particles, and may also cause localization of first particles as well.

In two step processes, composite coatings with a greater amount of first and/or second particles may be present at the surface as a result of their being applied to the exposed surface of the base coating. Furthermore, where the base coating composition comprises a block copolymer in the ranges listed above for one step applications, first and/or second particles present in the base coating may move to the surface, which will also create an unequal distribution of particles in the coating.

The amount of particles in any portion of a coating may be assessed by any means known in the art including, but not limited to, microscopy or electron microscopy. Using those techniques and cross or oblique sections of coatings, the amount (e.g., the number) of particles can be determined. In addition, where it is possible to remove coatings, or where the substrate permits (e.g., it is transparent), the surfaces can be examined directly using microscopy or electron microscopy to determine the amount of particles present at the surface adjacent to the coating.

The coatings described herein are durable and resistant to the loss of OH/OP properties as a result of abrasion. Resistance to abrasion may be measured using any method known in the art including assessment with a Taber abrasion testing instrument (e.g., a Taber "Abraser"). For the purpose of this application, wherever Taber testing results are recited, the tests were conducted on a Taber Model: 503 instrument using CS-10 wheels with 250 g or 500 g loads as indicated. Abrasion may also be measured using manual tests as described in Example 1. To provide an end point for the loss of hydrophobicity (and also oleophobicity and anti-icing properties) as a result of abrasion testing, surfaces are tested for their propensity to shed water droplets at an indicated angle of incline. Typically, twenty droplets are placed on the surface to be assessed, which is then inclined at the desired angle. End of life is indicated when more than half (ten or more drops) stay in place. While such measurements provide a consistent end point, a skilled artisan will understand that even after abrasion testing the abraded surfaces may still be quite hydrophobic, having water contact angles greater than 130 or 140° in many instances.

In addition to resistance to loss of OH/HP properties from abrasion, the compositions provided herein also provide durability in the form of resistance to other conditions. The coatings, which employ diverse binder systems, also display durability in:

Submerged water durability testing (the duration of a coating to resist wetting at different depths in water);
Mechanical durability testing under high pressure impingement of water (the resistance of coating or surface treatment to the impact of high-pressure water);
Chemical durability testing (the resistance of the coatings and treatments to liquids other than water, such as acids, alkalis, salts, and organic solvents such as alcohols, acetone, toluene, xylene, etc.);
UV radiation resistance testing;
Tests for resistance to boiling water; and
Ice formation and/or adherence testing.

Figure 13:
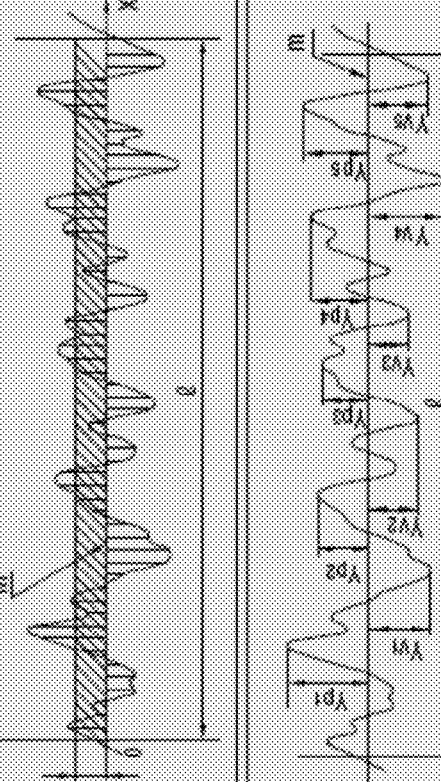
FIG. 13 shows the arithmetic mean roughness and 10 point mean roughness.

In addition to their other properties, the HP/OP coating described herein can be described by their characteristic roughness that may be measured by any means known in the art. In some embodiments the surface roughness is measured using a Mahr PocketSurf PS1 (Mahr Federal Inc., Providence, R.I.). The roughness can be expressed using a variety of mathematical expressions including, but not limited to, the Arithmetical Mean Roughness and Ten-Point Mean Roughness, which are described in FIG. 13.

The coatings, resulting from the application of the compositions provided for herein, have in some embodiments a surface with an arithmetical mean roughness in a range selected from: greater than about 3 microns to about 4 microns; from about 4 microns to about 6 microns; from about 4 microns to about 8 microns; from about 4 microns to about 12 microns; from about 4 microns to about 20 microns;

from about 5 microns to about 10 microns; from about 5 microns to about 12 microns; from about 5 microns to about 20 microns; from about 6 microns to about 10 microns; or from about 6 microns to about 14 microns.

In other embodiments, the coatings, resulting from the application of the compositions provided for herein, have in some embodiments a surface with a ten point mean roughness selected from: greater than about 7 microns to about 60 microns; from about 7 microns to about 70 microns; from about 7 microns to about 80 microns; from about 7 microns to about 100 microns; from about 8 microns to about 60 microns; from about 8 microns to about 80 microns; from about 8 microns to about 100 microns; from about 12 microns to about 60 microns; from about 12 microns to about 100 microns; from about 15 microns to about 60 microns; or from about 15 microns to about 100 microns.

In some embodiments the coating surface has projections due to the presence of the first particles, with a maximum height above the level of the binder in a range selected from: from about 10 to about 180 microns; from about 15 to about 150 micron; from about 20 to about 100 microns; from 30 to 120 microns; from about 40 to 140 microns; from about 50 to about 150 microns, or from about 20 to about 80 microns.

A more complete discussion of the compositions and methods of their application and surface treatments follow. A skilled artisan will understand that the following description and examples are provided as guidance, and are not limiting to the scope of the methods and compositions described herein.

1.0 DEFINITIONS

For the purposes of this disclosure a hydrophobic border or surface is one that results in a water droplet forming a surface contact angle exceeding about 90° and less than about 150° at room temperature (about 18 to about 23° C.). Similarly, for the purposes of this disclosure a superhydrophobic border or surface is one that results in a water droplet forming a surface contact angle exceeding about 150° but less than the theoretical maximum contact angle of about 180° at room temperature. Some authors further categorize hydrophobic behavior and employ the term "ultrahydrophobic." Since for the purposes of this disclosure, a superhydrophobic surface has contact angles of about 150° to about 180°, superhydrophobic behavior is considered to include ultrahydrophobic behavior. For the purpose of this disclosure the term hydrophobic shall include superhydrophobic unless stated otherwise.

For the purposes of this disclosure an oleophobic material or surface is one that results in a droplet of light mineral oil forming a surface contact angle exceeding about 25° and less than the theoretical maximum contact angle of about 180° at room temperature.

Anti-icing (AI) surfaces are surfaces that are resistant to ice formation or prevent ice that forms from adhering to the surface (i.e., ice that forms can be removed with a minimum of force).

For the purpose of this disclosure HP/OP denotes hydrophobic (including superhydrophobic) and/or oleophobic behavior or properties as well as anti-icing properties. Durability, unless stated otherwise, refers to the resistance to loss of hydrophobic properties due to mechanical abrasion.

Alkyl as used herein denotes a linear or branched alkyl radical. Alkyl groups may be independently selected from $C_1$ to $C_{20}$ alkyl, $C_2$ to $C_{20}$ alkyl, $C_4$ to $C_{20}$ alkyl, $C_6$ to $C_{18}$ alkyl, $C_6$ to $C_{16}$ alkyl, or $C_6$ to $C_{20}$ alkyl. Unless otherwise indicated, alkyl does not include cycloalkyl. Cycloalkyl groups may be independently selected from: $C_4$ to $C_{20}$ alkyl comprising one or two $C_4$ to $C_8$ cycloalkyl functionalities; $C_4$ to $C_{20}$ alkyl comprising one or two $C_4$ to $C_8$ cycloalkyl functionalities; $C_6$ to $_{20}$ alkyl comprising one or two $C_4$ to $C_8$ cycloalkyl functionalities; $C_6$ to $C_{18}$ alkyl comprising one or two $C_4$ to $C_8$ cycloalkyl functionalities; $C_6$ to $C_{16}$ alkyl comprising one or two $C_4$ to $C_8$ cycloalkyl functionalities. One or more hydrogen atoms of the alkyl groups may be replaced by fluorine atoms.

Haloalkyl as used herein denotes an alkyl group in which some or all of the hydrogen atoms present in an alkyl group have been replaced by halogen atoms. Halogen atoms may be limited to chlorine or fluorine atoms in haloalkyl groups.

Fluoroalkyl as used herein denotes an alkyl group in which some or all of the hydrogen atoms present in an alkyl group have been replaced by fluorine atoms.

Perfluoroalkyl as used herein denotes an alkyl group in which fluorine atoms have been substituted for each hydrogen atom present in the alkyl group.

For the purpose of this disclosure, when content is indicated as being present on a "weight basis" the content is measured as the percentage of the weight of components indicated, relative to the total weight of the binder system. When a liquid component such as a commercial binder product is used, the weight of the liquid component is used to calculate the weight basis, without regard to the relative amounts of solute and solvent that might be present in the commercial product. Thus, for example, when Polane is used as a binder, the weight basis is calculated using the weight of the Polane prepared as instructed by the manufacturer, without regard to the proportions of polyurethane solute and organic solvents. Optional solvents that are separately added to a composition merely to, for example, dilute the composition to a thickness suitable for spraying, are not included in the calculation of content on a weight basis.

2.0 BINDERS

Binders used to prepare durable superhydrophobic coatings may have a variety of compositions. Virtually any binder may be employed that is capable of adhering to the surface to be coated and retaining the desired first and second particles, both of which are described below. In some embodiments the binders employed are hydrophobic or superhydrophobic as applied in the absence of any added first or second particles, which can be advantageous in the preparation of durable HP/OP coatings.

In some embodiments the binders may be selected from lacquers, polyurethanes, fluoropolymers, epoxies, or powder coatings (thermoplastics). In other embodiments the binders may be selected from lacquers, polyurethanes, fluoropolymers, or thermoplastics. Binders may be hydrophilic, hydrophobic or superhydrophobic "as applied." For the purposes of this disclosure, when binders or their properties are described "as applied," it is understood that the binder(s) and properties are being described in the absence of the first and second particles described herein that alter the durability, hydrophobic/superhydrophobic and oleophobic properties of binder.

In one- or two-step processes, where the binders employed are hydrophilic, the coating will generally be given an application of a silanizing agent after it has been applied to the substrate.

In some instances, the binders are not comprised of materials (e.g., monomers or oligomers) that polymerize when exposed to UV light to form polymers. In another embodiment, the binders are not comprised of thermoset polymeric materials.

Regardless of what type of binder is employed, one consideration in choosing a suitable binder is the compatibility between the surface to be coated and any solvent(s) used to apply the binder. Other considerations are the environment to which the coating will be exposed after it is applied. Binders of the present disclosure provide resistance to a broad variety of chemical and ultraviolet light exposure (e.g., fluoropolymers such as in the LUMIFLON family of coatings are resistant to UV and light exposure from sunlight).

Durable HP/OP coatings formed with binders can have a broad range of thicknesses. In some embodiments the coatings will have a thickness in a range selected from about 10 microns to about 225 microns; about 15 microns to about 200 microns; about 20 microns to about 150 microns; about 30 microns to about 175 microns; or about 50 microns to about 200 microns.

2.1 Lacquer Binders

Lacquer binders typically are polymeric materials that are suspended or dissolved in carrier solvents and which dry to a hard finish, at least in part, by evaporation of the carrier solvents used to apply them. The polymeric binders present in lacquers include, but are not limited to, nitrocellulose and acrylic lacquers; each of which are suitable for use in preparing durable hydrophobic coatings.

In an embodiment, hydrophilic lacquers may be employed as binders; particularly where the coating will be given an application of a silanizing agent after it has been applied to the substrate. In another embodiment, lacquers that are hydrophobic or superhydrophobic as applied in the absence of first or second particles described below may be employed to prepare the coatings described herein.

In addition to the polymeric materials and solvents present in lacquers, a variety of other materials that enhance the properties of lacquers may be present. Such materials can provide not only color but also increased adhesion between the lacquer and the substance upon which it is applied.

A variety of commercial lacquer preparation may be used to prepare the durable coatings described herein. Among the commercial acrylic lacquers that may be employed are "Self-Etching Primer" (Eastwood Co. Pottstown, Pa.); Dupont VariPrime 615S (Dupont Performance Coatings, Wilmington, Del.) and Nason 491-17 Etch Primer (Dupont Performance Coatings, Wilmington, Del.)

Lacquers may be used on a variety of surfaces and are particularly useful in forming coatings on plastics, woods and metals, including, but not limited to, steel, stainless steel, and aluminum.

2.2 Polyurethane Binders

Polyurethanes are polymers consisting of a chain of organic units joined by urethane (carbamate) linkages. Polyurethane polymers are typically formed through polymerization of at least one type of monomer containing at least two isocyanate functional groups with at least one other monomer containing at least two hydroxyl (alcohol) groups. A catalyst may be employed to speed the polymerization reaction. Other components may be present in the polyurethane coating compositions including, but not limited to, surfactants and other additives that bring about the carbamate forming reaction(s) yielding a coating of the desired properties in a desired cure time.

Figure 14:
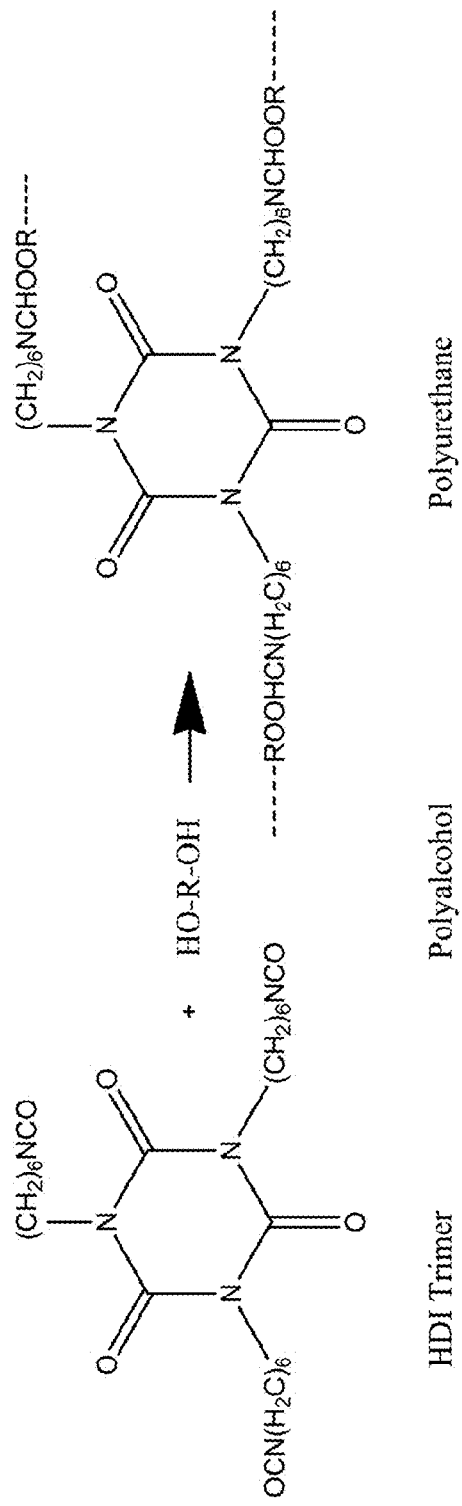
FIG. 14 shows a polyisocyanate trimer.

In some embodiments, the polyurethane employed in the durable coatings may be formed from a polyisocyanate and a mixture of —OH (hydroxyl) and NH (amine) terminated monomers. In such systems the polyisocyanate can be a trimer or homopolymer of hexamethylene diisocyanate, see, e.g., FIG. 14.

Some solvents compatible with such systems include n-butyl acetate, toluene, xylene, ethyl benzene, cyclohexanone, isopropyl acetate, and methyl isobutyl ketone and mixtures thereof.

A wide variety of polyurethanes may be used to prepare the durable HP/OP coatings described herein. In some embodiments, polyurethanes that are hydrophobic or superhydrophobic as applied in the absence of first or second particles described below may be employed to prepare the coatings described herein. Among the commercial polyurethanes that may be employed are the POLANE® family of polyurethanes from Sherwin Williams (Cleveland, Ohio).

Polyurethanes may come as a single component ready to apply composition or as a two or three part (component) system, as is the case with POLANE products. For example POLANE B can be prepared by mixing POLANE® B (typically six parts), to catalyst (e.g., typically one part of V66V27 or V66V29 from Sherwin Williams), and a reducer (typically 25-33% of R7K84 from Sherwin Williams). The "pot life" of mixed POLANE® B prepared in that manner is typically 6-8 h.

Polyurethane coatings are compatible with, and show good adhesion to, a wide variety of surfaces. Using polyurethane binders durable HP/OP coatings may be formed on virtually any surface, including but not limited to, those of metals, glass, ceramics, concrete, wood, and plastics.

2.3 Fluoropolymer Binders

Fluoropolymers are polymers comprising one or more fluoroalkyl groups. In some embodiments, the fluoropolymers employed in the durable coatings may be formed from Fluoroethylene/vinyl ether copolymer (FEVE).

A wide variety of fluoropolymer coatings may be used to prepare the durable HP/OP coatings described herein. Fluoropolymers that are hydrophobic or superhydrophobic as applied in the absence of first or second particles, which are described further below, may be employed to prepare the coatings described herein. Among the commercial fluoropolymers that may be employed to prepare HP/OP coatings are LUMIFLON® family polymers (Asahi Glass Co., Toyko, Japan).

Fluoropolymers that may be employed as binders typically come as a two or three component system, as is the case with LUMIFLON® products. For example LUMIFLON® LF can be prepared by mixing 58 parts of LUMIFLON® LF-200, 6.5 parts of DESMODUR® N3300A, (Bayer Material Sciences,) 2.5 parts of catalyst (DABCO T12 ($\frac{1}{10,000}$ part), DABCO (1,4-diazabicyclo[2.2.2]octane, $\frac{1}{10,000}$ part), 1 part xylene), with 33 parts xylene. Unless otherwise noted, references to LUMIFLON®, particularly in the Examples, refer to LUMIFLON® LF.

Fluropolymer coatings such as LUMIFLON® can be applied to variety of surfaces including wood, metal and concrete. Many fluoropolymers offer resistance to UV light and can therefore be used in exterior applications where the coatings are exposed to the potentially damaging effects of sunlight.

2.4 Powder Coatings

Powder coatings typically are thermoplastic or thermoset coatings that are applied on surfaces (often metal) to give a variety of desirable characteristics (e.g., colorful and slick appearance and functionalities such as corrosion protection, etc.). Powder coatings can be applied by a variety of means, including electrostatic spraying of thermoplastic or thermoset powders onto substrate surfaces. Once applied to the surface, the powder coats are subject to thermal treatment at nominal temperatures (about 400° F. or 200° C.), which melt the polymers, permitting their polymerization. The melting and solidification occur quickly, resulting in the formation of a very tenacious and durable continuous coating. Powder coat materials can be used as binders for the formation of superhydrophobic, hydrophobic, or oleophobic coatings.

In some embodiments the powder coating is mixed with first particles, at the time the coating is applied to the substrate. First particles may be present in a range that is about 5% to 40%, or 10% to 30%, 10% to 35%, 15% to 30%, or 20% to 40% by weight. In one embodiment, the first particles mixed with the powder coat are Extendospheres (P.A. Industries, Inc., Chatanooga, Tenn.), which may be used at 10% to 30% by weight.

2.5 Binders and Durable Hydrophobic, Superhydrophobic and Oleophobic Compositions Applied by Thermal Spray Processes In addition to the preparation of durable HP/OP coatings using polymeric binders to form attachments between substrates and second particles (e.g., fumed silica nanoparticles) that are capable of forming linkages to moieties that impart one or more of hydrophobic, oleophobic or anti-icing properties (e.g., alkyl, fluoroalkyl, or perfluoroalkyl moieties), it is possible to prepare durable HP/OP coatings using thermal spray processes.

Thermal spray processes permit the formation of durable HP/OP coatings in which it is possible to immobilize materials capable of directly or indirectly forming linkages to chemical groups imparting HP/OP behavior to the surface (e.g., silica or alumina particles capable of binding alkyl, fluoroalkyl, or perfluoro alkyl moieties upon silanization). In an embodiment, particles impregnated into the surface with thermal spray coating can be particles of carbides, metal oxides, or oxides of metalloids (e.g., B, Si, Sb, Te and Ge) such as silicates (e.g., fumed silica). The particles may be directly impregnated into the surface by employing thermal spray processes.

In addition, thermal spray processes also permit the formation and immobilization of materials that can be modified to give the surface OH/OP properties (e.g., the formation of metal oxides bound to, or incorporated into, the surface of a coating applied by an oxidizing thermal spray process). By way of example, thermal spray processes include High-Velocity OxyFuel (HVOF), thermal spray, and Twin-Arc spray (e.g., methods using a ROKIDE® ceramic spray systems). In each case, it is the thermal energy that either bonds particles of metals, alloys, oxide, carbides or nitrides, or a combination of them to metallic substrates. When metals and alloys are sprayed by thermal processes, because of the high temperatures involved and the presence of air or oxygen in the environment, the top layer of the deposited metals and alloys typically is oxidized. The oxidized materials (e.g., metals) may be used to attach moieties providing HP/OP properties (e.g., by reaction with silanizing agents such as compounds of formula (I), SIT8174.0 and the like).

3.0 FIRST PARTICLES

While durable coatings employ binders as a means of immobilizing second particles (e.g., nanoparticles) bearing hydrophobic moieties to the surfaces, first particles may advantageously be added to the binder composition to, among other things, improve the durability of the hydrophobic coatings. A wide variety of first particles (also known as extenders or fillers) may be added to the binder to alter the properties and improve coating durability over coating compositions made in their absence. First particles that may be employed in the durable SP/OP coatings include, but are not limited to, particles comprising: wood (e.g., wood dust), glass, metals (e.g., iron, titanium, nickel, zinc, tin), alloys of metals, metal oxides, metalloid oxides (e.g., silica), plastics (e.g., thermoplastics), carbides, nitrides, borides, spinels, diamond, and fibers (e.g., glass fibers). Some commercially available first particles that may be employed in the formation of the durable HP/OP coatings described herein include those in the accompanying Table I.

TABLE I

First Particles
Table Fillers, their particles sizes, properties, and sources.

| Filler # | Filler ID | Filler Type | Filler Details | Density g/cc | Particle size Range microns | Color | Crush Strength psi | Source | Location |
|---|---|---|---|---|---|---|---|---|---|
| 1 | K1 | Glass Bubbles | General Purpose Series | 0.125 | 30-120 | White | 250 | 3M ™ | St. Paul, MN |
| 2 | K15 | Glass Bubbles | General Purpose Series | 0.15 | 30-115 | White | 300 | 3M ™ | St. Paul, MN |
| 3 | S15 | Glass Bubbles | General Purpose Series | 0.15 | 25-95 | White | 300 | 3M ™ | St. Paul, MN |
| 4 | S22 | Glass Bubbles | General Purpose Series | 0.22 | 20-75 | White | 400 | 3M ™ | St. Paul, MN |
| 5 | K20 | Glass Bubbles | General Purpose Series | 0.2 | 20-125 | White | 500 | 3M ™ | St. Paul, MN |
| 6 | K25 | Glass Bubbles | General Purpose Series | 0.25 | 25-105 | White | 750 | 3M ™ | St. Paul, MN |
| 7 | S32 | Glass Bubbles | General Purpose Series | 0.32 | 20-80 | White | 2000 | 3M ™ | St. Paul, MN |
| 8 | S35 | Glass Bubbles | General Purpose Series | 0.35 | 10-85 | White | 3000 | 3M ™ | St. Paul, MN |
| 9 | K37 | Glass Bubbles | General Purpose Series | 0.37 | 20-85 | White | 3000 | 3M ™ | St. Paul, MN |
| 10 | S38 | Glass Bubbles | General Purpose Series | 0.38 | 15-85 | White | 4000 | 3M ™ | St. Paul, MN |
| 11 | S38HS | Glass Bubbles | General Purpose Series | 0.38 | 15-85 | White | 5500 | 3M ™ | St. Paul, MN |
| 12 | K46 | Glass Bubbles | General Purpose Series | 0.46 | 15-80 | White | 6000 | 3M ™ | St. Paul, MN |
| 13 | S60 | Glass Bubbles | General Purpose Series | 0.6 | 15-65 | White | 10000 | 3M ™ | St. Paul, MN |
| 14 | S60/HS | Glass Bubbles | General Purpose Series | 0.6 | 11-60 | White | 18000 | 3M ™ | St. Paul, MN |
| 15 | A16/500 | Glass Bubbles | Floated Series | 0.16 | 35-135 | White | 500 | 3M ™ | St. Paul, MN |
| 16 | A20/1000 | Glass Bubbles | Floated Series | 0.2 | 30-120 | White | 1000 | 3M ™ | St. Paul, MN |
| 17 | H20/1000 | Glass Bubbles | Floated Series | 0.2 | 25-110 | White | 1000 | 3M ™ | St. Paul, MN |
| 18 | D32/4500 | Glass Bubbles | Floated Series | 0.32 | 20-85 | White | 4500 | 3M ™ | St. Paul, MN |
| 19 | H50/10000 EPX | Glass Bubbles | Floated Series | 0.5 | 20-60 | White | 10000 | 3M ™ | St. Paul, MN |
| 20 | iMK | Glass Bubbles | | 0.6 | 8.6-26.7 | White | 28000 | 3M ™ | St. Paul, MN |
| 21 | G-3125 | Z- Light Spheres ™ | Ceramic Microshpheres | 0.7 | 50-125 | Gray | 2000 | 3M ™ | St. Paul, MN |
| 22 | G-3150 | Z- Light Spheres ™ | Ceramic Microshpheres | 0.7 | 55-145 | Gray | 2000 | 3M ™ | St. Paul, MN |
| 23 | G-3500 | Z- Light Spheres ™ | Ceramic Microshpheres | 0.7 | 55-220 | Gray | 2000 | 3M ™ | St. Paul, MN |
| 24 | G-600 | Zeospheres ™ | Ceramic Microshpheres | 2.3 | 1-40 | Gray | >60,000 | 3M ™ | St. Paul, MN |
| 25 | G-800 | Zeospheres ™ | Ceramic Microshpheres | 2.2 | 2-200 | Gray | >60,000 | 3M ™ | St. Paul, MN |

TABLE I-continued

Table Fillers, their particles sizes, properties, and sources.

| | | | | First Particles | | | | |
|---|---|---|---|---|---|---|---|---|
| | | | | | Particle size | | | |
| Filler # | Filler ID | Filler Type | Filler Details | Density g/cc | Range microns | Color | Crush Strength psi | Source | Location |
| 26 | G-850 | Zeeospheres ™ | Ceramic Microshphers | 2.1 | 12-200 | Gray | >60,000 | 3M ™ | St. Paul, MN |
| 27 | W-610 | Zeeospheres ™ | Ceramic Microshphers | 2.4 | 1-40 | White | >60,000 | 3M ™ | St. Paul, MN |
| 28 | SG | Extendosphere ™ | Hollow Spherse | 0.72 | 30-140 | Gray | 2500 | Shpereone | Chattanooga, TN |
| 29 | DSG | Extendosphere ™ | Hollow Spherse | 0.72 | 30-140 | Gray | 2500 | Shpereone | Chattanooga, TN |
| 30 | SGT | Extendosphere ™ | Hollow Spherse | 0.72 | 30-160 | Gray | 2500 | Shpereone | Chattanooga, TN |
| 31 | TG | Extendosphere ™ | Hollow Spherse | 0.72 | 8-75 | Gray | 2500 | Shpereone | Chattanooga, TN |
| 32 | SLG | Extendosphere ™ | Hollow Sphere | 0.7 | 10-149 | Off White | 3000 | Shpereone | Chattanooga, TN |
| 33 | SLT | Extendosphere ™ | Hollow Sphere | 0.4 | 10-90 | Off White | 3000 | Shpereone | Chattanooga, TN |
| 34 | SL-150 | Extendosphere ™ | Hollow Sphere | 0.62 | 70 | Cream | 3000 | Shpereone | Chattanooga, TN |
| 35 | SLW-150 | Extendosphere ™ | Hollow Sphere | 0.68 | 8-80 | White | 3000 | Shpereone | Chattanooga, TN |
| 36 | HAT | Extendosphere ™ | Hollow Sphere | 0.68 | 10-165 | Gray | 2500 | Shpereone | Chattanooga, TN |
| 37 | HT-150 | Extendosphere ™ | Hollow Sphere | 0.68 | 8-85 | Gray | 3000 | Shpereone | Chattanooga, TN |
| 38 | KLS-90 | Extendosphere ™ | Hollow Sphere | 0.56 | 4-05 | Light Gray | 1200 | Shpereone | Chattanooga, TN |
| 39 | KLS-125 | Extendosphere ™ | Hollow Sphere | 0.56 | 4-55 | Light Gray | 1200 | Shpereone | Chattanooga, TN |
| 40 | KLS-150 | Extendosphere ™ | Hollow Sphere | 0.56 | 4-55 | Light Gray | 1200 | Shpereone | Chattanooga, TN |
| 41 | KLS-300 | Extendosphere ™ | Hollow Sphere | 0.56 | 4-55 | Light Gray | 1200 | Shpereone | Chattanooga, TN |
| 42 | HA-300 | Extendosphere ™ | Hollow Sphere | 0.68 | 10-146 | Gray | 2500 | Shpereone | Chattanooga, TN |
| 43 | XIOM 512 | Thermoplastic | Modified Polyethylene Resins | 0.96 | 10-100 | White | 508 | XIOM Corp | West Babylon, NY |
| 44 | XIOM 512 CORVEL ™ | Thermoplastic | Modified Polyethylene Resins | 0.96 | 10-100 | Black | 508 | XIOM Corp | West Babylon, NY |
| 45 | BLACK 78-7001 | Thermoplastic | Nylon Powder Coating | 1.09 | 44-74 | Black | | ROHM & HASS | Philadelphia, PA |
| 46 | Microglass 3082 | Fibers | Microglass milled E-glass Filaments | 1.05 | 16X120 | White | | Fibertec | Bridgewater, MA |
| 47 | Microglass 9007D | Fibers Silane Treated | Microglass milled E-glass Filaments | 0.53 | 10X150 | White | | Fibertec | Bridgewater, MA |

In addition to the chemical nature of the first particles, other variables may be considered in the selection of first particles. These variables include, but are not limited to, the effect the first particle is expected to have on coatings, their hardness, their compatibility with the binder, the expected resistance of the first particle to the environment in which coating will be employed, and the environment the first particles must endure in the coating process, including resistance to temperature and solvent conditions. For example, where a first particle is applied in a thermoplastic binder that requires heating to cure the coating, the first particle must be capable of withstanding the temperatures required to cure the coating. In another example, where particles are applied to surfaces using a thermal spray process, the particles must be capable of withstanding the temperatures and environment presented in that process.

In an embodiment, first particles have an average size in a range selected from: greater than about 5 microns (μm) to about 50 μm; about 10 μm to about 100 μm; about 10 μm to about 200 μm; about 20 μm to about 200 μm; about 30 μm to about 100 μm; about 30 μm to about 200 μm; about 50 μm to about 100 μm; about 50 μm to about 200 μm; about 75 μm to about 150 μm; about 75 μm to about 200 μm; about 100 μm to about 225 μm; about 125 μm to about 225 μm; or about 100 μm to about 250 μm.

In another embodiment, first particles have an average size in a range selected from: about 30 μm to about 225 μm (microns); about 30 μm to about 50 μm; about 30 μm to about 100 μm; about 30 μm to about 200 μm; about 50 μm to about 100 μm; about 50 μm to about 200 μm; about 75 μm to about 150 μm; about 75 μm to about 200 μm; about 100 μm to about 225 μm; about 100 μm to about 225 μm or about 100 μm to about 250 μm.

First particles may be incorporated into binders at various ratios depending on the binder composition and the first particle's properties. In some embodiments, the first particles may have a content range selected from: about 1% to about 50%; from about 2% to about 40%; from about 4% to about 30%; from about 5% to about 25%; from about 5% to about 35%; from about 10% to about 25%; from about 10% to about 30%; from about 10% to about 40%; from about 10% to about 45%; from about 15% to about 25%; from about 15% to about 35%; from about 15% to about 45%; from about 20% to about 30%; from about 20% to about 35%; from about 20% to about 40%; from about 20% to about 45%; from about 20% to about 55%; from about 25% to about 40%; from about 25% to about 45%; from about 25% to about 55%; from about 30% to about 40%; from about 30% to about 45%; from about 30% to about 55%; from about 30% to about 60%; from about 35% to about 45%; from about 35% to about 50%; from about 35% to about 60%, or from about 40% to about 60% on a weight basis.

In some embodiments, where the first particles comprises or consist of glass spheres, the first particles may be present in a content range selected from: about 30% to about 40%; from about 30% to about 45%; from about 35% to about 45%; or from about 35% to about 50% on a weight basis. In other embodiments where the first particles are a polyethylene or modified polyethylene, the particle may be present in a content range selected from: 35% to about 45%; from about 35% to about 50%; or from 35% to about 50% on a weight basis.

First particles may have a size range selected from: about 1 μm to about 225 μm (microns); 30 μm to about 225 μm (microns); about 25 μm to about 50 μm; about 30 μm to about 50 μm; about 10 μm to about 100 μm; about 10 μm to about 200 μm; about 20 μm to about 200 μm; about 30 μm to about 100 μm; about 30 μm to about 200 μm; about 50 μm to about 100 μm; about 50 μm to about 200 μm; about 75 μm to about 150 μm; about 75 μm to about 200 μm; or about 100 μm to about 225 μm.

In one embodiment first particles have an average size in a range selected from: about 1 μm to about 225 μm (microns); greater than about 5 μm to about 50 μm; about 10 μm to about 100 μm; about 10 μm to about 200 μm; about 20 μm to about 200 μm; about 30 μm to about 100 μm; about 30 μm to about 200 μm; about 50 μm to about 100 μm; about 50 μm to about 200 μm; about 75 μm to about 150 μm; about 75 μm to about 200 μm; about 100 μm to about 225 μm; or about 125 μm to about 225 μm. In another embodiment, the coatings may contain first particles in the above-mentioned ranges subject to either the proviso that the coatings do not contain only particles (e.g., first or second particles) with a size of 25 microns or less, or the proviso that the coatings do not contain particles with a size of 25 microns or less.

In another embodiment, first particles have an average size greater than 30 microns and less than 250 microns, and do not contain non-trivial amounts of particles (e.g., first and second particles) with a size of 30 microns or less. And in still another embodiment, the coatings do not contain only particles (e.g., first and second particles) with a size of 50 microns or less, or particles with an average size of 50 microns or less in non-trivial amounts.

The incorporation of first particles can lead to a surface that is textured due to the presence of the first particles. In such embodiments, the presence of the first particles results in a surface texture that has elevations on the level of the coating formed. The height of the elevations due to the presence of the first particles can be from 0 (where the first particle is just below the line of the binders surface) to a point where the first particles are almost completely above the level of the binder coating (although they may still be coated with binder). Thus, the presence of first particles can result in a textured surface wherein the first particles cause elevations in the binder that have maximum heights in a range selected from: from about 10 to about 80 microns; from about 15 to about 80 microns; from about 20 to about 100 microns; from 30 to 70 microns; or from about 1 to 50 microns.

The surface texture of coatings may also be assessed using the arithmetical mean roughness (Ra) or the ten point mean roughness (Rz) as measure of the surface texture. In an embodiment, a coating described herein has an arithmetical mean roughness (Ra) in a range selected from: about 0.2 microns to about 20 microns; from about 0.3 microns to about 18 microns; from about 0.2 microns to about 8 microns; from about 8 microns to about 20 microns; or from about 0.5 microns to about 15 microns. In another embodiment, a coating as described herein has a ten point mean roughness (Rz) in a range selected from: about 1 micron to about 90 microns; from about 2 microns to about 80 microns; from about 3 microns to about 70 microns; from about 1 micron to about 40 microns; from about 40 microns to about 80 microns; from about 10 microns to about 65 microns; or from about 20 microns to about 60 microns.

First particles may optionally comprise moieties that make them hydrophobic or superhydrophobic and/or oleophobic. Where it is desirable to introduce such moieties the particles may be reacted with reagents that covalently bind moieties that make them hydrophobic, superhydrophobic, or oleophobic. In some embodiments, the reagents may be silanizing agents, such as those that introduce alkyl, haloalkyl, fluoroalkyl or perfluoroalkyl moieties (functionalities). In some embodiments the silanizing agents are compounds of formula (I) (i.e., $R_{4-n}Si{-}X_n$), and the various embodiments of compounds of formula (I) described below for the treatment of second particles. The surface of many types of first particles can be activated to react with silanizing agents by various treatments including exposure to acids, bases, plasma, and the like, where necessary to achieve functionalization of the particles.

In any embodiment described herein, first particles may be employed that do not contain functional groups that impart one or more of hydrophobic, superhydrophobic, and/or oleophobic properties to the particles (e.g., properties beyond the properties inherent to the composition forming the particles). In one such embodiment, first particles do not contain covalently bound alkyl, haloalkyl, fluoroalkyl or perfluoroalkyl functionalities (moieties). In another such embodiment the first particles are not treated with a silanizing agent (e.g., a compound of formula (I)).

4.0 SECOND PARTICLES

A variety of second particles can be used to prepare the durable coatings displaying HP/OP properties. Suitable second particles have a size from about 1 nanometers (nm) to 25 microns and are capable of binding covalently to one or more chemical groups (moieties) that provide the second particles, and the coatings into which they are incorporated, one or more of hydrophobic, oleophobic and anti-icing properties.

In some embodiments the second particles may have an average size in a range selected from about 1 nm to about 100 nm; about 10 nm to about 200 nm; about 20 nm to about 400 nm; about 10 nm to about 500 nm; about 40 nm to about 800 nm; about 100 nm to about 1 micron; about 200 nm to about 1.5 microns; about 500 nm to about 2 microns; about 500 nm to about 2.5 microns; about 1.0 micron to about 10 microns; about 2.0 microns to about 20 microns; about 2.5 microns to about 25 microns; about 500 nm to about 25 microns; about 400 nm to about 20 microns; or about 100 nm to about 15 microns.

In one embodiments, such as where the second particles are prepared by fuming (e.g., fumed silica or fumed zinc oxide), the second particles may have an average size in a range selected from about 1 nm to about 50 nm; about 1 nm to about 100 nm; about 1 nm to about 400 nm; about 1 nm to about 500 nm; about 2 nm to about 120 nm; about 5 nm to about 150 nm; about 5 nm to about 400 nm; about 10 nm to about 300 nm; or about 20 nm to about 400 nm.

Second particles having a wide variety of compositions may be employed in the durable coatings described herein. In some embodiments the second particles will be particles of metal oxides (e.g., aluminum oxides, zinc oxides, nickel oxide, zirconium oxides, iron oxides, or titanium dioxide) such as alumina, or oxides of metalloids (e.g., oxides of B, Si, Sb, Te and Ge) such as silicates (e.g., fumed silica) or particles comprising one or more metal oxides, oxides of metalloids or combination thereof, such as second particles of glasses. The particles are treated to introduce one or more moiety (group) that imparts HP/OP properties to the particles either prior to incorporation into the compositions that will be used to apply coatings or after they are incorporated into the coatings. In one embodiment, second particles are treated with silanizing agents to incorporate groups that will give the particles HP/OP properties.

In one embodiment second particles are silica (silicates), alumina (e.g., $Al_2O_3$), a titanium oxide, or zinc oxide, that are optionally treated with a silanizing agent.

In another embodiment, the second particles are comprised of fumed silica; and in a further embodiment, the second particles are comprised of fumed silica and have an average size in the range of 1 nm to 100 nm or 2 nm to 200 nm; wherein the silica is optionally treated with a silanizing agent.

In yet another embodiment second particles are comprised of one or more metals, metal oxides (e.g., zinc oxide, titanium dioxide, $Al_2O_3$), metalloids (e.g., B, Si, Sb, Te and Ge), oxides of a metalloid (e.g., $SiO_2$ and silicates), or glasses. In such an embodiment the one or more independently selected second particles have average sizes in ranges independently (separately) selected from about 1 nm to about 100 nm; about 10 nm to about 200 nm; about 20 nm to about 400 nm; about 10 nm to about 500 nm; about 40 nm to about 800 nm; about 100 nm to about 1 micron; about 200 nm to about 1.5 microns; about 500 nm to about 2 microns; about 500 nm to about 2.5 microns; about 1.0 micron to about 10 microns; about 2.0 microns to about 20 microns; about 2.5 microns to about 25 microns; about 500 nm to about 25 microns; about 400 nm to about 20 microns; or about 100 nm to about 15 microns. Second particles in such an embodiment may be employed in coatings prepared using thermal spray processes.

In any of the above-mentioned embodiments, the lower size of second particles may be limited to particles greater than 20 nm, 25 nm, 30 nm, 35 nm, 40 nm, 45 nm, 50 nm, or 60 nm. Similarly, in any of the above-mentioned embodiments, the upper size of second particles may be limited to particles less than 20, 10, 5, 1, 0.8, 0.6, 0.5, 0.4, 0.3 or 0.2 microns. Limitation on the upper and lower size of second particles may be used alone or in combination with any of the above-recited size limits on particle composition, percent composition in the coatings, etc.

4.1 Hydrophobic and Oleophobic Components of Second particles

Second particles employed in the preparation of the durable coatings described herein comprise one or more independently selected chemical groups (moieties or functionalies) that impart HP/OP properties to provide the second particles, and the coatings into which they are incorporated. Second particles typically will be treated with agents that introduce such moieties before being incorporated into the durable coatings described herein, however, it is also possible to treat the coating after it is applied to a surface with agents that modify the second particles and introduce or more of hydrophobic, superhydrophobic or oleophobic properties. In such circumstances, other components of the coating (e.g., the binder or first particles) may also become modified by the agent.

In some embodiments, the second particles will be treated with an agent that introduces one or more hydrophobic, superhydrophobic or oleophobic properties.

In another embodiment the second particles will bear one or more alkyl, haloalkyl, fluoroalkyl, and perfluoroalkyl moieties. Such moieties can be covalently bound directly or indirectly bound to the second particle, such as through one or more intervening silicon or oxygen atoms.

In still another embodiment the second particles will bear one or more alkyl, fluoroalkyl, and perfluoroalkyl moieties of the formula $R_{4-n}Si$—, where n is from 1-3, that are directly or indirectly bound (e.g., covalently bound) to the second particle, such as through one or more intervening atoms.

4.1.1 The Use of Silanizing Agents

A variety of silanizing agents can be employed to introduce $R_{4-n}Si$—, moieties into second particles prior or subsequent to their introduction into the durable coatings described herein. Suitable silanizing agents have both leaving groups and terminal functionalities. Terminal functionalities are groups that are not displaced by reaction of a silanizing agent with silica second particles (e.g., R groups of compounds of the formula (I)). Leaving groups are those groups that are displaced from silanizing agents upon reaction to form bonds with the second particles.

Prior to reacting first or second particles with silanizing agents, the particles may be treated with an agent that will increase the number of sites available for reaction with the silanizing agent (e.g., $SiCl_4$, $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$ and the like). Treatment with such agents is conducted with a 1% to 5% solution of the agent in a suitable solvent (e.g., hexane), although higher concentrations may be employed (e.g., 5% to 10%). Subsequent reaction with silanizing agents is typically conducted using a silanizing agent at in the range of 1%-2% w/v, although concentrations in the range of 2%-5% w/v may also be used. Depending on the reagents employed, the reaction, which can be conducted at room temperature, can are typically conducted for 1 hour to 6 hours, although reaction for as long as 24 hours may be desirable in some instances.

In one embodiment, silanizing agents are compounds of the formula (I):

$$R_{4-n}Si—X_n \quad (I)$$

where n is an integer from 1-3;
each R is independently selected from
  (i) alkyl or cycloalkyl group optionally substituted with one or more fluorine atoms,
  (ii) $C_{1\ to\ 20}$ alkyl optionally substituted with one or more independently selected substituents selected from fluorine atoms and $C_{6-14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iii) $C_{6\ to\ 20}$ alkyl ether optionally substituted with one or more substituents independently selected from fluorine and $C_{6-14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iv) $C_{6-14}$ aryl, optionally substituted with one or more substituents independently selected from halo or alkoxy, and haloalkoxy substituents;
  (v) $C_{4\ to\ 20}$ alkenyl or $C_{4\ to\ 20}$ alkynyl, optionally substituted with one or more substituents independently selected from halo, alkoxy, or haloalkoxy; and
  (vi) —Z—$((CF_2)_q(CF_3))_r$, wherein Z is a $C_{1-12}$ divalent alkane radical or a $C_{2-12}$ divalent alkene or alkyne radical, q is an integer from 1 to 12, and r is an integer from 1-4;
each X is independently selected from —H, —Cl, —I, —Br, —OH, —$OR^2$, —$NHR^3$, or —$N(R^3)_2$;
each $R^2$ is independently selected $C_{1\ to\ 4}$ alkyl or haloaklyl group; and
each $R^3$ is independently an independently selected H, $C_{1\ to\ 4}$ alkyl or haloalkyl group.

In one embodiment, R is an alkyl or fluoroalkyl group having from 6 to 20 carbon atoms.

In another embodiment, R is an alkyl or fluoroalkyl group having from 8 to 20 carbon atoms.

In another embodiment, R is an alkyl or fluoroalkyl group having from 10 to 20 carbon atoms.

In another embodiment, R is an alkyl or fluoroalkyl group having from 6 to 20 carbon atoms and n is 3

In another embodiment, R is an alkyl or fluoroalkyl group having from 8 to 20 carbon atoms and n is 3

In another embodiment, R is an alkyl or fluoroalkyl group having from 10 to 20 carbon atoms and n is 3.

In another embodiment, R has the form —Z—$((CF_2)_q(CF_3))_r$, wherein Z is a $C_{1-12}$ divalent alkane radical or a $C_{2-12}$ divalent alkene or alkyne radical, q is an integer from 1 to 12, and r is an integer from 1-4.

In any of the previously mentioned embodiments of compounds of formula (I) the value of n may be varied such that 1, 2 or 3 independently selected terminal functionalities are present in compounds of formula (I). In one embodiment, n is 3. In another embodiment, n is 2, and in still another embodiment n is 1.

In any of the previously mentioned embodiments of compounds of formula (I), all halogen atoms present in any one or more R groups may be fluorine atoms in some embodiments.

In any of the previously mentioned embodiments of compounds of formula (I), X may be independently selected from H, Cl, —$OR^2$, —$NHR^3$, —$N(R^3)_2$, or combinations thereof in some embodiments. In another, embodiment, X may be selected from Cl, —$OR^2$, —$NHR^3$, —$N(R^3)_2$, or combinations thereof. In still another embodiment, X may be selected from, Cl, —$NHR^3$, —$N(R^3)_2$ or combinations thereof.

Any durable coating described herein may be prepared with one, two, three, four or more compounds of formula (I) employed alone or in combination to modify the first or second particle, and or other components of the coating (e.g., first particles and binder).

The use of silanizing agents of formula (I) to modify first or second particles or any of the other components of the coatings or coating compositions will introduce one or more $R_{3-n}X_nSi$— groups (e.g., $R_3Si$—, $R_2X_1Si$—, or $RX_2Si$— groups) where R and X are as defined for a compound of formula (I), n is 0, 1, or 2 (due to the displacement of at least one "X" substitutent and formation of a bond between the particle and the Si atom), and the bond with the particle is the silcon atom is indicated by a dash "-" (e.g., $R_3Si$—, $R_2X_1Si$—, or $RX_2Si$— groups).

In another embodiment, specific reagents that can be employed to prepare first or second particles with hydrophobic, superhydrophobic, or oleophobic properties include silanizing agents (e.g., compounds that are commercially available from Gelest, Inc., Morrisville, Pa.). Such silanizing agents include, but are not limited to, the following compounds, which are identified by their chemical name followed by the commercial supplier reference number (e.g., their Gelest reference in parentheses): (tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl) dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO6645.0); n-octyltriethoxysilane (SIO6715.0); and nonafluorohexyldimethyl(dimethylamino)silane (SIN6597.4).

The two attributes of silanizing agents important for the purposes of forming suitable first or second particles are the leaving group (e.g., X groups of compounds of the formula (I)) and the terminal functionality (e.g., R groups of compounds of the formula (I)). Silanizing agent leaving groups determine the reactivity of the agent with the first or second particle. Where, the first or second particles are a silicate (e.g., fumed silica) the leaving group can be displaced to form Si—O—Si bonds. The terminal functionality determines the level of hydrophobicity that results from application of the silane to the surface. Leaving group effectiveness is ranked in the decreasing order as chloro>methoxy>hydro (H)>ethoxy (measured as trichloro>trimethoxy>trihydro>triethoxy). This ranking of the leaving groups is consistent with their bond dissociation energy.

In addition to the silanizing agents recited above, a variety of other silanizing agents can be used to alter the properties of first or second particles and to provide hydrophobic, superhydrophobic or oleophobic properties. In some embodiments second particles may be treated with an agent selected from dimethyldichlorosilane, hexamethyldisilazane, octyltrimethoxysilane, polydimethylsiloxane, or tridecafluoro-1,1,2,2-tetrahydrooctyl trichlorosilane. In further embodiments, the first or second particles are silica second particles. Silica second particles treated with such agents may have an average size in a range selected from: about 1 nm to about 50 nm; about 1 nm to about 100 nm; about 1 nm to about 400 nm; about 1 nm to about 500 nm; about 2 nm to about 120 nm; about 5 nm to about 150 nm; about 5 nm to about 400 nm; about 10 nm to about 300 nm; about 20 nm to 400 nm; or about 50 nm to 250 nm.

In addition to the silanizing agents recited above, which can be used to modify any one or more components of coatings (e.g., first and/or second particles) other silanizing agents can be employed including, but not limited to, one or more of: gamma-aminopropyltriethoxysilane, Dynasylan® A (tetraethylorthosilicate), hexamethyldisilazane, and Dynasylan® F 8263 (fluoroalkysilane), any one or more of which may be used alone or in combination with any other silanizing agent recited herein.

A variety of agents can be employed to introduce hydrophobic or oleophobic behavior into the coatings described herein. However, the use of agents to introduce alkyl functionalities (e.g., silanizing agents) does not generally prove as effective as their fluorinated or perfluorinated counterparts. The introduction of fluorinated or perfluorinated functionalities typically produce surfaces with the highest hydrophobicity.

4.1.3 Use of Compounds Other than Silanizing Agents

Other agents t can be used to introduce hydrophobic, superhydrophobic or oleophobic moieties into second particles. The choice of such agents will depend on the functionalities available for forming chemical (covalent) linkages between hydrophobic/oleophobic component and the functional groups present on the second particles surface. For example, where second particle surfaces have, or can be modified to have, hydroxyl or amino groups, then acid anhydrides and acid chlorides of alkyl, fluoroalkyl, and perfluoroalkyl compounds may be employed (e.g., the acid chlorides: Cl—C(O)(CH$_2$)$_{4-18}$CH$_3$; Cl—C(O)(CH$_2$)$_{4-10}$(CF$_2$)$_{2-14}$CF$_3$; Cl—C(O)(CF$_2$)$_{4-18}$CF$_3$ or the anhydrides of those acids).

4.1.4 Preparation of Surfaces with Oleophobic Properties.

In addition to the hydrophobicity displayed against aqueous based solutions, suspension, and emulsions, and the anti-icing properties of the coatings described herein, the coatings described herein also have the ability to display oleophobic behavior. This is true particularly where the coatings comprise fluorinated or perfluorinated alkyl groups (e.g., where the terminal functionality, that is the R group(s) of a silane of the formula R$_{4-n}$Si—X$_n$ are fluorinated alkyl or perfluoroalkyl. Coatings comprising fluorinated or perfluorinated alkyl groups (e.g., as functionalities on second particles) can also be used to form spill-resistant borders that display the ability to retain oils, lipids and the like.

4.1.5 Sources of Second Particles

Second particles such as fumed silica may be purchased from a variety of suppliers, including but not limited to: Cabot Corp., Billerica, Mass. (e.g., Nanogel TLD201, CAB-O-SIL® TS-720, and M5 (untreated silica)): Evonik Industries, Essen, Germany (e.g., ACEMATT® silica such as untreated HK400, AEROXIDE® TiO$_2$ titanium dioxide, AEROXIDE® alumina).

Some commercially available second particles are set forth in the accompanying scheme.

| CAB-O-SIL Grade | Surface Treatment | Level of Treatment | Nominal BET Surface Area of Base Silica (m$^2$/g) |
|---|---|---|---|
| M-5 | None | None | 200 |
| TS-610 | Dimethyldichlorosilane[b] | Intermediate | 130 |
| TS-530 | Hexamethyldisilazane[b] | High | 320 |
| TS-382 | Octytrimethoxysilane[b] | High | 200 |
| TS-720 | Polydimethylsilioxane[b] | High | 200 |

[a]Data from Cabot Corp. website.

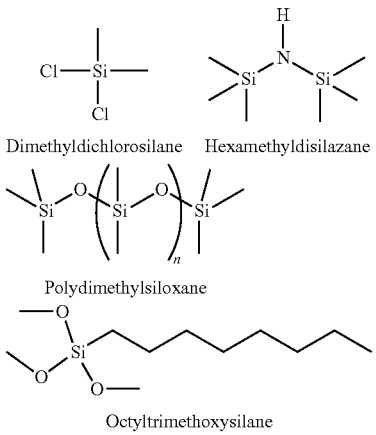

Dimethyldichlorosilane   Hexamethyldisilazane

Polydimethylsiloxane

Octyltrimethoxysilane

As purchased the second particles may be untreated (e.g., M5 silica) and may not posses any HP/OP properties. Such untreated particles can be treated to covalently attach one or more groups or moieties to the particles that give them HP/OP properties with, for example, silanizing agents discussed above.

5.0 SUBSTRATES

Durable hydrophobic/superhydrophobic coatings can be applied to any surface to which a binder can adhere. The surfaces may be flexible or rigid. In some embodiments the surface can be made from a material selected from glass, metal, metalloid, ceramic, wood, plastic, resin, rubber, stone, concrete or a combination thereof. In another embodiment the surface may be made from a material selected from the group consisting of glass, ceramic and a combination thereof. In other embodiments, the surfaces may be comprised of metalloids (e.g., B, Si, Sb, Te and Ge).

Any glass can be employed as a substrate for durable hydrophobic or superhydrophobic coatings including, without limitation: soda lime glass, borosilicate glass, sodium borosilicate glass, aluminosilicate glass, aluminoborosilicate glass, optical glasses, lead crystal glass, fused silica glass, germania glasses, and germanium selenide glasses, and combinations thereof.

Any metal can be employed as a substrate for durable hydrophobic or superhydrophobic coatings including, without limitation: iron, nickel, chrome, copper, tin, zinc, lead, magnesium, manganese, aluminum, titanium silver, gold, and platinum or combinations thereof, or alloys comprising those metals. In one embodiment, the metal forming the surface comprises steel or stainless steel. In another embodiment, the metal used for the surface is chromium, is plated with chromium, or comprises chromium or a chromium coating.

Any ceramic can be employed as a substrate for durable hydrophobic or superhydrophobic coatings including, without limitation: earthenware (typically quartz and feldspar), porcelain (e.g., made from kaolin), bone china, alumina, zirconia, and terracotta. For the purpose of this disclosure, a glazing on a ceramic may be considered either as a ceramic or a glass.

Any wood can be employed as a substrate for durable hydrophobic or superhydrophobic coatings including, without limitation, hard and soft woods. In some embodiments, woods may be selected from alder, poplar, oak, maple, cherry apple, walnut, holly, boxwood, mahogany, ebony teak, luan, and elm. In other embodiments woods may be selected from ash, birch, pine, spruce, fir, cedar, and yew.

Any plastic or resin can be employed as a substrate for durable hydrophobic or superhydrophobic coatings including, without limitation polyolefins (such as a polypropylene and polyethylene), a polyvinylchloride plastics, a polyamides, a polyimides, a polyamideimides, a polyesters, aromatic polyesters, polycarbonates, polystyrenes, polysulfides, polysulfones, polyethersulfones, polyphenylenesulfides, a phenolic resins, polyurethanes, epoxy resins, a silicon resins, acrylonitrile butadiene styrene resin/plastic, methacrylic resins/plastics, acrylate resins, polyacetals, polyphenylene oxides, polymethylpentenes, melamines, alkyd resins, polyesters or unsaturated polyesters, polybutylene terephthlates, combinations thereof, and the like.

Any rubber can be employed as a substrate for durable hydrophobic or superhydrophobic coatings including, without limitation: styrene-butadiene rubber, butyl rubber, nitrile rubber, chloroprene rubber, polyurethane rubber, silicon rubber, and the like.

Any type of stone, concrete, or combination thereof can be employed as a substrate for durable hydrophobic or superhydrophobic coatings including, without limitation, igneous, sedimentary and metamorphic stone (rock). In one embodiment the stone is selected from granite, marble, limestone, hydroxylapatite, quartz, quartzite, obsidian and combinations thereof. Stone may also be used in the form of a conglomerate with other components such as concrete and/or epoxy to form an aggregate that may be used as a surface upon which a durable hydrophobic coating may be applied.

6.0 APPLICATION OF COATINGS TO SUBSTRATES

The coatings described herein can be applied to surfaces using any means known in the art, including but not limited to, brushing, painting, printing, stamping, rolling, dipping, spin-coating, spraying, or electrostatic spraying. Generally, the surfaces will be rigid or semi-rigid, but the surfaces can also be flexible, for example in the instance of wire and tapes or ribbons.

The coatings described herein can be applied to virtually any substrate to provide HP/OP properties. The choice of coatings and coating process that will be used may be affected by the compatibility of the substrate and its surface to the coating process and the component of the coating compositions. Among the considerations are the compatibility of the substrate and its surface with any solvents that may be employed in the application of the coatings and the ability of a desired coating to adhere to the substrate's surface. In addition, where the coating process will expose the substrate, and especially its surface, to heating (e.g., where binders are thermoplastics, thermoset plastics, or where thermal spraying is employed) the ability to withstand the effects of temperature are considerations that must be taken into account.

Coatings may take any desired shape or form, limited only by the manner and patterns in which they can be applied. In some embodiments, the coating will completely cover a surface. In other embodiments the coatings will cover only a portion of a surface, such as one or more of a top, side or bottom of an object. In one embodiment, a coating is applied as a line or strip on a substantially flat or planar surface. In such an embodiment the line or strip may form a spill-resistant border (see e.g., Example 18).

The shape, dimensions and placement of coatings on surfaces can be controlled by a variety of means including the use of masks which can control not only the portions of a surface that will receive a coating, but also the portions of a surface that may receive prior treatments such as the application of a primer layer or cleaning by abrasion or solvents. For example, where sand blasting or a chemical treatment is used to prepare a portion of a surface for coating, a mask resistant to those treatments would be selected (e.g., a mask such as a rigid or flexible plastic, resin, or rubber/rubberized material). Masking may be attached to the surface through the use of adhesives, which may be applied to the mask agent, the surface, or both.

In another embodiment a coatings applied to a ribbon, tape or sheet that may then be applied to a substrate by any suitable means including adhesive applied to the substrate, the ribbon or tape, or both. Ribbons, tapes and sheets bearing a superhydrophobic coating may be employed in a variety of application, including forming spill proof barriers on surfaces (see e.g., Example 18). Ribbons, tapes, and sheets of coated material may be made from any flexible substrate. Ribbons, tapes, and sheets are generally formed of a substantially flat (planar) flexible material where one side (the top) is made hydrophobic or superhydrophobic. This includes metal tapes such as aluminum tape or other tapes (e.g., metal adhesive tape, plastic adhesive tape, paper adhesive tape, fiber glass adhesive tapes), wherein one side is coated with an HP/OP coating and adhesive on the other side. Such ribbons, tapes, and sheets can be applied to any type of surface including metal, ceramic, glass, plastic, or wood surfaces, for a variety of purposes.

To improve the adherence of coatings to a surface, the surface may be treated or primed such as by abrasion, cleaning with solvents or the application of one or more undercoatings of primers. In some embodiments where metals can be applied to surfaces (e.g., by electroplating, vapor deposition, or dipping) and it is deemed advantageous, surfaces maybe coated with metals prior to the application of a coating described herein.

6.1 One-Step Coating Applications

In some embodiments, the coatings may be applied using methods wherein binder, first particles, and second particles are mixed prior to the application of the coating composition to the surface. For the purpose of this disclosure, such methods are termed one-step methods or processes.

In one embodiment, a one-step process of applying a coating to a substrate may comprise:
applying to the substrate a coating composition comprising (i) a binder; (ii) first particles having a size of about 30 microns to about 225 microns; and (iii) second particles having a size of about 1 nanometer to 25 microns and optionally comprising one or more independently selected alkyl, haloalkyl, fluoroalkyl, or perfluoroalkyl groups covalently bound, either directly or indirectly, to said second particles; wherein said composition optionally contains 5% to 10% of a block copolymer on a weight basis.

In one-step methods the binders, first particles, second particles and silanizing agents described above may be employed. First particles may be less than 30 microns, and may be particles with an average size in the range of about 1 μm to about 225 μm as described above.

In one embodiment, coatings are prepared in a one step process with fumed silica second particles (TS-720), where the second particles are present in the range of 10-15% on a weight basis in the coating. In another embodiment, coatings are prepared in a one step process with fumed silica second particles treated with SIT8174), where the second particles are present in the range of 10-15% on a weight basis in the coating. In such embodiments, prior to treatment with silanizing agents such as SIT8174, the silica may be treated with $SiCl_4$, $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$ to increase the modification by the silanizing agent, Although coatings applied by one-step processes do not necessarily require subsequent treatments in order to create coatings with the HP/OP properties described herein, they may be subject to subsequent treatments. Such treatments may enhance, for example, one or more of the hydrophobicity, superhydrophobicity, oleophobicity or anti-icing properties, and may be made either before or after curing (e.g., by heating) the coatings applied using a one-step process.

In one embodiment, a one-step process may further comprise applying a composition comprising a silanizing agent (e.g. a compound of formula (I)). In another embodiment, a one-step process may further comprise applying a composition comprising a silicon containing reagent that can increase the number of site that can react with silanizing agents, followed by a composition containing a silanizing agent. Reagents that will increase the number of sites on silica particles and other components of coatings that can react with silanizing agents include, but are not limited to: $SiCl_4$, $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$. Where those reagents contain chlorine, they may react with water or moisture to convert residual Cl, bound to Si atoms that is not displaced in the reaction with the coating components, into SiOH groups, which in addition to other groups, may also subsequently react with a silanizing agent.

In another embodiment, a one-step process may further comprise applying a composition comprising one or more second particles over the coating formed in the one step process. In such embodiments, the second particles can be applied to the coating formed in the one step process in a suitable binder compatible solvent (e.g., hexane in many instances). The second particles (e.g., TS-720 or TLD-720, or TLD201) may be suspended in a suitable solvent in a concentration range (e.g., 2% to 10%; 4% to 12%; 5%-15%, or 5% to 20% w/v) for application to the coating.

In an embodiment where the coating applied to a substrate in a one-step process did not contain second particles treated so that they are hydrophobic, superhydrophobic, or oleophobic (i.e., have HP/OP properties), the one step process can further comprise applying a composition comprising either: a silanizing agent; or a composition comprising a silicon containing reagent that will increase the number of sites that can react with silanizing agents, followed by a composition containing a silanizing agent.

In another embodiment, where the coating applied in a one-step process does not contain second particles treated so that they are hydrophobic, superhydrophobic, oleophobic, the one step process can further comprise applying one or more second particles treated so that they are hydrophobic, superhydrophobic, or oleophobic. In such an embodiment, the second particles may comprise one or more independently selected alkyl, haloalkyl, or perfluoroalkyl groups.

6.1.1 Block Copolymers

A wide variety of block copolymers may be employed in the one and two step coating systems described herein. Where they are employed, they are typically present in a range selected from: of 1% to 15%, 1% to 3%, 1% to 5%, 6%-10% 5, or 11% to 15% by weight. The block copolymers may be one or more of hydrophobic block copolymers, diblock copolymers, triblock copolymers, tetrablock copolymers and combinations thereof.

Block copolymers may be prepared or purchased from a variety of sources. For example Kraton.® D series block copolymers are available from Shell Chemical Company (Houston, Tex.), Europrene® Sol T block copolymers are available from EniChem (Houston, Tex.), Vector® block copolymers are available from Exxon (Dexco) (Houston, Tex.), and Solprene® block copolymers from Housmex® (Houston, Tex.).

6.2 Two Step Coating Processes

In some embodiments, the coatings may be applied using methods where, in a first step, a binder and first particles are mixed to form a coating composition, which does not contain the second particles, prior to the application of the coating composition to the surface. Following the application of that coating composition, a second step is conducted wherein a composition comprising second particles is applied to the surface over the coating composition. For the purpose of this disclosure, such methods are termed two-step method or processes.

The second step may be conducted either before or after curing the coating composition applied in the first step. In one embodiment, the composition comprising second particles is applied after any solvents in the coating composition have evaporated, but before the composition has been cured. In another embodiment, the composition comprising second particles is applied after the coating composition has been cured.

In one embodiment, a two-step process of applying a coating to a substrate may comprise the steps:

a) applying to said substrate a coating composition comprising (i) a binder and (ii) first particles having a size of about 30 microns to about 225 microns, to provide a substrate coating; and b) applying to said substrate coating a composition comprising second particles having a size of about 1 nanometer to 25 microns that optionally comprise one or more independently selected alkyl, haloalkyl or perfluoroalkyl groups covalently bound, either directly or indirectly, to said second particles.

In two-step methods the binders, first particles, second particles and silanizing agents described above may be employed. First particles may be less than 30 microns, and may be particles with an average size in the range of about 1 μm to about 225 μm as described above.

Although coatings applied by two-step processes do not necessarily need to undergo subsequent treatments in order to create coatings with the HP/OP properties described herein, they may be subject to subsequent treatments. Such treatments may enhance, for example, one or more of the hydrophobicity, superhydrophobicity, oleophobicity or anti-icing properties, and may be made either before or after curing (e.g., by heating) the coatings applied using a two-step process.

In one embodiment, a two-step process may further comprise applying: a composition comprising either: a silanizing agent (e.g. a compound of formula (I). In another embodiment, a two-step process may further comprise applying a composition comprising a silicon-containing reagent that will increase the sites that can react with silanizing agents, followed by a composition containing a silanizing agent. Reagents that will increase the number of sites on silica particles and other components of coatings that can react with silanizing agents include, but are not limited to: $SiCl_4$, $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$.

Where the coating applied in a two-step process does not contain second particles treated so that they are hydrophobic, superhydrophobic, or oleophobic (i.e., have HP/OP properties), the two-step process can further comprise applying a composition comprising either a silanizing agent or a composition comprising silicon containing reagent that will increase the number of sites that can react with silanizing agents followed by a composition containing a silanizing agent.

6.3 Thermal Deposition Processes.

Thermal spray processes including Plasma Spraying, Warm Spraying Wire Arc Spraying, High Velocity Oxyfuel (HOVF), Rockide® process, and Twin-Arc spraying may be employed to prepare coatings that have one or more of hydrophobic, superhydrophobic, oleophobic, or anti-icing characteristics. Thermal spray coating processes as used herein are a form of a two-step coating process in which a base coat material is applied to the substrate, alone or in combination with a second particle.

In one embodiment, a thermal deposition process for applying a coating to a substrate may comprise the steps:
a) applying to said substrate by a thermal spray process a base coating spray composition optionally comprising first particles having a size of about 1 micron to about 100 microns, to provide a base coating; and
b) applying to said base coating one or more of: (i) a composition comprising one or more second particles having a size of about 1 nanometer to 25 microns that optionally comprise one or more independently selected alkyl, haloalkyl or perfluoroalkyl groups covalently bound, either directly or indirectly, to said second particles; (ii) a composition comprising one or more silanizing agents, or (iii) a composition comprising a silicon-containing reagent that increases the number of sites on silica particles or other components of thermal spray coatings that can react with silanizing agents, followed by a composition comprising a silanizing agent.

Due to the high temperature, oxidizing conditions, and the composition of the base coating spray composition, the base coating will contain a variety of functionalities that may be modified to impart HP/OP characteristics to the coating. The base coat can be treated as in step (b) to produce surfaces with water contact angles measured at room temperature of about 120° to about 170°. In some embodiment the contact angle of the surface with water will be in a range selected from about 120° to about 140°, about 130° to about 150°, about 140° to about 160°, or about 150° to about 170°.

In one embodiment the thermal spray process is selected from High Velocity OxyFuel (HOVF) and Twin-Arc spray. The size of the first particles that may be applied in a base coating spray composition varies depending on the thermal spray process employed. For HVOF, first particles have a size in a range selected from: about 1 to about 75 microns, or about 5 to about 50 microns, or about 25 microns to 70 microns, or about 10 to about 40 microns. For plasma spray processes the particles are typically in the range of about 15 microns to about 45 microns, and for combustion processes, the range is from about 45 microns to about 100 microns. Thermal spraying using the Rockide® process, where particles to be sprayed are prepared in the form of ceramic rods and thermal spraying employing Twin-Arc Processes, which spray metallic materials feed in the form of a wire are less sensitive to the starting particle sizes.

In one embodiment the base coating spray composition comprises one or more metals, metal alloys, metal oxides, metalloids, metalloid oxides, carbides (e.g., SiC) or nitrides (e.g., $Si_3N_4$). In another embodiment, the base coating spray composition comprises one or more metals in combination with one or more metal oxides, metalloid oxides or carbides. In an embodiment, the base coating spray composition comprises one or more of: zirconia, $Al_2O_3$, Ni—Cr (e.g., 80%-20%), stainless steel (e.g., a 316 stainless), tungsten carbide/cobalt, chromium carbide/nickel and nickel/aluminum.

In an embodiment, one or more independently selected carbides, silicates, metal oxides or metalloid oxides can be bonded to, or impregnated into, the surface of a substrate using thermal spray processes as a base coat. In another embodiment, one or more independently selected compositions comprising: a silicate (e.g., silica); zirconia ($ZrO_2$), alumina ($Al_2O_3$), 80%-20% Ni—Cr, 316 Stainless Steel, tungsten carbide/cobalt, chromium oxide, chromium carbide/nickel, and nickel aluminide (IC-50) and the like can be bonded to, or impregnated into, the surface of a substrate to form a base coat using thermal spray deposition. In another embodiment the base coating comprises one or more metals, metal alloys, metal oxides, metalloids, metalloid oxides, carbides or nitrides, in combination with one or more metal oxides, metalloid oxides, or one or more alloys formed by thermal spray deposition. Such base coat compositions may optionally comprise one or more second particles.

Some Compositions that can be Applied by Thermal Spray and the Systems Used for Thermal Spray Application

| Material | Thermal Spray System |
| --- | --- |
| Zirconia stabilized | Rokide gun |
| $Al_2O_3$ | Rokide gun |
| 80-20 Ni—Cr | Rokide gun |
| 316 Stainless steel | HVOF |
| Tungsten carbide/cobalt | HVOF |
| Chromium carbide/nickel | HVOF |
| Nickel aluminide (IC-50) | HVOF |

Where base coating spray compositions comprise one or more independently selected second particles, the particles need to be compatible with the thermal spray process conditions (e.g., the high temperature). In an embodiment, the second particles are comprised of one or more materials independently selected from metals, metal oxides, metalloids, oxides of a metalloid, silicates, or a glass (e.g., silica or alumina)

In an embodiment, the second particles have an average size in a range selected from: about 100 nm to about 50 microns; about 500 nm to about 50 microns; about 500 nm to about 25 microns; about 1 micron to about 50 microns; about 1 micron to about 25 microns; about 5 microns to about 25 microns; about 5 microns to about 50 microns; about 10 microns to about 25 microns; about 10 microns to about 35 microns, or about 10 microns to about 50 microns. In a further embodiment the second particles are particles of silica or alumina.

Once bonded to the substrate, groups present on the surface (including groups on the surface of first or second particles) that are capable of binding functionalities imparting OH/OP properties (e.g., metal or metalloid oxides on the substrate's surface) can subsequently bemodified by the application of reagents (e.g., silanizing agents) that alter the surface properties. In an embodiment, metal or metalloid oxides bound via the thermally bonded materials are modified with silanizing reagents bearing one or more alkyl, haloalkyl, fluoroalkyl, or perfluoroalkyl functionalities to the surface of the coating. Additionally, coatings applied by thermal spray processes may also be modified to increase their HP/OP properties by treatment with second particles bearing one or more functionalities that provide HP/OP properties (e.g., silica particles treated with a silanizing agent such as SIT8174 or polydimethylsiloxane treated fumed silica such as TS-720). It is also possible to use a combination of a silanizing agent and a second particle (e.g., fumed silica second particles untreated or treated with a silanizing agent) to treat the coatings applied by thermal spray processes.

In one embodiment, the silanizing agents are compounds of formula (I) and embodiments thereof describe above.

In another embodiment, the silanizing reagent is selected from tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO6645.0); n-octyltriethoxysilane (SIO6715.0); and nonafluorohexyldimethyl(dimethylamino)silane (SIN6597.4).

In another embodiment, the silanizing reagent may be selected from dimethyldichlorosilane, hexamethyldisilazane, octyltrimethoxysilane, polydimethylsiloxane, or tridecafluoro-1,1,2,2-tetrahydrooctyl trichlorosilane.

In another embodiment the silanizing agent comprises (tridecafluoro-1,1,2,2-tetrahydrooctyl)trichlorosilane (SIT8174.0).

In another embodiment, the second particles applied to thermal spray coated surfaces are treated with one or more agents that provide HP/OP properties. In an embodiment, the agents are selected from compositions comprising one or more silanizing agents of formula I. In other embodiments, the agents are compositions comprising one or more of tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO6645.0); n-octyltriethoxysilane (SIO6715.0); and nonafluorohexyldimethyl(dimethylamino)silane (SIN6597.4). In an embodiment, the second particles applied in step (b) are treated with hexamethyldisilazane, octyltrimethoxysilane, polydimethylsiloxane, or tridecafluoro-1,1, 2,2-tetrahydrooctyl trichlorosilane. In another embodiment, the second particles applied in step (b) are comprised of silica and treated with one or more of hexamethyldisilazane, octyltrimethoxysilane, polydimethylsiloxane, or tridecafluoro-1, 1,2,2-tetrahydrooctyl trichlorosilane. In some embodiments the silane is tridecafluoro-1,1,2,2-tetrahydrooctyl trichlorosilane which may also be used to treat second particles, such as silica particles, and any metal oxides formed in the thermal spray process.

Prior to the application of silanizing agents it is possible to modify the coatings applied by thermal spray processes using a composition comprising a silicon containing reagent that increases the number of sites on silica particles or other components of thermal spray coatings that can react with silanizing agents. In one embodiment silicon containing reagents that increases the number of sites on silica particles comprise one or more of: $SiCl_4$, $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$. The number of sites on silica particles or other components of thermal spray coatings that can react with silanizing agents can also be increased by other treatments including, but not limited to: etching the surfaces with acids such as HF, HCl, $H_2SO_4$ and by electropolishing.

Following application of either or both of a silanizing agent or second particles, the coatings are cured. Curing may be accomplished at room temperature (about 18 to about 22° C.) for 24 hours; however, it may be desirable to use elevated temperatures and/or to adjust the curing time depending on the silane or second particles employed.

Thermal deposition process for applying a coating may be applied to a variety of substrates. Such substrates include, but are not limited to, metals, metalloids, ceramics, and glasses. In some embodiments the surfaces will be in the form of metal plates, metal sheets or metal ribbons.

Depending on the coating composition employed and the application process, deposits formed will have different thicknesses and widths. The material deposited by thermal spray deposition, which consist of flattened splatters or lamellae, are formed by flattening of the liquid droplets andcan have a wide range of dimensions. Individual lamellae often have thickness in the range from a 1 or 2 microns to 40, 60, 80 or even 100 microns. The same lamellae may have widths that range from a 10 microns to 1,000 microns or more.

7.0 PERFORMANCES

The performance of coatings described herein may be measured by any of a variety of means, which are relevant to a coating's ability to perform under a variety of circumstances.

The coatings described herein provide high levels of hydrophobicity, easily reaching into the range of superhydrophobicity as assessed by the contact angle of water with the surface. In addition, the coatings also display oleophobicity, which is most pronounced when fluoroalkly moieties (groups) are employed to introduce hydrophobicity into the coatings.

Coatings described herein have the ability to resist the loss of hydrophobicity when challenged in a mechanical abrasion test. The mechanical durability of the coatings described herein may be assessed in either manual or automated tests (e.g., Taber Abraser testing). Overall, the coatings offer high resistance to the loss of HP/OP properties in manual tests and in tests on a Taber apparatus, with two step application processes using polymeric binder systems out performing one-step processes. Two-step coatings are capable of withstanding more that 5,000 cycles in manual abrasion tests, as compared to several hundred for one-step process and thermal spray processes. Polyurethane compositions with glass second particles (e.g., POLANE binders with glass spheres used as base coat, with a top coating of silica gel (silica nano tubes) treated with $SiCl_4$ and silanized with SIT 8174.0) offer some of the highest resistance to mechanical abrasion-induced loss of HP/OP properties. Mechanical abrasion tests show that such coatings can withstand more than 700 cycles of Taber abrasion testing.

The coating compositions described herein are compatible with a wide variety of surfaces. Moreover, the diversity of the binder systems (e.g., thermal spray, polymeric binders, thermoplastic binders) offers a wide range of properties in addition to hydrophobicity that may be advantageously employed. For example, coatings such a fluoropolymers not only show high resistance to the loss of HP/OP properties in mechanical abrasion tests, but those coating compositions tend to be UV resistant due the stability of the fluoropolymers employed.

The coatings described herein are also stable to environmental conditions including low temperatures, wetting, salt resistance, ice formation and the like, indicating they can be employed, in a variety of harsh environments for purposes such as the prevention of ice formation and accumulation.

In addition to the other forms of compatibility the coating described herein are flexible, which permits coating materials such as cables (e.g., high voltage electric transmission lines), and flexible tapes that can be used in a variety of applications, including rapidly forming spill-resistant barriers on a diversity of surfaces. The coatings are resistant to separation from their substrates even upon repeated heating and cooling or on exposure to liquid nitrogen. Moreover, the coatings also display a significant ability to remain attached to surfaces even when they are bent at temperatures well below freezing (0° C.).

The combination of the durable hydrophobicity, stability under a variety of conditions including exposure to salt water solution, good surface adherence and flexibility, and the ability to reduce drag, demonstrates the suitability of the coatings for high performance coatings on boat hulls. Water droplet contact angle hysteresis measurements suggest the coatings maintain a significant air fraction associated with their surfaces when submerged, which lead to the reduction in drag. Water droplet hysteresis data, along with the air bubble observed on surfaces subject to drag measurements, typically 0.1-0.3 mm in size, suggest the use of bubbler systems to maintain the surface air associated with the coatings to obtain the maximum drag reduction by the coatings, particularly when applied to boat hulls.

8.0 EXEMPLARY APPLICATIONS OF HP/OP SURFACES

The HP/OP properties of the coatings described herein give rise to numerous diverse applications for the coatings, some of which are set forth in the exemplary applications recited below. Applications in addition to those set forth below will be immediately apparent, and as such, the exemplary applications of the coatings are in no way intended to be limiting on the scope of the uses envisioned for the coatings.

The HP/OP properties of the coatings, and particularly their ability to resist the formation and/or adherence of ice to surfaces, gives rise to a variety of uses including, but not limited to:

Electrical transmission wires/cables that are resistant to ice formation and/or accumulation that can increase the weight of the overhead transmission lines and cause sagging or even breakage;

Aircraft wings and air surfaces that are resistant to ice formation and/or accumulation that can restrict the movement wing components (flaps etc.) and other air surfaces, and which can reduce the need for expensive and time-consuming deicing operations;

Helicopter blades that are resistant to ice formation and/or accumulation which can reduce the need to use deicing heaters which can consume fuel and the failure of which requires refurbishing or replacing of the helicopter blades;

Valves used to Control Water Flow at Hydro Dams that are resistant to freezing in position as the result of ice formation and/or accumulation, and which minimize the need to heat valves when necessary for their operation. (e.g., with gas torches);

Road and Highway Bridges and Bypasses resistant to ice formation and/or accumulation in subfreezing conditions;

Firefighters hats and equipment that is resistant to ice formation and/or accumulation that can occur when the equipment is used in severe cold temperatures, and exposed to water; and Ice formation and/or accumulation resistant decks, railings, masts, antennas, and other exposed surfaces of boats, ships lighthouses, and buoys, which are operated in cold weather.

The HO/OP properties of the coatings described herein, which resist the wetting of surfaces to which they are applied, can be used to reduce the friction at the water/substrate interface. The use of the coatings described herein to reduce of friction at the water/substrate interface has a variety of uses including, but not limited to:

Pumps with improved efficiency due to reduction of friction, including friction at pump impellers;

Boat, ship, and barge hulls with reduced drag due to the reduced friction between the hull and water; resulting in more efficient use of fuel;

Windmill blades with increased efficiency due to a reduction in the friction between moist air and/or the effects of rain and water accumulation on the blades surface.

The HO/OP properties of the coatings described herein, which resist the wetting of surfaces to which they are applied, can be used to reduce the corrosion of materials, particularly metals. The use of the coatings described herein in corrosion reduction has a variety of uses, including but not limited to:

Bridges resistant to corrosion from water, including salt water, e.g., from salt sprays used during the winter;

Corrosion resistant guard railings used on roads and highways, and railings used along walks and stairs, public parks, railing is both galvanized steel and tubing;

Corrosion resistant coatings for industrial equipment, particularly metals (e.g., ferrous metals) exposed the weather.

Due to the HO/OP properties of the coatings described herein, the coatings may be used to prevent water penetration into the wood, which causes swelling that can be exaggerated under subzero conditions, warping, exfoliation, which can lead to rotting. The use of the coatings described herein in corrosion reduction finds a variety of uses, including but not limited to, wood and particle board resistant to the damaging effects of water.

Other uses of the HO/OP coatings described herein include a variety of applications, that include, but are not limited to:

- Glasses and ceramics that are self cleaning, where the coatings described herein may be employed, for example, as arc-resistant coatings on insulators used in electrical transmission systems where dirt or salt deposits, alone or in combination with water, can allow arcing with significant electrical energy losses;
- Cement and Masonry Products and surfaces resistant to damage in freezing weather from water that has penetrated the surfaces;
- Paper Products and Fabric resistant to water and moisture, including, but not limited to: paper and fabric moisture barriers used for insulation and under shingles or roofing; cardboard tubes/pipes, are used to cast concrete pillars (water penetrating the seams of the tubes can leave seams and other defects in the pillars that need to be fixed by grinding operation; water resistant paper and cardboard packing;
- Composites including, but not limited to HP/OP roofing shingles resistant to (1) the loss of aggregate particles, (2) ice formation, which can damages the shingles and the supporting roof structure and (3) stains that develop on shingles over time, presumably, from wetting.

8.1 Spill Resistant Borders

A spill-resistant border is a portion of a surface forming a perimeter around an area of a surface that has a lower hydrophobicity and/or lower oleophobicity than the border. Spill-resistant borders can prevent water and other liquids from spreading or flowing beyond the position of a border on a planar or substantially planar surface that is placed in a substantially level horizontal position (see FIG. 1.) Such borders can prevent the spread of an aqueous liquid until it exceeds a level that is about 4.5 mm higher than the surface. In some instances the liquids can be aqueous solutions, suspensions or emulsions. In other instances, the liquids can be lipids or oils that are prevented from spreading beyond a border until the level of the oil or lipid exceeds about 2 mm above the surface on which the border is formed. In other instances the liquid can be an alcohol (e.g., methanol, ethanol, a propanol, a butanol, or a pentanol) or a liquid comprising an alcohol (e.g., water and alcohol combination including alcoholic beverages such as beer, wine and distilled liquors).

The HP/OP coatings described herein may be used to prepare spill resistant borders either by directly applying an HP/OP coating to a portion of a surface (with or without the use of a mask) or by applying a tape or ribbon to the surface where one surface of the tape or ribbon is treated with an HP/OP coating.

Where the surface, or a portion of the surface, is substantially planar, the spill-resistant border may be placed at or near the edges of the planar surface or near the edge of the portion that is substantially planar, such that the spill-resistant border surrounds a region of the surface that has a lower hydrophobicity or lower oleophobicity than the spill-resistant border. Alternatively, the border may be placed so as to form a boundary encompassing one or more portions of the surface that have a lower hydrophobicity or oleophobicity than the border. Thus, borders may, in some cases, be placed at the edges of (e.g., at or near the edges of the treated surface) or form one or more barriers separating regions of a surface that have lower hydrophobicity than the borders or barriers.

One embodiment provides surfaces comprising a hydrophobic and/or oleophobic spill-resistant border, wherein the border forms a perimeter around at least one area of the surface that has a lower hydrophobicity and/or lower oleophobicity than the border. In another embodiment, the surface may comprise a hydrophobic and/or oleophobic spill-resistant border, wherein said border forms a perimeter around at least two, or at least three, or at least four, areas of the surface that have a lower hydrophobicity and/or lower oleophobicity than the border.

In some embodiments a border may be placed at the edge of a surface, in which case it may be referred to as an "edge." In other embodiments a border may be placed near an edge of a surface, such as in the form of a strip parallel or substantially parallel to one or more edges of a surface. In some embodiments a border may be placed on a surface at a position that is not the edge such that the border forms a perimeter around one or more areas that are have a lower hydrophobicity and/or lower oleophobicity than the border.

Where a border is not placed at the edge it may be termed a "barrier." Barriers may divide a surface into several regions that have a lower hydrophobicity and/or lower oleophobicity than the border. Each area having a barrier as a perimeter will separately prevent the spreading of liquid between different areas of the surface. The regions separated by barriers may be in variety of forms. For example, the regions may be in the form of a series of concentric circles or a series of regular quadrilaterals (e.g., squares or rectangles, hexagons, or triangles). Barriers may retain liquids at the same height as a spill-resistant border placed at an edge or optionally may have a lesser ability to retain liquids than the border at the edge.

In some embodiments a border in the form of an edge, or a border located at or near the edge of the surface, may be employed with borders in the form of barriers. In such an embodiment the surface will not only prevent the spread of liquids between regions separated by barriers, but also may prevent or stop liquids from flowing off the surface by blocking passage of the liquid over the border at the edge. Where the barriers have a lesser ability to retain liquids than the border, aspill that overwhelms a barrier will spread to the next area before overflowing the edge. Some examples of spill-resistant borders, including those with edges and barriers, and combinations thereof, may be seen in FIG. 2.

Spill-resistant borders (including borders in the form of edges and barriers), regardless of the pattern in which they are formed, are substantially 2-dimensional structures. The width of the HP/OP regions of a surface forming spill-resistant borders can vary depending on the specific application in which the borders are intended to be used. In some embodiments, the borders may be from about 0.2 to about 2 inches in width, or alternatively, about 0.2, 0.25, 0.3, 0.4. 0.5, 0.6, 0.7, 0.8, 0.9, 1.0, 1.1, 1.2, 1.25, 1.3 1.4, 1.5, 1.75 or 2.0 inches (about 5 mm to 50 mm) in width. In one embodiment, where the borders are intended for use on food preparation or storage surfaces, (e.g., cutting boards, glass shelving for refrigerators, or countertops) the borders in the range of 0.2 to 2.0 inches. In other embodiments, such as where the spill-resistant borders are intended for use on food preparation or storage surfaces, the borders can be about 0.4 to 1 inch wide, or alternatively, about, 0.4, 0.5, 0.6, 0.7, 0.75, 0.8, 0.9, or 1.0 inches wide. Border width does not have to be uniform, and where borders on a surface comprise an edge and barriers, the edge and barriers may be of different widths or even varying widths on the same surface.

Where a combination of a border, such as a border in the form of an edge, and a barrier are used, the hydrophobicity of the barrier and edge may be controlled such that liquids will be prevented from spreading between different areas of the surface, but the highest resistance to liquid spreading (the highest height of liquid retained) will be at the edge. Thus, in the case of a spill that overflows an area surrounded by a barrier, the spill would flow to an adjacent area, rather than over the edge.

Figure 2:
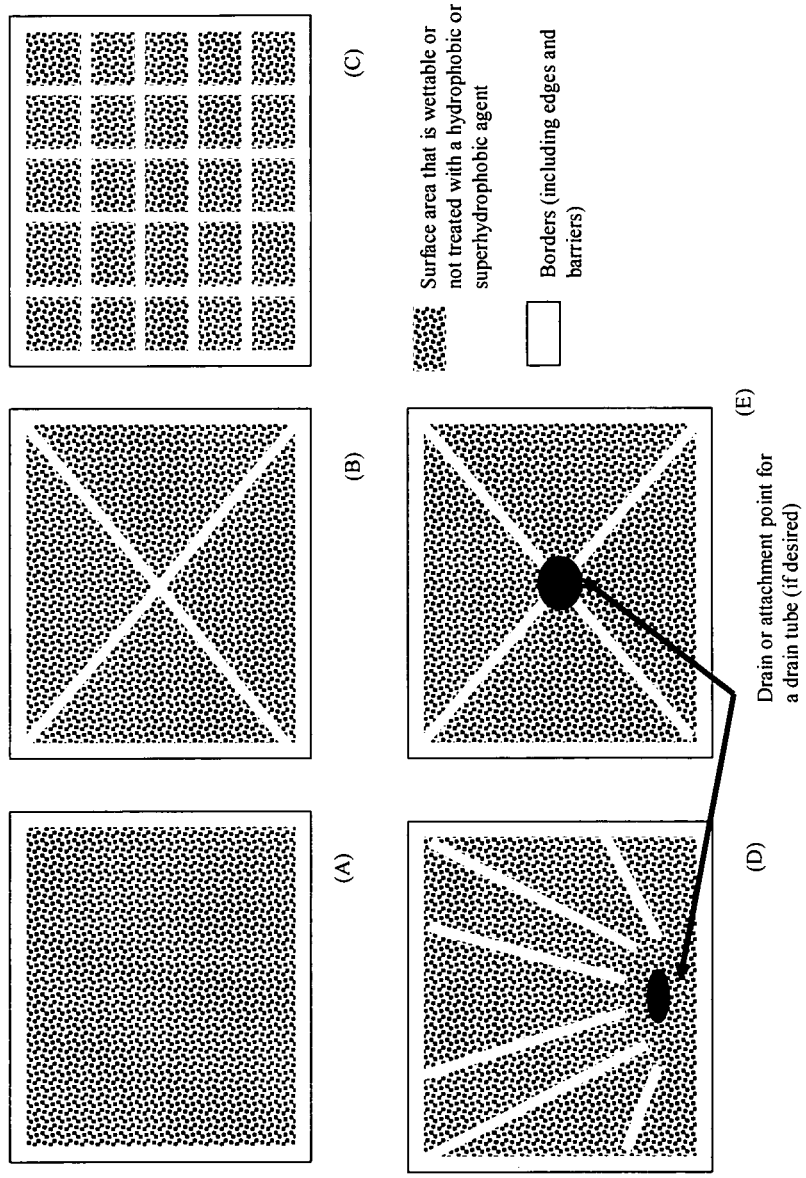
FIG. 2 depicts five different surfaces with regions (stippled) that have a lower hydrophobicity and/or lower oleophobicity than the spill-resistant border and spill-resistant borders as unmarked (white) regions. In (A), a surface with a spill resistant border in the form of an edge (at its edge) is depicted. (B) shows a surface with a spill resistant border in the form of a spill-resistant edge along with two diagonal spill resistant barriers. The diagonal barriers may retain liquids at the same height as the spill-resistant edge or optionally may have a lesser ability to retain liquids than the border at the edge (i.e., the barrier lines optionally may retain liquids to lower heights than the border at the edge). (C) shows a surface with a spill resistant border in the form of a spill-resistant edge along with a series of spill resistant barriers in the form of a grid, where the barrier lines optionally may have a lesser ability to retain liquids than the edge. (D) depicts a surface with a spill resistant border in the form of a spill-resistant edge along with a series of partial spill resistant barriers, that optionally may have a lesser ability to retain liquids and which may be used to channel liquids toward a drain (or drains), or a site where one or more drain tube(s) are connected (black oval). The barrier lines in such an embodiment may extend to the drain. (E) shows a surface with a spill resistant border in the form of a spill-resistant edge along with two diagonal spill resistant barriers that terminate at a drain (black oval). The diagonal barriers lines optionally may have a lesser ability to retain liquids than the edge and can be used to channel or direct liquids to the drain. Where drains are attached to a surface, the surface may be inclined or depressed so that the opening of the drain is lower than the edge of the surface, channeling liquids to the drain.

Spill-resistant borders and barriers may be used to direct liquid toward one or more drains in a surface and can be arranged to channel spilled liquids toward a drain (see e.g., FIG. 2 panels D and E). Borders in the forms of edges and/or barriers may be also combined with drains in a surface so as to direct liquids to a drain or collection site/container. Drains may be in the form of an opening, depression or trough (e.g., slot, hole, or groove) in the surface bearing the border. Openings, depressions, or troughs may be connected to tubing or pipes that will permit liquid to be collected or channeled to a desired location (e.g., a collection container or sewer waste line). Barrier lines that form incomplete perimeters around areas of a surface may also be used to channel liquids towards a drain (see FIG. 2, Panel D); particularly where the barrier lines form a complete perimeter except at the point where they end at or near a drain (see FIG. 2, Panel E). In one embodiment, one or more drains may be placed at the edge of surface so that the border forms a continuous perimeter around an area of the surface up to the point where the drain is located, with the drain completing the perimeter formed by the border.

In an embodiment, a spill resistant border can be formed on a surface that has a contact angle with water at room temperature that is less than about 10, 15, 20, 30, 40, 50, 60, 70, 80, 90 100, 110, or 120 degrees, and where the border has a contact angle with water at room temperature that is greater than the contact angle of water with the surface on which it is formed by about 7, 8, 9, 10, 20, 30, 40, 50, or 60 degrees measured at room temperature (about 68°-72° F.).

Spill-resistant borders, may be employed for a variety of purposes, including, but not limited to, glass shelving for refrigerators, or countertops, laboratory work benches, or cutting boards.

The tapes and ribbons (and sheet) described above may be made from a variety of materials including, but not limited to, metal (e.g., aluminum), plastic, paper, fiber glass and the like. Such tapes and ribbons may be employed for variety of other purposes than preparing spill resistant borders, including but not limited to, their use as anti-icing tapes, and to provide corrosion resistance.

Example 1

Superhydrophobic and Oleophobic Surface Coatings Formed with Three Binder Systems without Added First Particles Three 4-inch×4-inch aluminum plates (0.062-in.thick) are cleaned with acetone. Each plate is spray-coated with a base coat (2 ml) of one of the following binders: Self-Etching Primer (a lacquer based primer from Eastwood Co., Pottstown, Pa.); POLANE® B (a polyurethane based binder from Sherwin Williams, Harrisburg, Pa.) or LUMIFLON® (a solvent soluble fluoropolymer from Asahi Glass Co., Exton, Pa.).

Following application of the binder base coat, and before the base coat dries, each of the plates was top-coated with CAB-O-SIL TS-720 (Cabot Corp., Billerica, Mass.) fumed silica second particles (e.g., second particles) having a nominal BET surface area of 200 $m^2$/g treated with polydimethylsiloxane. The plate coated with Self-Etching Primer was top coated with 2 ml of a TS-720 suspension (4.2 g TS-720 per 100 ml of ethanol). Plates coated with POLANE® B or LUMIFLON® are top coated with 2 ml of TS-720 suspension (4 g per 100 ml of hexane). Plates coated with Self-Etching Primer are cured for 30 min, at 200° F., and plates coated with the other two binders are cured for 1.5 h at 200° F. in an electric oven.

Coatings are assessed for their hydrophobicity (contact angel with water), submerged water durability, mechanical durability and chemical durability.

The hydrophobicity of the coatings is assessed by measuring the contact angle of water with the coating. Measurements are made using a T200 Theta Optical Tensiometer on newly prepared coatings and after durability testing using a Taber unit (see below).

Mechanical durability can be assessed by a variety of methods, including manual abrasion with preset weights or on commercial apparatus such as those available from Taber Industries (North Tonawanda, N.Y.).

For the purpose of this disclosure manual abrasion testing (hand rub method) is conducted using a cylindrical 800-g weight with a flat bottom (about 1.75 pounds) having a base diameter of about 4.45 cm (1.75 inches) covered with a 50:50 cotton/polyester fabric. Testing is conducted by moving the weight with a reciprocating motion (1 rub or abrasion cycle is equivalent to 1 pass of the weight across the surface). The roll-off angle for water is checked at incline angles of 3°, 6°, and/or 9° by placing 20 water droplets on the portion of the surface (e.g., the portion subjected to manual abrasion testing). The end of life of the coating determined by manual abrasion testing is considered the point when most (more than 10) of the 20 droplets do not roll off the surface at the indicated degree of incline.

Abrasion testing is also conducted using a Taber Rotary Platform Abraser (Abrader), which employs two "wheels" to abrade a surface under 250-gm loads or 500-gm loads on each wheel. Each cycle counted by the instrument is equivalent to two rubs, one each from each of the wheels. The end of life for coatings subjected to Taber testing is measured using run-off angle as described for manual abrasion.

Results for the analysis of three different coatings are summarized in Table 1. In addition to the measurements describe above, plates are also assessed for their loss of coatings by directly measuring their change in weight following assessment.

TABLE 1

Durability of Superhydrophobic Composite Coatings Formed With Three Different Binder Systems And Second Particles of TS-720.

| Coating Detail | | | Sprayed Amount | Contact Angle | | Durability Data[a] | | | Weight Change[b] |
|---|---|---|---|---|---|---|---|---|---|
| | | | | Degrees | After Durability Testing for | Rub Cycles (800-gm Rub, 250-g Taber) Roll-off Angle (°) | | | |
| Substrate | Binder | Top Coat | base/top (ml) | New | 9° Roll-Off | 3 | 6 | 9 | (mg) |
| Aluminum (4 × 4 in.) | Etch coat | 4.2 g T-720 in 100 ml ethanol | 2/10 | 155 | 131 | 100/40 | 140/40 | 160/40 | 160.4 |

TABLE 1-continued

Durability of Superhydrophobic Composite Coatings Formed With
Three Different Binder Systems And Second Particles of TS-720.

| Coating Detail | | | Sprayed Amount | Contact Angle Degrees | After Durability Testing for | Durability Data[a] Rub Cycles (800-gm Rub, 250-g Taber) Roll-off Angle (°) | | | Weight Change[b] |
|---|---|---|---|---|---|---|---|---|---|
| Substrate | Binder | Top Coat | base/top (ml) | New | 9° Roll-Off | 3 | 6 | 9 | (mg) |
| Aluminum (4 × 4 in.) | Polane ® B | 4.0 g T-720 in 100 ml hexane | 2/10 | 159 | 144 | 80/35 | 100/35 | 120/35 | 7 |
| Aluminum (4 × 4 in.) | Lumiflon ® | 4.0 g T-720 in 100 ml hexane | 2/10 | 159 | 122 | 60/55 | 100/55 | 120/55 | 116.2 |

[b]After Taber testing with 250 g load using 9° roll-off to determine end of life.

Data from the analysis of the three coatings indicates that as prepared each coating has superhydrophobic properties (the water contact angle exceeds 150°). The lacquer based Self-Etching Primer as a binder produced slight more durable coatings than either the polyurethane or fluoropolymer binder in manual abrasion testing at 3, 6 and 9° inclines. In contrast, abrasion analysis using the Taber instrument indicates that fluoropolymer binders give slightly more durable coatings

Example 2

Superhydrophobic and Oleophobic Surface Coatings Prepared with First Particles Aluminum plates (4-inch×4-inch 0.062-in.thick) are cleaned with acetone and are coated in a two step process comprising applying a base coat followed by application of a top-coat (second coat). Each plate is spray-coated with a base coat (2 ml) of one Self-Etching Primer (SEP) (Eastwood Co., Pottstown, Pa.) containing the indicated amount of the first particles listed below. After drying in air, this base coat is top-coated with 2 ml of TS-720 treated with polydimethylsiloxane suspended in ethanol (4.2 g/100 ml). After drying in air, the coated plates are dried in air and cured at 200° F. for 30 minutes ("min") in an electric oven. Manual abrasion testing is conducted as described in Example 1. Data from the plates is shown in Tables 2a-2f.

Example 2a

Coatings Prepared with Filler 512

The filler 512 black, (Xiom Corp., West Babylon, N.Y.) a thermoplastic powder is added to SEP at 0% to 40% weight to volume. The mixture was sprayed on as the base coat and top coated with TS-720 treated with polydimethylsiloxane as described above. Manual abrasion data is shown in Table 2a.

TABLE 2a

Addition of 512 Black Thermoplastic Filler in Self-Etch Primer (SEP) Binder Coat

| | Coating Detail | | | | Cure | | |
|---|---|---|---|---|---|---|---|
| | | | Two-Step Process | | | Number of Rubs | |
| Samples | Binder | Filler | Filler (g)/ 100 ml SEP | Top Coat g/100 ml | Temperature (° F.) 30 min | Actual | Average |
| Al (4 × 4 in.) | SEP | 512 Black | 0 | 4.2 TS-720 | 200 | | 75 |
| Al (4 × 4 in.) | SEP | 512 Black | 20 | 4.2 TS-720 | 200 | 200 | 220 |
| Al (4 × 4 in.) | SEP | 512 Black | 20 | 4.2 TS-720 | 200 | 240 | |
| Al (4 × 4 in.) | SEP | 512 Black | 25 | 4.2 TS-720 | 200 | 200 | 212 |
| Al (4 × 4 in.) | SEP | 512 Black | 25 | 4.2 TS-720 | 200 | 225 | |
| Al (4 × 4 in.) | SEP | 512 Black | 30 | 4.2 TS-720 | 200 | 275 | 317 |
| Al (4 × 4 in.) | SEP | 512 Black | 30 | 4.2 TS-720 | 200 | 360 | |
| Al (4 × 4 in.) | SEP | 512 Black | 35 | 4.2 TS-720 | 200 | 150 | 125 |
| Al (4 × 4 in.) | SEP | 512 Black | 35 | 4.2 TS-720 | 200 | 100 | |
| Al (4 × 4 in.) | SEP | 512 Black | 40 | 4.2 TS-720 | 200 | 200 | 175 |
| Al (4 × 4 in.) | SEP | 512 Black | 40 | 4.2 TS-720 | 200 | 150 | |

Example 2b

Coatings Prepared with Filler Nulok 390

The filler Nulok 390 (Kamin LLC, Macon, Ga.) is added to SEP at 0% to 40% weight to volume. The mixture was sprayed on as the base coat and top coated with TS-720 treated with polydimethylsiloxane as described above. Manual abrasion data is shown in Table 2b. The maximum abrasion cycles tolerated with a 17% addition of Nulok 390 were about four times the number of cycle achieved in the absence of that filler.

TABLE 2b

Addition of Nulok 390 Thermoplastic Filler in Self-Etch Primer (SEP) Binder Coat

| | | Coating Detail | | | | | |
|---|---|---|---|---|---|---|---|
| | | | Two-Step Process | | Cure | | |
| | | | Filler (g)/ | Top Coat | Temperature | Number of Rubs | |
| Samples | Binder | Filler | 100 ml SEP | g/100 ml | (° F.) 30 min | Actual | Average |
| Al (4 × 4 in.) | SEP | Nulok 390 | 0 | 4.2 TS-720 | 200 | | 75 |
| Al (4 × 4 in.) | SEP | Nulok 390 | 4.6 | 4.2 TS-720 | 200 | 130 | 145 |
| Al (4 × 4 in.) | SEP | Nulok 390 | 4.6 | 4.2 TS-720 | 200 | 160 | |
| Al (4 × 4 in.) | SEP | Nulok 390 | 17 | 4.2 TS-720 | 200 | 275 | 275 |
| Al (4 × 4 in.) | SEP | Nulok 390 | 25 | 4.2 TS-720 | 200 | 275 | 250 |
| Al (4 × 4 in.) | SEP | Nulok 390 | 30 | 4.2 TS-720 | 200 | 220 | 230 |
| Al (4 × 4 in.) | SEP | Nulok 390 | 30 | 4.2 TS-720 | 200 | 240 | |
| Al (4 × 4 in.) | SEP | Nulok 390 | 35 | 4.2 TS-720 | 200 | 220 | 230 |
| Al (4 × 4 in.) | SEP | Nulok 390 | 35 | 4.2 TS-720 | 200 | 240 | |
| Al (4 × 4 in.) | SEP | Nulok 390 | 40 | 4.2 TS-720 | 200 | 240 | 250 |
| Al (4 × 4 in.) | SEP | Nulok 390 | 40 | 4.2 TS-720 | 200 | 160 | |

Example 2c

Coatings Prepared with Filler XT-Series

First particles in the XT family (XT-600, XT-700, XT-750, and XT-765) (Xiom Corp, West Babylon, N.Y.) are added at 30% or 35% weight to volume. The mixture was sprayed on as the base coat and top coated with TS-720 as described above. Manual abrasion data is shown in Table 2c. The maximum number of abrasion cycles tolerated with additions of XT first particles to SEP are about five times that achieved without any filler addition.

TABLE 2c

Addition of XT-Series Thermoplastic as a Filler in Self-Etch Primer (SEP) Binder Coat

| | | Coating Detail | | | | | | |
|---|---|---|---|---|---|---|---|---|
| | | | | Two-Step Process | | Cure | | |
| | | | | Filler (g)/ | Top Coat | Temperature | Number of Rubs | |
| Samples | Binder | Filler | Filler Type | 100 ml SEP | g/100 ml | (° F.) 30 min | Actual | Average |
| Al (4 × 4 in.) | SEP | XT-Series | — | 0 | 4.2 TS-720 | 200 | | 75 |
| Al (4 × 4 in.) | SEP | XT-600 | TS | 30 | 4.2 TS-720 | 200 | 100 | 100 |
| Al (4 × 4 in.) | SEP | XT-600 | TS | 30 | 4.2 TS-720 | 200 | 100 | |
| Al (4 × 4 in.) | SEP | XT-700 | Epoxy | 30 | 4.2 TS-720 | 200 | 360 | 340 |
| Al (4 × 4 in.) | SEP | XT-700 | Epoxy | 30 | 4.2 TS-720 | 200 | 320 | |
| Al (4 × 4 in.) | SEP | XT-700 | Epoxy | 35 | 4.2 TS-720 | 200 | 340 | 300 |
| Al (4 × 4 in.) | SEP | XT-700 | Epoxy | 35 | 4.2 TS-720 | 200 | 260 | |
| Al (4 × 4 in.) | SEP | XT-750 | Bond Coat | 30 | 4.2 TS-720 | 200 | 200 | 220 |
| Al (4 × 4 in.) | SEP | XT-750 | Bond Coat | 30 | 4.2 TS-720 | 200 | 200 | |
| Al (4 × 4 in.) | SEP | XT-750 | Bond Coat | 30 | 4.2 TS-720 | 200 | 260 | |
| Al (4 × 4 in.) | SEP | XT-750 | Bond Coat | 30 | 4.2 TS-720 | 200 | 220 | |
| Al (4 × 4 in.) | SEP | XT-765 | Zn-Epoxy | 30 | 4.2 TS-720 | 200 | 240 | 240 |
| Al (4 × 4 in.) | SEP | XT-765 | Bond Coat | 30 | 4.2 TS-720 | 200 | 240 | |

Example 2d

Coatings Prepared with Filler 200 White

The filler 200 White, (Xiom Corp, West Babylon, N.Y.), a thermoplastic bond coat powder of 10-100 microns mean diameter, is added to SEP as a filler at 15% or 30% weight to volume. The mixture was sprayed on as the base coat and top coated with TS-720 treated with polydimethylsiloxane as described above. Manual abrasion data is shown in Table 2d. The maximum number of abrasion cycles tolerated with additions of 200 White filler to SEP is about four times that achieved without any filler addition.

TABLE 2d

Addition of 200 White Thermoplastic Filler in Self-Etch Primer (SEP) Binder Coat

| | | Coating Detail | | | Cure | | |
|---|---|---|---|---|---|---|---|
| | | | Two-Step Process | | | | |
| | | | Filler (g)/ | Top Coat | Temperature | Number of Rubs | |
| Samples | Binder | Filler | 100 ml SEP | g/100 ml | (° F.) 30 min | Actual | Average |
| Al (4 × 4 in.) | SEP | 200 White | 0 | 4.2 TS-720 | 200 | | 75 |
| Al (4 × 4 in.) | SEP | 200 White | 15 | 4.2 TS-720 | 200 | 260 | 280 |
| Al (4 × 4 in.) | SEP | 200 White | 15 | 4.2 TS-720 | 200 | 300 | |
| Al (4 × 4 in.) | SEP | 200 White | 30 | 4.2 TS-720 | 200 | 220 | 230 |
| Al (4 × 4 in.) | SEP | 200 White | 30 | 4.2 TS-720 | 200 | 240 | |

It can be stated from the thermoplastic filler study that all of them resulted in a positive effect and improvement varied somewhat, which is obviously dependent on filler size and to some extent on filler chemistry.

Example 2e

Coatings Prepared with Wood Particles as First particles

Wood powder of the indicated size is added to SEP at 10% or 15% weight to volume. The mixture is sprayed on as the base coat and top coated with TS-720 treated with polydimethylsiloxane as described above. Manual abrasion data is shown in Table 2e. The maximum abrasion cycles tolerated by coatings with 15% of 53 micron wood dust is over 4 times that of the coating in the absence of filler.

TABLE 2e

Addition of Wood-Dust Thermoplastic Filler in Self-Etch Primer (SEP) Binder Coat

| | | Coating Detail | | | Cure | | |
|---|---|---|---|---|---|---|---|
| | | | Two-Step Process | | | | |
| | | | Filler (g)/ | Top Coat | Temperature | Number of Rubs | |
| Samples | Binder | Filler | 100 ml SEP | g/100 ml | (° F.) 30 min | Actual | Average |
| Al (4 × 4 in.) | SEP | Wood Dust | 0 | 4.2 TS-720 | 200 | | 75 |
| Al (4 × 4 in.) | SEP | 53-μm Wood Dust | 15 | 4.2 TS-720 | 200 | 320 | |
| Al (4 × 4 in.) | SEP | 53-μm Wood Dust | 10 | 4.2 TS-720 | 200 | 320 | |
| Al (4 × 4 in.) | SEP | 43-μm Wood Dust | 10 | 4.2 TS-720 | 200 | 270 | |

Example 2f

Coatings Prepared with Metal Powder First Particles

Aluminum powder of the indicated size (100 or 325 mesh) or (149 or 44 microns respectively) is added to SEP at 30% or 40% weight to volume. The mixture is applied as the base coat by spraying and top coated with TS-720 treated with polydimethylsiloxane as described above. Manual abrasion data is shown in Table 2f. The maximum abrasion cycles tolerated by coatings with the addition of 100 mesh aluminum filler is over three times that number of abrasion cycles tolerated by the coatings in the absence of any filler.

TABLE 2f

Addition of Aluminum Metal Powders Thermoplastic Filler in Self-Etch Primer (SEP) Binder Coat

| | | Coating Detail | | | Cure | | |
|---|---|---|---|---|---|---|---|
| | | | Two-Step Process | | | | |
| | | | Filler (g)/ | Top Coat | Temperature | Number of Rubs | |
| Samples | Binder | Filler | 100 ml SEP | g/100 ml | (° F.) 30 min | Actual | Average |
| Al (4 × 4 in.) | SEP | Al Metal Powder | 0 | 4.2 TS-720 | 200 | | 75 |
| Al (4 × 4 in.) | SEP | Al-101 (-100 mesh) | 40 | 4.2 TS-720 | 200 | 280 | 250 |
| Al (4 × 4 in.) | SEP | Al-101 (-100 mesh) | 40 | 4.2 TS-720 | 200 | 220 | |
| Al (4 × 4 in.) | SEP | Al-101 (-100 mesh) | 50 | 4.2 TS-720 | 200 | 200 | 200 |
| Al (4 × 4 in.) | SEP | Al-101 (-100 mesh) | 50 | 4.2 TS-720 | 200 | 200 | |
| Al (4 × 4 in.) | SEP | Al-101 (-325 mesh) | 40 | 4.2 TS-720 | 200 | 220 | 220 |
| Al (4 × 4 in.) | SEP | Al-101 (-325 mesh) | 40 | 4.2 TS-720 | 200 | 220 | |
| Al (4 × 4 in.) | SEP | Al-101 (-325 mesh) | 50 | 4.2 TS-720 | 200 | 230 | 230 |

Example 2g

Coatings Prepared with Metal and/or Metalloid Oxide Powder First Particles

MULLITE, which is a spinal oxide of $Al_2O_2$ and $SiO_2$ (powder −325 mesh or 44 microns mean diameter,) is added to SEP at 10% to 40% weight to volume. The mixture is sprayed on as the base coat and top coated with TS-720 treated with polydimethylsiloxane as described above. Manual abrasion data is shown in Table 2g. The maximum abrasion cycles tolerated by coatings with the addition of MULLITE is about three and a half times the number of abrasion cycles tolerated by the coatings in the absence of any filler.

Example 3

Performance of a Thermoplastic Filler in a Lacquer Based Binder

Aluminum plates (4-inch×4-inch×0.062-in.thick) are cleaned with acetone are coated in a two step process comprising applying a base coat (2 ml) of Self-Etching Primer (SEP, Eastwood Co., Pottstown, Pa.) containing 30% weight to volume of Filler 512 White (the counter part of the 512 black filler used in Example 2). After drying in air, this base coat is top-coated with (2, 3, 4, 5 or 6 ml) of TS-720 treated with polydimethylsiloxane suspended in ethanol (4.2 g/100 ml) or suspended in hexane at 4.2 g/100 ml. After drying in air, the coated plates are dried in air and cured at 200° F. for 30 min in an electric oven. Manual abrasion testing is conducted as described in Example 1. Data from the plates is shown in Table 3.

This table clearly demonstrates that with 30% 512 filler, the rub resistance can be increased to over 500 rubs with the top layer consisting of 5 ml/plate. Ethanol and hexane are equally effective in preparing the top coat of TS-720.

TABLE 2g

Addition of Mullite Thermoplastic Filler in Self-Etch Primer (SEP) Binder Coat

| | | Coating Detail | | | Cure | | |
|---|---|---|---|---|---|---|---|
| | | | Two-Step Process | | | | |
| | | | Filler (g)/ | Top Coat | Temperature | Number of Rubs | |
| Samples | Binder | Filler | 100 ml SEP | g/100 ml | (° F.) 30 mm | Actual | Average |
| Al (4 × 4 in.) | SEP | Mullite | 0 | 4.2 TS-720 | 200 | | 75 |
| Al (4 × 4 in.) | SEP | Mullite | 10 | 4.2 TS-720 | 200 | 100 | 100 |
| Al (4 × 4 in.) | SEP | Mullite | 10 | 4.2 TS-720 | 200 | 100 | |
| Al (4 × 4 in.) | SEP | Mullite | 20 | 4.2 TS-720 | 200 | 200 | 175 |
| Al (4 × 4 in.) | SEP | Mullite | 20 | 4.2 TS-720 | 200 | 150 | |
| Al (4 × 4 in.) | SEP | Mullite | 30 | 4.2 TS-720 | 200 | 220 | 210 |
| Al (4 × 4 in.) | SEP | Mullite | 30 | 4.2 TS-720 | 200 | 200 | |
| Al (4 × 4 in.) | SEP | Mullite | 40 | 4.2 TS-720 | 200 | 260 | 260 |
| Al (4 × 4 in.) | SEP | Mullite | 40 | 4.2 TS-720 | 200 | 260 | |

TABLE 3

512 White Filler with Top Coat Varied from 2-6 ml/Plate

| | | Coating Details | | | | | |
|---|---|---|---|---|---|---|---|
| | | | Two-Step Process | | | Number of Rubs[a] | |
| | | | Filler (g)/ | Top Coat | | | |
| Samples | Binder | Filler | 100 ml SEP | g/100 ml | ml/Plate | Actual | Average |
| Al (4 × 4 in.) | SEP | 512 White | 0 | 4.2 EtOH | 2 | | 75 |
| Al (4 × 4 in.) | SEP | 512 White | 30 | 4.2 EtOH | 2 | 150 | 175 |
| Al (4 × 4 in.) | SEP | 512 White | 30 | 4.2 EtOH | 2 | 200 | |
| Al (4 × 4 in.) | SEP | 512 White | 30 | 4.2 EtOH | 3 | 320 | 350 |
| Al (4 × 4 in.) | SEP | 512 White | 30 | 4.2 EtOH | 3 | 380 | |
| Al (4 × 4 in.) | SEP | 512 White | 30 | 4.2 EtOH | 4 | 420 | 390 |
| Al (4 × 4 in.) | SEP | 512 White | 30 | 4.2 EtOH | 4 | 360 | |
| Al (4 × 4 in.) | SEP | 512 White | 30 | 4.2 EtOH | 5 | 560 | 560 |
| Al (4 × 4 in.) | SEP | 512 White | 30 | 4.2 EtOH | 6 | 540 | 540 |
| Al (4 × 4 in.) | SEP | 512 White | 30 | 4.2 Hexane | 2 | 260 | 260 |
| Al (4 × 4 in.) | SEP | 512 White | 30 | 4.2 Hexane | 2 | 260 | |
| Al (4 × 4 in.) | SEP | 512 White | 30 | 4.2 Hexane | 3 | 420 | 400 |
| Al (4 × 4 in.) | SEP | 512 White | 30 | 4.2 Hexane | 3 | 380 | |
| Al (4 × 4 in.) | SEP | 512 White | 30 | 4.2 Hexane | 4 | 400 | 410 |
| Al (4 × 4 in.) | SEP | 512 White | 30 | 4.2 Hexane | 4 | 420 | |
| Al (4 × 4 in.) | SEP | 512 White | 30 | 4.2 Hexane | 5 | 520 | 512 |
| Al (4 × 4 in.) | SEP | 512 White | 30 | 4.2 Hexane | 5 | 500 | |
| Al (4 × 4 in.) | SEP | 512 White | 30 | 4.2 Hexane | 6 | 420 | 470 |
| Al (4 × 4 in.) | SEP | 512 White | 30 | 4.2 Hexane | 6 | 520 | |

[a] All plates were cured at 200° F. for 30 min.

The data table demonstrates that with 30% 512 filler, it is possible to reach 500 abrasion cycles in the manual test with a top coat of 5 ml/plate of TS-720 treated with polydimethylsiloxane (about 2 mg of polydimethylsiloxane treated TS-720 per cm$^2$ of surface).

Example 4

Durability Performance of First Particles in Polyurethane-Based Binders

Triplicate aluminum plates (4-inch×4-inch×0.062-in.-thick) are cleaned and coated in a two step process comprising applying a base coat (2 ml) of POLANE® containing 20% weight to volume of: S60 glass bubbles (3M™, St. Paul, Minn.); Filler 512 Black (Xiom Corp, West Babylon, N.Y.), or Corvel Black (Rohm & Haas, Philadelphia, Pa.). After drying in air, this base coat is top-coated with 5 ml of polydimethylsiloxane treated TS-720 suspended in hexane at 4.2 g/100 ml. After drying in air, the coated plates are dried in air and cured at 200° F. for 90 min in an electric oven. Manual abrasion testing is conducted as described in Example 1. Data from the plates is shown in Table 4.

TABLE 4

First Particles in POLANE ® B Binder

| | | Coating Details | | | Cure | | |
|---|---|---|---|---|---|---|---|
| | | | Two-Step Process | | | | |
| | | | Filler (g)/ | Top Coat | Temperature | Number of Rubs | |
| Samples | Binder | Filler | 100 ml SEP | g/100 ml | (° F.) 90 min | Actual | Average |
| Al (4 × 4 in.) | Polane ® B | Filler | 0 | 4.2 Hexane | 200 | | 120 |
| Al (4 × 4 in.) | Polane ® B | 512 Black | 20 | 4.2 Hexane | 200 | 400 | 370 |
| Al (4 × 4 in.) | Polane ® B | 512 Black | 20 | 4.2 Hexane | 200 | 350 | |
| Al (4 × 4 in.) | Polane ® B | 512 Black | 20 | 4.2 Hexane | 200 | 350 | |
| Al (4 × 4 in.) | Polane ® B | 560 Glass Beads | 20 | 4.2 Hexane | 200 | 400 | 370 |
| Al (4 × 4 in.) | Polane ® B | 560 Glass Beads | 20 | 4.2 Hexane | 200 | 350 | |
| Al (4 × 4 in.) | Polane ® B | 560 Glass Beads | 20 | 4.2 Hexane | 200 | 350 | |
| Al (4 × 4 in.) | Polane ® B | Corvel Black | 20 | 4.2 Hexane | 200 | 650 | 770 |
| Al (4 × 4 in.) | Polane ® B | Corvel Black | 20 | 4.2 Hexane | 200 | 850 | |
| Al (4 × 4 in.) | Polane ® B | Corvel Black | 20 | 4.2 Hexane | 200 | 800 | |

In all cases first particles added to polyurethane binders increased the durability of the superhydrophobic/oleophobic coatings by about three to seven fold.

Example 5

Durability of Coatings Prepared with Second Particle-Silicate Materials Top Coats with and without Additional Top Coat Treatments Aluminum plates (4-inch×4-inch×0.062-in.thick) are cleaned and a base coat (5 ml) of POLANE® B containing 20% weight to volume of Filler 512 Black (Xiom Corp, West Babylon, N.Y.) is applied to each plate in preparation for top coating. Top coatings of a second particle selected from (1) polydimethylsiloxane treated TS-720, (2) untreated M-5 fumed silica, or (3) hexamethyldisiloxane treated Nanogel TLD201 (Cabot Corp, Billerica, Mass.) are applied immediately after the base coating (e.g., after the bulk of solvent had evaporated).

Top coats of polydimethylsiloxane treated TS-720 (5 ml of 4.2% w/v) are applied in ethanol.

Top coats of M5 are applied by spraying 10-15 ml a 1.5% M-5 (w/v) suspension in hexane.

Top coats of Nanogel TLD201 are applied by spraying 10-15 ml of a 1.5% or 2% TLD201 suspension in hexane as indicated in the data.

In all cases, the plates were cured at 200° F. for 90 min in an electric oven. For the top coat of TS-720 the plates are ready for testing after a 90-min curing. Plates treated with For M-5 coated plates, are treated by one of two methods (method (A) or (B)) to produce superhydrophobic behavior.

Method A—a 1% solution of (tridecafluoro-1,1,2,2-tetrahydrooctyl)trichlorosilane ("SIT8174" from Gelest, Pottstown, Pa.) in hexane is applied as a top coat in the amount indicated in Table 5b. Plates treated with SIT8174 are given a second and final cure at 200° F. for 30-60 min in an electric oven.

Method B—3.5 ml of a 3-5% solution of $SiCl_4$ in hexane is applied to plates that are exposed to atmospheric moisture. Water in the atmosphere is sufficient to convert at least some Si—Cl groups into Si—OH groups, thereby increasing the number of Si—OH sites on M-5 second particles, prior to treatment with SIT8174. After treatment with $SiCl_4$, SIT8174 is applied and the coating cured as in Method A.

In some instances Nanogel TLD201 treated plates are also treated with SIT8174 or $SiCl_4$+SIT8174 using Method (A) or Method (B) as described above for M-5 coated plates and the amounts of the Nanogel and SIT8174 indicated in Table 5.

Data for manual abrasion testing of plates bearing the coatings from each treatment is given in Table 5 along with a control comparison. The rub data on all of the samples discussed above are summarized in Table 15.

TABLE 5b

Effect of Top Coat Chemistry with POLANE ® B Binder on Superhydrophobic Coating Durability and Oleophobic Effect

| | Coating Details | | | | Cure | Inorganic Treatment | | Silanation Treatment | |
|---|---|---|---|---|---|---|---|---|---|
| | | | Two-Step Process | | Time | of $SiCl_4$ | | of SIT8174 | |
| Samples | Binder | Filler | Filler (g) 100 ml Polane ® B | Top Coat g/100 ml | Top Coat ml/Plate | at 200° F. (min) | Solution Concentration | Amount (ml/plate) | Solution Concentration | Amount (ml/plate) |
| Al (4 × 4 in.) | Polane ®B | 512 Black | 20 | 4.2 g T-720 EtOH | 2 | 90 min | | | | |
| Al (4 × 4 in.) | Polane ®B | 512 Black | 20 | 1.5 g M-5 Hexane | 10-15 | 90 min | — | — | 1% in Hexane | 3-5 |
| Al (4 × 4 in.) | Polane ®B | 512 Black | 20 | 1.5 g M-5 Hexane | 10-15 | 90 min | 5% in Hexane | 3-5 | 1% in Hexane | 3-5 |
| Al (4 × 4 in.) | Polane ®B | 512 Black | 20 | 1.5 g Nanosel Hexane | 10-15 | 90 min | — | — | 1% in Hexane | 3-5 |
| Al (4 × 4 in.) | Polane ®B | 512 Black | 20 | 1.5 g Nanogel Hexane | 10-15 | 90 min | 5% in Hexane | 3-5 | 1% in Hexane | 3-5 |
| Al (4 × 4 in.) | Polane ®B | 512 Black | 20 | 2.0 g Nanogel Hexane | 10-15 | 90 min | 5% in Hexane | 3-5 | 1% in Hexane | 3-5 |

| | Coating Details | | | | Cure | | | |
|---|---|---|---|---|---|---|---|---|
| | | | Two-Step Process | | Time | | | |
| Samples | Binder | Filler | Filler (g) 100 ml Polane ® B | Top Coat g/100 ml | at 200° F. (min) | Number of Rubs | Contact Angle | Oleophobic |
| Al (4 × 4 in.) | Polane ®B | 512 Black | 20 | 4.2 g T-720 EtOH | | 370 | | No |
| Al (4 × 4 in.) | Polane ®B | 512 Black | 20 | 1.5 g M-5 Hexane | 30-60 | 800-1000 | 160 | Yes |
| Al (4 × 4 in.) | Polane ®B | 512 Black | 20 | 1.5 g M-5 Hexane | 30-60 | 1800-2000 | 164 | Yes |
| Al (4 × 4 in.) | Polane ®B | 512 Black | 20 | 1.5 g Nanosel Hexane | 30-60 | 1000 | 165 | No |

TABLE 5b-continued

Effect of Top Coat Chemistry with POLANE ® B Binder on Superhydrophobic Coating Durability and Oleophobic Effect

| | | | | | | | | |
|---|---|---|---|---|---|---|---|---|
| Al (4 × 4 in.) | Polane ®B | 512 Black | 20 | 1.5 g Nanogel Hexane | 30-60 | 2000 | 163 | No |
| Al (4 × 4 in.) | Polane ®B | 512 Black | 20 | 2.0 g Nanogel Hexane | 30-60 | 5100 | 168 | No |

Example 6

Filler and Top Coat Study

Aluminum plates (4-inch×4-inch×0.062-in.thick) are cleaned and a base coat (3-5 ml) of POLANE® B containing 20% weight to volume of the indicted filler. Top coatings of second particles of polydimethylsiloxane treated TS-720 or untreated M-5 fumed silica (Cabot Corp, Billerica, Mass.) are applied after the base coating in the indicted solvents. Plates were dried and cured at 200° F. Where indicted, coatings were treated with Gelest silane SIT8174 or SiCl4 followed by treatment with SIT8174 using methods A or B described in Example 5. Table 6a sows the data with S60 filler (3M™, St. Paul, Minn.) and Table 6b for Corvel Black.

TABLE 6a

Effect of Top Coat Chemistry with POLANE ® B Binder and S60 Glass Spheres on Superhydrophobic Coating Durability and Oleophobic Effect

| | Coating Details | | | | Cure | Inorganic Treatment of SiCl$_4$ | | Silanation Treatment of SIT8174 | |
|---|---|---|---|---|---|---|---|---|---|
| | | Two-Step Process | | | Time | | | | |
| Samples | Binder | Filler | Filler (g) 100 ml Polane ®B | Top Coat g/100 ml | Top Coat (ml/Plate) | at 200° F. (min) | Solution Concentration | Amount (ml/plate) | Solution Concentration | Amount (ml/plate) |
| Al (4 × 4 in.) | Polane ®B | 560 Glass | 20 | M-5 1.5 | 15 | 90 | — | — | 1% in Hexane | 3-5 |
| Al (4 × 4 in.) | Polane ®B | 560 Glass | 20 | M-5 1.5 | 15 | 90 | 5% in Hexane | 3-5 | 1% in Hexane | 3-5 |

| | Coating Details | | | | Cure | | | |
|---|---|---|---|---|---|---|---|---|
| | | Two-Step Process | | | Time | | | |
| Samples | Binder | Filler | Filler (g) 100 ml Polane ®B | Top Coat g/100 ml | at 200° F. (min) | Number of Rubs | Contact Angle | Oleophobic |
| Al (4 × 4 in.) | Polane ®B | 560 Glass | 20 | M-5 1.5 | 30-60 | 600-800 | 166 | Yes |
| Al (4 × 4 in.) | Polane ®B | 560 Glass | 20 | M-5 1.5 | 30.60 | 1200-1500 | 166 | Yes |

TABLE 6b

Effect of Top Coat Chemistry with POLANE ® B Binder and Corvel Black as Filler on Superhydrophobic Coating Durability and Oleophobic Effect

| | Coating Details | | | | Cure | Inorganic Treatment of SiCl$_4$ | | Silanation Treatment of SIT8174 | |
|---|---|---|---|---|---|---|---|---|---|
| | | Two-Step Process | | | Time | | | | |
| Samples | Binder | Filler | Filler (g) 100 ml Polane ®B | Top Coat g/100 ml | Top Coat (ml/Plate) | at 200° F. (min) | Solution Concentration | Amount (ml/plate) | Solution Concentration | Amount (ml/plate) |
| Al (4 × 4 .in.) | Polane ®B | Corvel Black | 20 | 5TS-720 Hexane | 5 | 90 | — | — | — | — |

TABLE 6b-continued

Effect of Top Coat Chemistry with POLANE ® B Binder and Corvel Black
as Filler on Superhydrophobic Coating Durability and Oleophobic Effect

| Al (4 × 4 in.) | Polane ®B | Corvel Black | 20 | M-5 1.5 | 15 | 90 | 5% in Hexane | 3-5 | 1% in Hexane | 3-5 |

| | | Coating Details | | | Cure | | | |
| | | | | Two-Step Process | Time | | | |
| Samples | Binder | Filler | Filler (g) 100 ml Polane ®B | Top Coat g/100 ml | at 200° F (min) | Number of Rubs | Contact Angle | Oleophobic |
|---|---|---|---|---|---|---|---|---|
| Al (4 × 4 .in.) | Polane ®B | Corvel Black | 20 | 5TS-720 Hexane | — | 800 | | No |
| Al (4 × 4 in.) | Polane ®B | Corvel Black | 20 | M-5 1.5 | 60.60 | 3700 | 163 | Yes |

Plates coated with SIT8174 are both superhydrophobic and oleophobic, and perform show increased durability when pretreated with $SiCl_4$.

Example 7

Superhydrophobic and Oleophobic Coating Resistance to Boiling Water Exposure

Two 4 inch×4 inch aluminum plates with coatings having superhydrophobic and oleophobic behavior are prepared by the procedures in Examples 5 and 6.
Plate #1: Base Coat of 20% Filler 512 in POLANE® B and top coat of M-5 silica treated with $SiCl_4$ followed by treatment with SIT8174
Plate #2: Base Coat of 20% S60 Glass beads (spheres) in POLANE® B and a top coat with M-5 silica treated with $SiCl_4$ followed by treatment with SIT8174
After curing, both plates are checked for superhydrophobic performance and then placed in a boiling water bath. The water contact angle of the coatings is checked at periodically after removing the plates from the bath and cooling to room temperature. The plates are returned to the boiling water bath after each measurement. After hours in boiling water both plates are found to show superhydrophobic performance. A final measurement on the plates shows that they also show oleophobic behavior as well.

Example 8

Optimization of M5 Top Coat

Example 8a

Aluminum plates measuring 4 inches by 4 inches are coated with POLANE® B containing 20% 512 Black as filler. These plates are top-coated with untreated fumed M5 silica (Cabot Corp., Billerica, Mass.) suspended in hexane at 0.5, 1.0, 1.5, or 2% weight/volume. At higher percentages of M5 dispersed in hexane it becomes difficult to spray the mixture. The amount of each M5 suspension applied as top coat was also monitored by the volume applied to plate (ml/plate). The amounts applied are varied in increments of 5 ml/plate from 5 to 20 ml/plate. After the top coat is applied, the plates are cured for 90 min at 200° F. Following curing, half of the plates are treated with silane SIT8174 and the other half with $SiCl_4$, followed by SIT8174, thereby converting the untreated M5 silica into hydrophobic/superhydrophobic and/or oleophobic particles. Following treatment with SIT8174 or $SiCl_4$+ SIT8174 plates are cured for 30-60 min at 200° F. and subjected to assessment of water contact angle and Taber testing. Taber testing is conducted with a 250 g weight on the wheels. The end of superhydrophobic behavior was measured at roll-off angles of 6° and 9° as shown in Table 8a.

Figure 3:
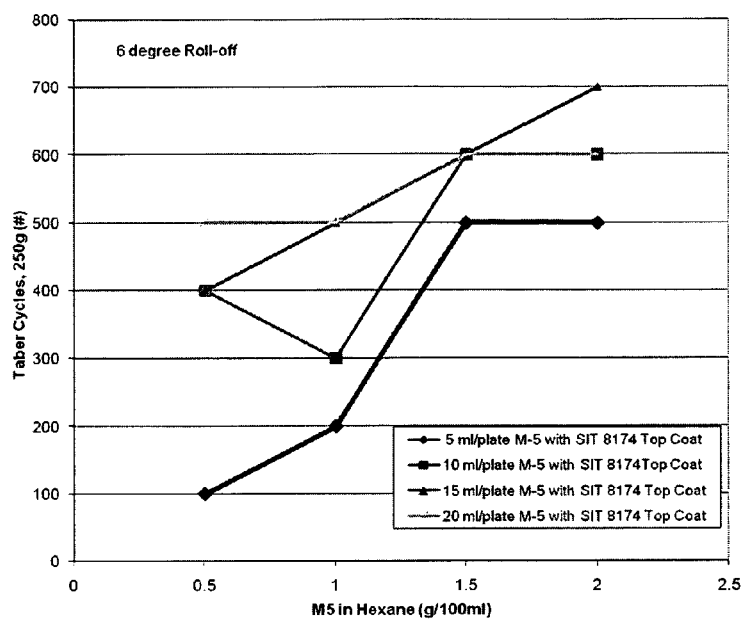
FIG. 3 shows resistance to abrasion measured by the number of abrasion cycles in a Taber test for different concentrations and amounts of M5silica treated with the silanizing agent SIT8174 applied to a base coat on aluminum plates.
Figure 4:
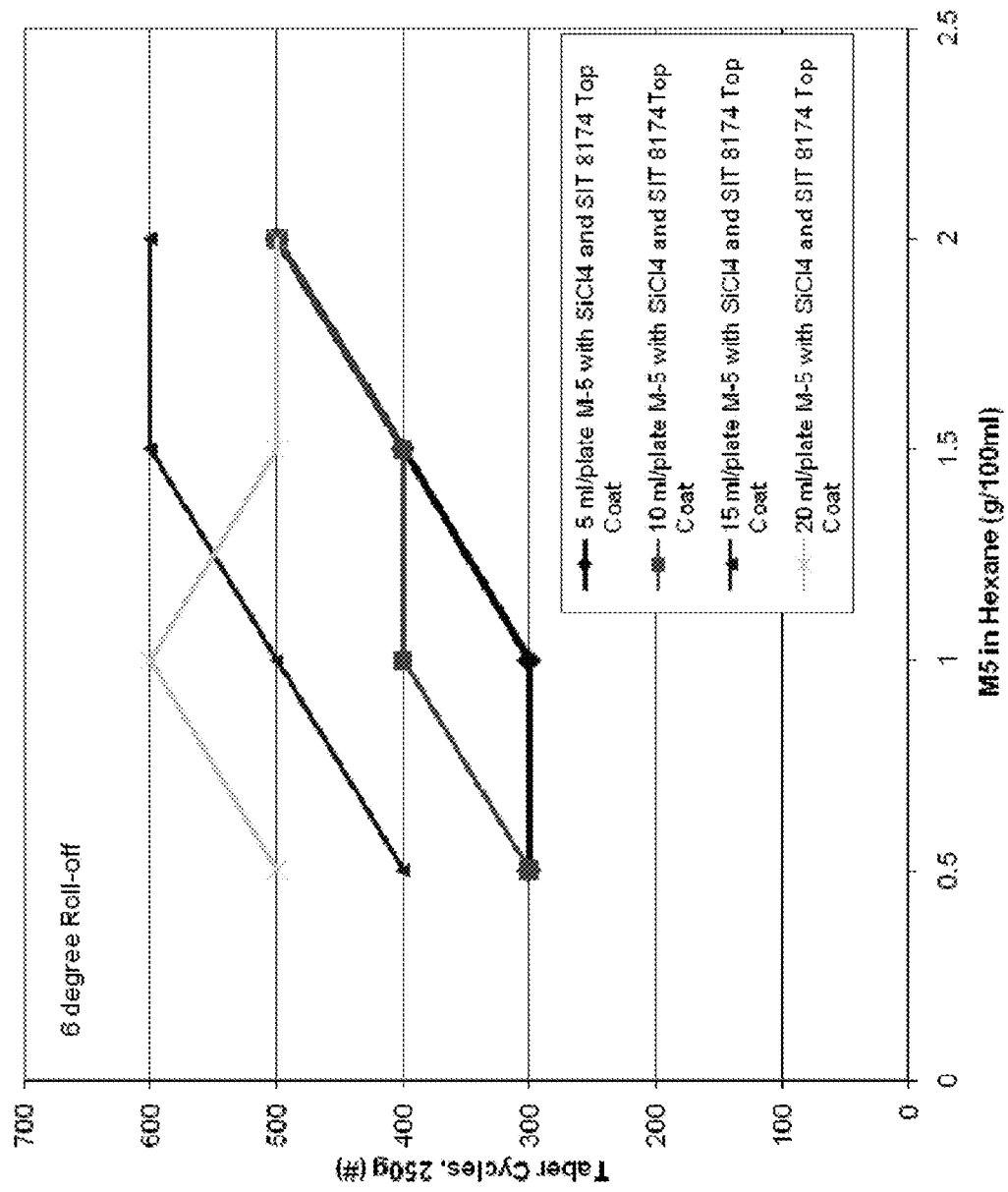
FIG. 4 shows resistance to abrasion measured by the number of abrasion cycles in a Taber test for different concentrations and amounts of M5silica treated with the $SiCl_4$ followed the silanizing agent SIT8174 applied to a base coat on aluminum plates.

The contact angle data for before and after Taber testing is shown in Table 8b. Data for 6° water roll-off angle tests (see Example 1) after the indicated number of abrasion cycles on the Taber Abraser is plotted in FIGS. 3 and 4 for plates receiving 5, 10, 15, Or 20 ml of M5 silica at the indicated M5 to hexane weight to volume ratios. The data suggest that fillers increase the durability of the coatings.

TABLE 8a

Optimization of M5 Top Coat During Taber Testing

| | 0.5 g M5 in 100 Hexane Amount of Taber Rubs | 1.0 g M5 in 100 Hexane Amount of Taber Rubs | 1.5 g M5 in 100 Hexane Amount of Taber Rubs | 2.0 g M5 in 100 Hexane Amount of Taber Rubs |
|---|---|---|---|---|
| M5 Top Coat/Polane then 8174 Taber 250 g Rub Data at 6° | | | | |
| 5 ml per plate sprayed | 100 | 200 | 500 | 500 |
| 10 ml per plate sprayed | 400 | 300 | 600 | 600 |
| 15 ml per plate sprayed | 400 | 500 | 600 | 700 |
| 20 ml per plate sprayed | 500 | 500 | 600 | 600 |
| M5 Top Coat/Polane then SiCl4 and 8174 Taber 250 g Rub Data at 6° | | | | |
| 5 ml per plate sprayed | 300 | 300 | 400 | 500 |
| 10 ml per plate sprayed | 300 | 400 | 400 | 500 |
| 15 ml per plate sprayed | 400 | 500 | 600 | 600 |
| 20 ml per plate sprayed | 500 | 600 | 500 | 500 |
| M5 Top Coat/Polane then 8174 Only Taber 250 g Rub Data at 9° | | | | |
| 5 ml per plate sprayed | 200 | 300 | 600 | 600 |
| 10 ml per plate sprayed | 500 | 400 | 700 | 700 |
| 15 ml per plate sprayed | 500 | 600 | 700 | 800 |
| 20 ml per plate sprayed | 600 | 600 | 700 | 700 |

TABLE 8a-continued

Optimization of M5 Top Coat During Taber Testing

Figure 5:
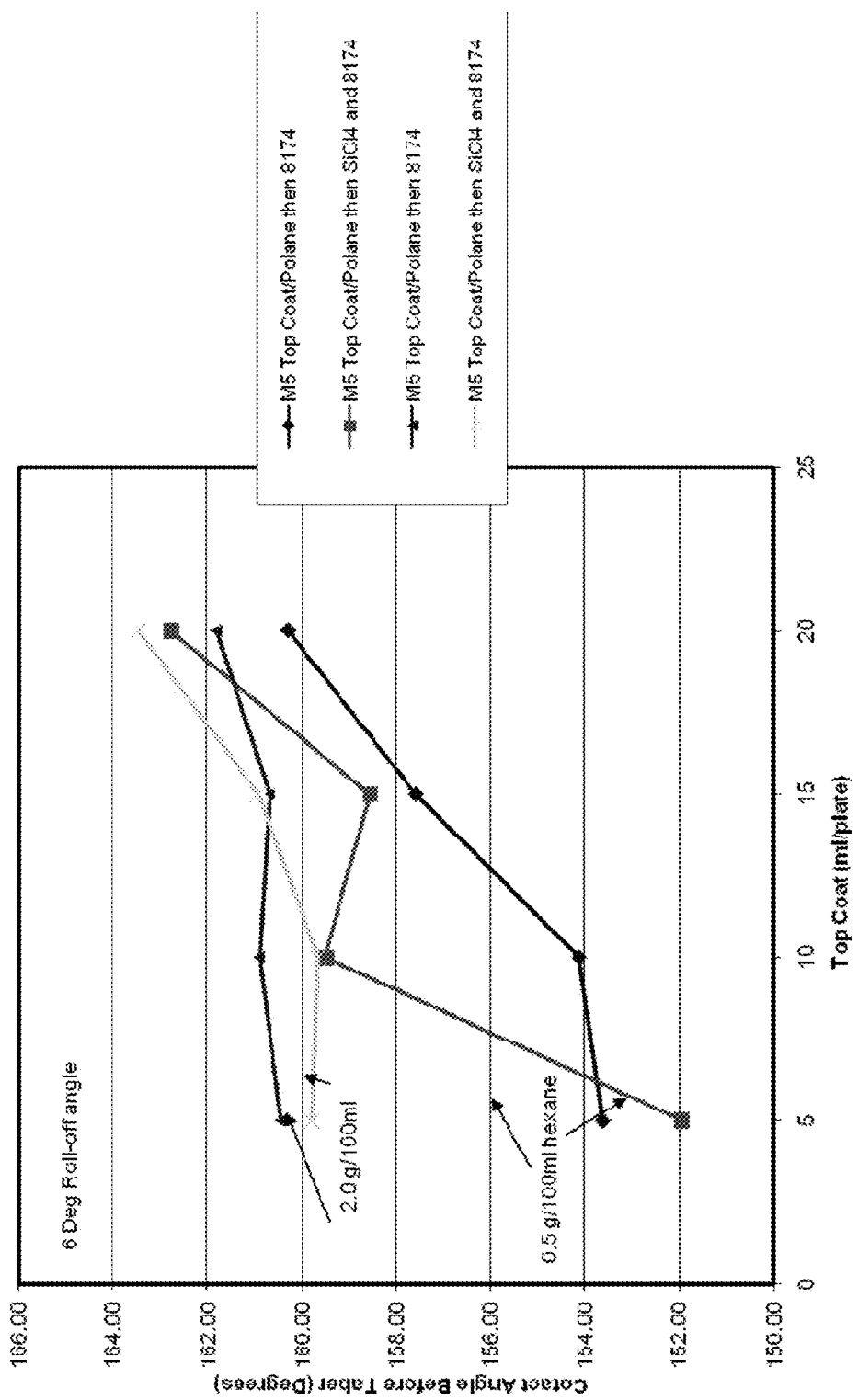
FIG. 5 graphs contact data for water measured at 18°-22° C. on plates treated with a HP/OP coating before Taber testing plotted as a function of the amount of treated silica (M5 fumed silica treated with either the silanizing agent SIT8174 or $SiCl_4$ followed the silanizing agent SIT8174) applied to a base coating during plate preparation.
Figure 6:
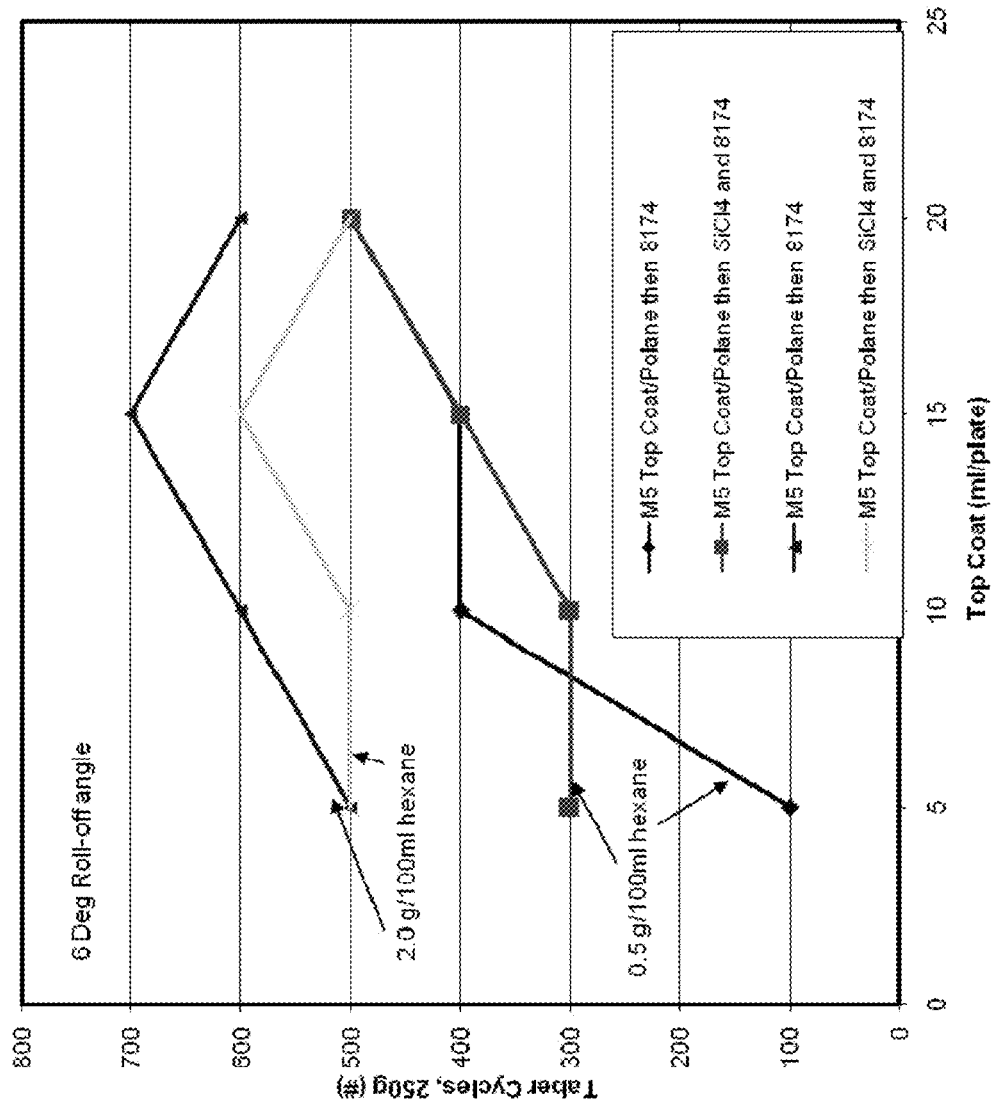
FIGS. 6 and 7 show plots of the abrasion resistance as measured by Tabor abrasion cycles plotted as a function of the amount of treated silica (M5 fumed silica treated with either the silanizing agent SIT8174 or $SiCl_4$ followed the silanizing agent SIT8174) for the plates described in FIG. 3. The end of hydrophobicity is assessed by the propensity of water droplets to remain on plates inclined at a 6° (FIG. 4), or a 9° (FIG. 5) from level.
Figure 7:
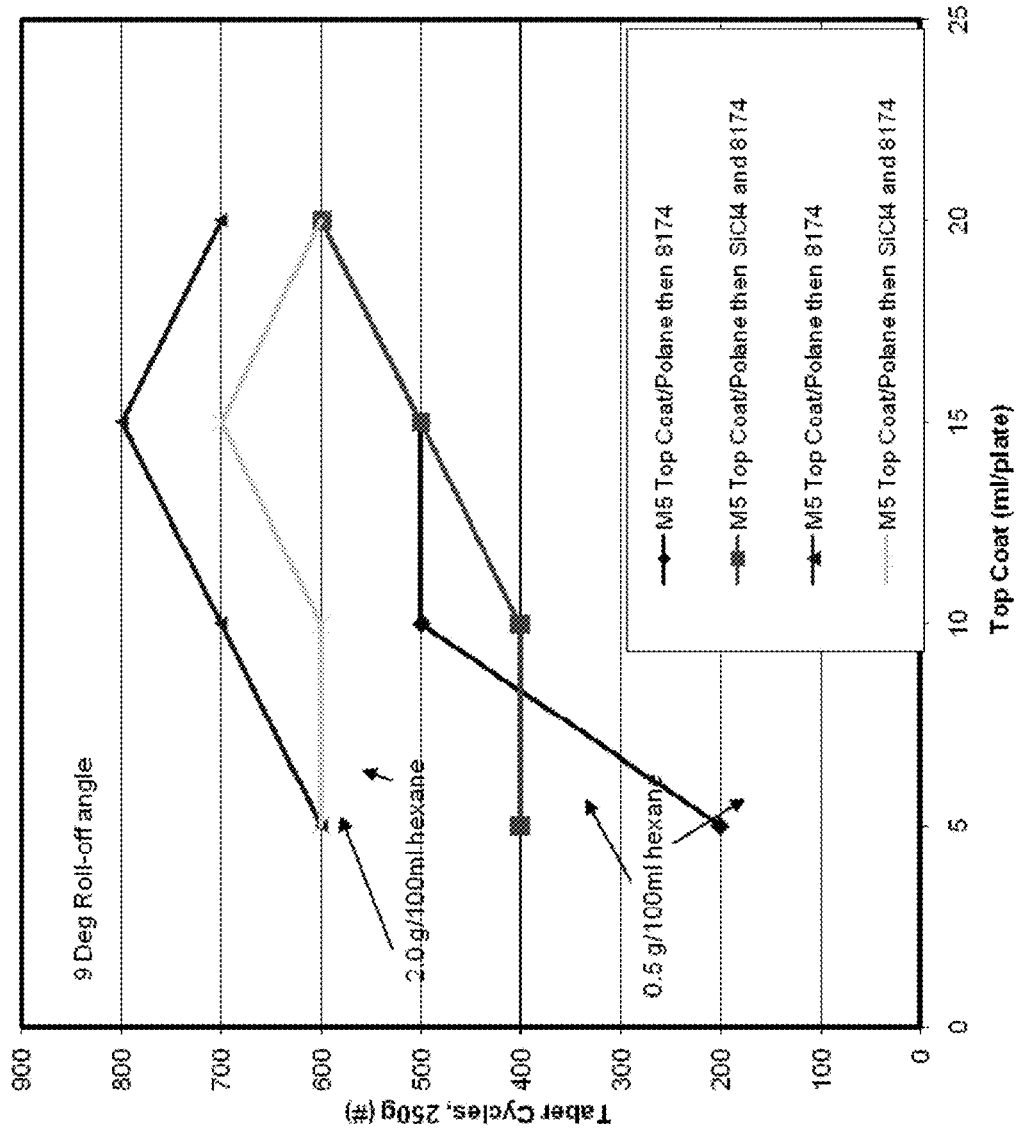
Figure 8:
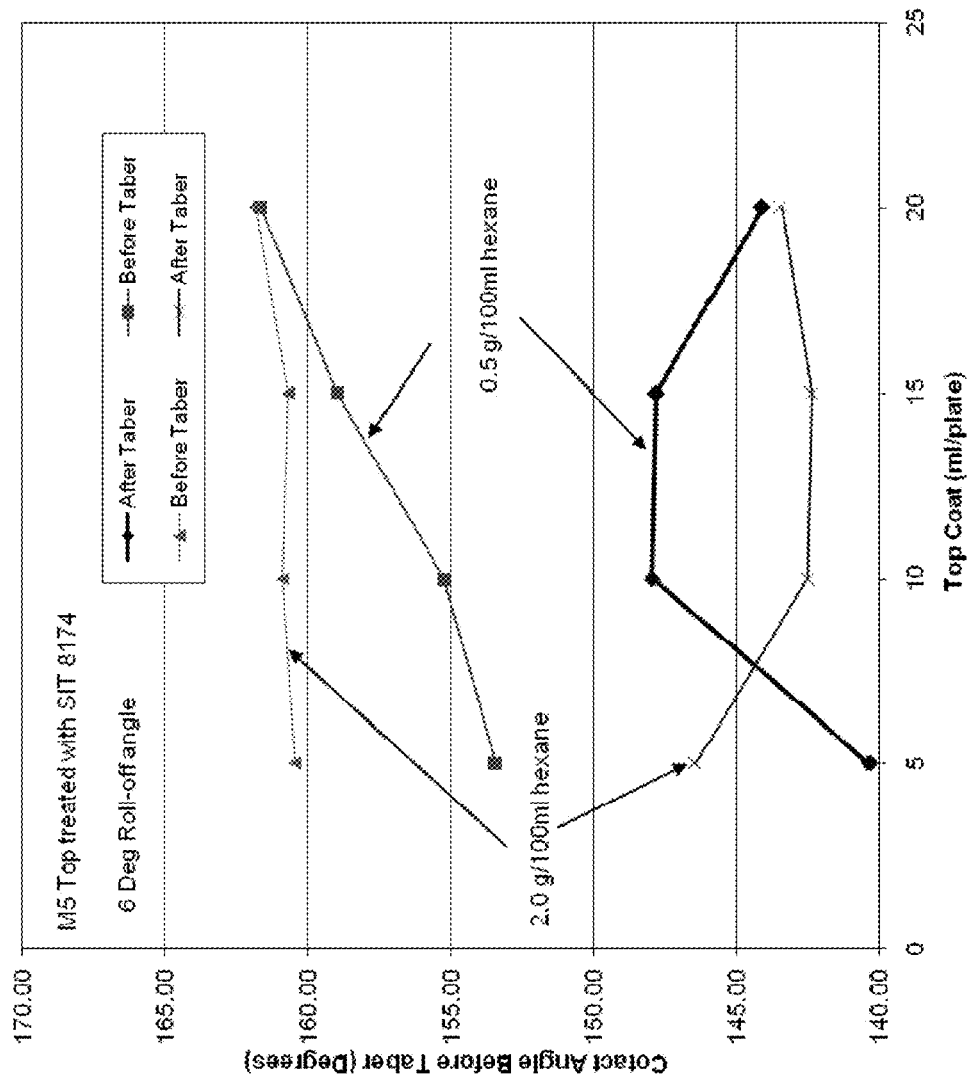
FIGS. 8 and 9 show plots of the water contact angle measured at 18°-22° C. after abrasion testing, plotted as a function of the amount of treated silica applied to the plates described in FIG. 3. The end of hydrophobicity is assessed the propensity of water droplets to remain on plates inclined at 6° (FIG. 4), or 9° (FIG. 5) from level.
Figure 9:
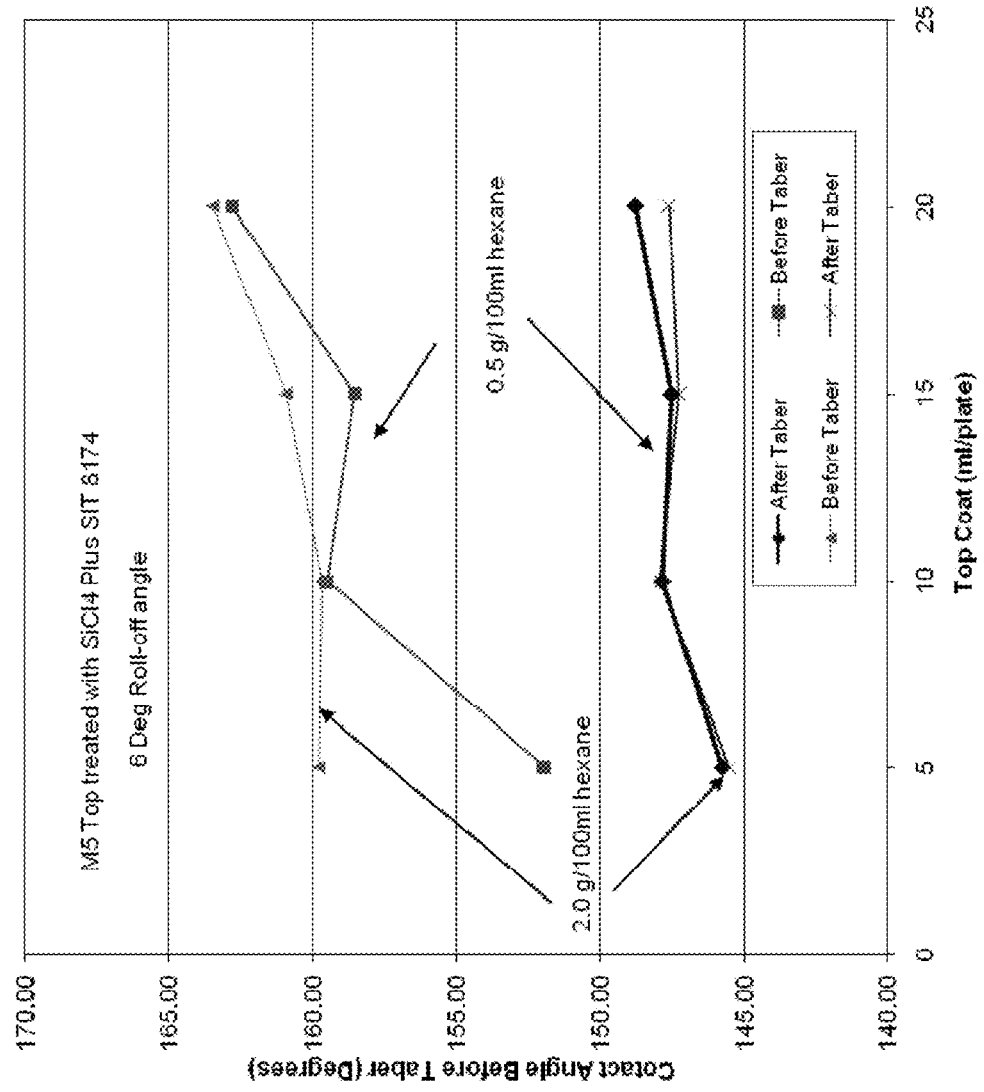

|  | 0.5 g M5 in 100 Hexane Amount of Taber Rubs | 1.0 g M5 in 100 Hexane Amount of Taber Rubs | 1.5 g M5 in 100 Hexane Amount of Taber Rubs | 2.0 g M5 in 100 Hexane Amount of Taber Rubs |
|---|---|---|---|---|
| M5 Top Coat/Polane then SiCl4 and 8174 Taber 250 g Rub Data at 9° | | | | |
| 5 ml per plate sprayed | 400 | 400 | 500 | 600 |
| 10 ml per plate sprayed | 400 | 500 | 500 | 600 |
| 15 ml per plate sprayed | 500 | 600 | 700 | 700 |
| 20 ml per plate sprayed | 600 | 700 | 600 | 600 | solution in hexane using 1 to 2 ml per 4×4 plate) as described above in Example 8a. Contact angle data for the plates with water droplets before Taber testing (250 g load) is plotted in FIG. 5. Each of the coatings has a contact angles greater than 150°, indicating that they display superhydrophobicity. Results for 6° and 9° roll-off angle analysis following Taber abrasion measurements are plotted in FIGS. 6 and 7 as a function of the volume of M5 suspension applied to the plates (ml/plates). FIGS. 8 and 9 plot the contact angle after Taber testing. For Taber testing using a 6° roll-off angle to assess the end of superhydrophobicity, the contact angle of water with the surface drops by about 15-20° at the point where the plate's performance is no longer considered superhydrophobic (test angles are <about 150°). Although, the plates are no longer considered superhydrophobic at the end of Taber testing (typical contact angles are between 140-148°), with angles greater than 120°, the Taber-tested coatings are still quite hydrophobic.

TABLE 8b

Contact Angle Data for Before and After Taber Testing

|  | 0.5 g M5 in 100 Hexane | | | 1.0 g M5 in 100 Hexane | | | 1.5 g M5 in 100 Hexane | | | 2.0 g M5 in 100 Hexane | | |
|---|---|---|---|---|---|---|---|---|---|---|---|---|
|  | Contact Angle Left | Contact Angle Right | Avg | Contact Angle Left | Contact Angle Right | Avg | Contact Angle Left | Contact Angle Right | Avg | Contact Angle Left | Contact Angle Right | Avg |
| M5 Top Coat/Polane Then 8174 Only Contact Angle Before Taber 250 g | | | | | | | | | | | | |
| 5 ml per plate sprayed | 153.40 | 153.86 | 153.63 | 158.73 | 158.77 | 158.75 | 158.72 | 158.56 | 158.64 | 162.03 | 158.87 | 160.45 |
| 10 ml per plate sprayed | 155.25 | 153.01 | 154.13 | 161.42 | 157.66 | 159.54 | 160.49 | 161.04 | 160.77 | 160.97 | 160.85 | 160.91 |
| 15 ml per plate sprayed | 158.95 | 156.18 | 157.57 | 158.15 | 160.30 | 159.23 | 161.82 | 158.83 | 160.33 | 162.04 | 159.32 | 160.68 |
| 20 ml per plate sprayed | 161.66 | 158.91 | 160.29 | 161.30 | 161.98 | 161.64 | 162.72 | 162.94 | 162.83 | 161.86 | 161.77 | 161.82 |
| M5 Top Coat/Polane then 8174 Only Contact Angle After Taber 250 g | | | | | | | | | | | | |
| 5 ml per plate sprayed | 140.35 | 140.29 | 140.32 | 136.42 | 137.05 | 136.74 | 145.99 | 145.05 | 145.52 | 146.04 | 146.78 | 146.41 |
| 10 ml per plate sprayed | 147.32 | 148.54 | 147.93 | 147.67 | 148.11 | 147.89 | 146.63 | 146.38 | 146.51 | 142.58 | 142.40 | 142.49 |
| 15 ml per plate sprayed | 147.05 | 148.55 | 147.80 | 146.67 | 144.75 | 145.71 | 147.17 | 147.15 | 147.16 | 142.58 | 142.10 | 142.34 |
| 20 ml per plate sprayed | 144.11 | 144.08 | 144.10 | 148.27 | 147.35 | 147.81 | 143.82 | 143.83 | 143.83 | 142.83 | 143.97 | 143.40 |
| M5 Top Coat/Polane then SiCl4 and 8174 Contact Angle Before Taber 250 g | | | | | | | | | | | | |
| 5 ml per plate sprayed | 152.44 | 151.44 | 151.94 | 155.19 | 156.01 | 155.60 | 158.10 | 160.33 | 159.22 | 159.95 | 159.66 | 159.81 |
| 10 ml per plate sprayed | 158.63 | 160.36 | 159.50 | 158.85 | 160.51 | 159.68 | 161.22 | 160.93 | 161.08 | 160.54 | 158.79 | 159.67 |
| 15 ml per plate sprayed | 159.49 | 157.62 | 158.56 | 160.73 | 157.20 | 158.97 | 161.92 | 162.12 | 162.02 | 162.75 | 159.10 | 160.93 |
| 20 ml per plate sprayed | 162.14 | 163.41 | 162.78 | 161.28 | 159.04 | 160.16 | 162.45 | 161.41 | 161.93 | 162.19 | 164.72 | 163.46 |
| M5 Top Coat/Polane then SiCl4 and 8174 Contact Angle After Taber 250 g | | | | | | | | | | | | |
| 5 ml per plate sprayed | 145.71 | 145.84 | 145.78 | 148.70 | 149.69 | 149.20 | 146.07 | 146.56 | 146.32 | 144.40 | 146.65 | 145.53 |
| 10 ml per plate sprayed | 148.46 | 147.22 | 147.84 | 148.69 | 148.61 | 148.65 | 147.90 | 147.61 | 147.76 | 147.95 | 147.82 | 147.89 |
| 15 ml per plate sprayed | 148.29 | 146.70 | 147.50 | 146.39 | 147.57 | 146.98 | 144.57 | 146.55 | 145.56 | 146.39 | 148.10 | 147.25 |
| 20 ml per plate sprayed | 148.93 | 148.62 | 148.78 | 147.69 | 147.97 | 147.83 | 147.54 | 148.23 | 147.89 | 146.50 | 148.67 | 147.59 |

Example 8b

Initial water contact angle and Tabor Abraser durability measurements are conducted on 4 inch×4 inch aluminum plates base coated with POLANE® B and top coated with M5 silica suspended at a concentrations of 0.5 or 2% w/v. After curing the plates are treated with either SIT8174 or $SiCl_4$+SIT8174 (SIT8174 10% solution in hexane and $SiCl_4$ 1%

Example 9

Durable Superhydrophobic and Oleophobic Coatings Formed in a Single Step (One-Step) Process Coatings displaying superhydrophobic and oleophobic behavior can applied to surfaces in a single step process. Such processes may employ a binder to which second particles bearing an alkyl or haloalkyl group (covalently attached directly or indirectly, such as through a Si atom or a series of bonds through oxygen and silicon atoms) are added to the binder in the presence of about 5% of a block copolymer described below and an optional first particle (e.g., filler). Such compositions typically require thinning with a binder compatible solvent for spray application.

For this example, a block copolymer is prepared by reacting 3.13 g styrene, 1.92 g butyl acrylate, 12.32 g butyl methacrylate, 4.25 g glycidyl methacrylate, and 100 ml toluene in a reaction flask with stirring at 85° C. A solution of 0.2 g AIBN in 2.5 ml toluene is added into the flask and mixture is maintained at 85° C. for 3 hours. A second amount of AIBN in toluene is added and the reaction is continued for anther 3 hours. The reaction mixture is cooled at room temperature and the resulting acrylic polymer is precipitated with hexane, filtered, and dried under vacuum at 40° C. for 24 hr prior to use.

Example 9a One Step Coatings Prepared with TS-720 Fumed Silica and Nanogel TLD201

Specific details of exemplary durable superhydrophobic/oleophobic coatings prepared on 4 inch by 4 inch aluminum plates employing a one-step process using the components given in Table 9a-1. Two plates employ fumed silica second particles (TS-720) treated with polydimethylsiloxane, two employ Nanogel TLD201, which is treated with hexamethyldisiloxane, and two employ Nanogel TLD201 and S60 glass particles as a filler. All plates are cured at 200 F for 90-120 min after air drying.

TABLE 9a-1

Details of One-Step Coating Process using POLANE ® B, a Binder, and a Block Copolymer

| Sample | Polane ® B (g) | Co-Block Polymer (g) | Polane Reducer (ml) | Silica Particles (g) TS-720 | Silica Particles (g) Nanogel TLD201 | S60 Filler (g) |
|---|---|---|---|---|---|---|
| P-C-1 | 18 | 1.0 | 10 | 2.8 | | — |
| P-C-2 | 18 | 1.0 | 10 | 2.8 | | — |
| P-C-3 | 18 | 1.0 | 20 | 2.6 | | 2.0 |
| P-C-4 | 18 | 1.0 | 20 | 2.6 | | 2.0 |
| P-C-5 | 18 | 1.0 | 20 | | 2.6 | — |
| P-C-6 | 18 | 1.0 | 20 | | 2.6 | — |

$^a$All plates were cured for 90-120 min at 200° F. in an electric oven.

All plates are tested for their durability and water contact angle. The durability is tested with the manual abrasion method (see Example 1) and also with a Taber machine employing a 250-g load. Data are summarized in Table 9a-2.

The durability data were taken for three roll-off angles of 3°, 6°, and 9°. The contact angle was measured before and after durability assessment with a Taber "Abraser". The contact angle before abrasion testing for all six plates is between 161°-163°, implying that all of them are superhydrophobic as the contact angle with water exceeds 150° at room temperature. The coatings substantially retained their water repellant nature after abrasion, which was measured in in two areas of the plates (left and right) before and after Taber abrasion testing.

Example 9b. One Step Coatings Prepared with HK400, HK400T and TLD201 Nanogel Coatings displaying superhydrophobic and oleophobic behavior are prepared with a urethane binder (POLANE® B) to which are added the indicated second particles and a filler a described below. The compositions are thinned as required with a binder compatible solvent for spray applications.

HK400T nanoparticles (second particles) are prepared by treating ACEMATT® HK400 nanoparticles (Evonick Industries, distributed by The Cary Co., Addison, Ill.) with Gelest silanizing agent SIT8174.0 (tridecafluoro-1,1,2,2-tetrahydrooctyl)trichlorosilane. The particles (50-g) are prepared by stirring with a 400-ml of a 1% w/v solution in hexane for 6 hours. Hexane is allowed to evaporate away and residual hexane is removed by heating the mixture to 200° F. for 6 hours.

HK400T particles may also be prepared by pre-treating a 50 g sample of HK400 particles with 2 grams of Gelest silanizing agent SIT8174.0 (tridecafluoro-1,1,2,3-tetrahydrooctyl)trichlorosilane by blending the materials together in a mixer for 30 seconds. An additional 2 grams of the silanizing agent is added to the mixture and it is blended for 45

TABLE 9a-2

Durability Data using Hand Rub and Taber for Superhydrophobic Coatings Prepared by One-Step Process (See Table for Coating Details)

| Sample No. | Rub Method (g) Hand | Rub Method (g) Taber | Rubs/Cycles (° Roll-Off) 3 | Rubs/Cycles (° Roll-Off) 6 | Rubs/Cycles (° Roll-Off) 9 | CA Before Left | CA Before Right | CA Before Average | CA After Left | CA After Right | CA After Average |
|---|---|---|---|---|---|---|---|---|---|---|---|
| P-C-1 | 800 | | 40 | 60 | 80 | | | | | | |
| P-C-2 | | 250 | 10 | 15 | 30 | 163.89 | 161.73 | 162.81 | 147.68 | 148.01 | 147.85 |
| P-C-3 | 800 | | 60 | 120 | 160 | | | | | | |
| P-C-4 | | 250 | 20 | 70 | 100 | 163.74 | 162.19 | 162.97 | 148.49 | 147.36 | 147.93 |
| P-C-5 | 800 | | 80 | 160 | 300 | | | | | | |
| P-C-6 | | 250 | 40 | 100 | 200 | 163.59 | 162.19 | 162.89 | 149.3 | 148.58 | 148.94 | seconds further. The treated powder was placed in a PYREX® dish and dried at 200° F. for 12 hours.

Particles of TLD201 Nanogel, which are treated with hexamethyldisiloxane are used as purchased from Cabot Corp., Billerica, Mass.

First particles are selected from 512 Black (Size microns, Xiom Corp., West Babylon, N.Y.) and S60 glass bubbles (15-65 microns, 3M Corporation). For this Example, S60 glass bubbles are prepared by treating a 50-g batch of the glass bubbles with 1.25 ml of SIT8174.0 in 50 ml of solvent. The mixture is blended for about 1 to 2 hours followed by a baking for 3 hours at 200° F.

The details of the preparation of six 4 inch by 4 inch aluminum plates coated with a one-step process are set forth below (coatings 9b-1 to 9b-6). For each coating, the coated plates are tested for contact angle and coating durability using both the manual abrasion method (see "hand rubs" see Example 1) and on the Taber Abraser unit with a 250-g load. Roll off angle data is obtained for both the manual abrasion and Taber sample testing at a 6° angle. Data for coatings 1-6 are summarized in Table 9b.

Coating 9b-1—A mixture of POLANE® B (6 ml), POLANE® A (1 ml), POLANE® Reducer (5 ml), HK400T second particles treated with SIT8174.0 (2 g) is prepared. For preparation of the mixture POLANE® B, POLANE® A and POLANE® reducer (6:1:5) is mixed thoroughly and the HK400T is mixed into the mixture. After the coating composition is mixed thoroughly, two aluminum plates are each sprayed with about 3.5 ml of the mixture and immediately cured at 200° F. for 2 hours.

Coating 9b-2—A mixture of POLANE® B (6 ml), POLANE® A (1 ml), POLANE® Reducer (8 ml), HK400T second particles treated with SIT8174.0 (1 g) and TLD201 second particles (0.75 g) is prepared. For preparation of the mixture POLANE® B, POLANE® A and POLANE® reducer (6:1:8), is mixed thoroughly and the HK400T and TLD201 are subsequently added to the mixture. After the coating composition is mixed thoroughly, two aluminum plates are each sprayed with about 3.5 ml of the mixture and immediately cured at 200° F. for 2 hours.

Coating 9b-3—A mixture of POLANE® B (6 ml), POLANE® A (1 ml), POLANE® Reducer (3 ml), HK400T second particles treated with SIT8174.0 (1 g) and 512 Black filler (1 g) is prepared. For preparation of the mixture POLANE® B, POLANE® A and POLANE® reducer (6:1:3), is mixed thoroughly and the HK400T and 512 Black filler are subsequently added to the mixture. After the coating composition is mixed thoroughly, two aluminum plates are each sprayed with about 3.5 ml of the mixture and immediately cured at 200° F. for 2 hours.

Coating 9b-4—A mixture of POLANE® B (6 ml), POLANE® A (1 ml), POLANE® Reducer (3 ml), HK400T second particles treated with SIT8174.0 (1.35 g) and S60 glass bubbles as a filler (1.35 g) is prepared. For preparation of the mixture POLANE® B, POLANE® A and POLANE® reducer (6:1:3), is mixed thoroughly and the HK400T and S60 filler are subsequently added to the mixture. After the coating composition is mixed thoroughly, two aluminum plates are each sprayed with about 3.5 ml of the mixture and immediately cured at 200° F. for 2 hours.

Coating 9b-5—A mixture of POLANE® B (6 ml), POLANE® A (1 ml), POLANE® Reducer (3 ml), HK400T second particles treated with SIT8174.0 (1 g) and S60 glass bubbles as a filler (1 g) is prepared. For preparation of the mixture POLANE® B, POLANE® A and POLANE® reducer (6:1:3), is mixed thoroughly and the HK400T and S60 filler are subsequently added to the mixture. After the coating composition is mixed thoroughly, two aluminum plates are each sprayed with about 3.5 ml of the mixture and immediately cured at 200° F. for 2 hours.

Coating 9b-6—A mixture of POLANE® B (6 ml), POLANE® A (1 ml), POLANE® Reducer (2 to 3 ml), POLANE® Accelerator (3 ml), HK400T second particles treated with SIT8174.0 (1.25 g) and S60 glass bubbles as a filler (0.7 g) is prepared. For preparation of the mixture POLANE® B, POLANE® A, POLANE® reducer and POLANE® Accelerator, is mixed thoroughly and the HK400T and S60 filler are subsequently added to the mixture. After the coating composition is mixed thoroughly, two aluminum plates are each sprayed with about 3.5 ml of the mixture and immediately cured at 200° F. for 2 hours.

TABLE 9b

Summary of Coating Details and Obtained Superhydrophobic Performance for One-Step Coating Process (All data is for 4 inch × 4 inch aluminum plates)

| | One-Step Coating Details | | | | | | | | | Performance | | |
|---|---|---|---|---|---|---|---|---|---|---|---|---|
| | Polane (mL) | | | | | Particle Amount | | Amount Sprayed per Plate | Cure (° F./ Time) | Contact Angle | Hand Rubs (800-g Load) | Taber Rubs (250-g Load) |
| Exp. | B | A | Reducer | Accelerator | Particle Type | (g) | (%) | | | | | |
| 1 | 6 | 1 | 5 | | HK400 (SIT8174.0) Treated | 2 | 16.6 | 43.2 | 200/2 h | 161 | 400-600 | 100-150 |
| 2 | 6 | 1 | 8 | | HK400 (SIT8174.0) Treated + TLD201 Nanogel | 1.0 + 0.15 | 6.67 + 5.0 | 43.2 | 200/2 h | 165 | 500-600 | 100-125 |
| 3 | 6 | 1 | 3 | | HK400 (SIT8174.0) Treated + 512 Black | 1.0 + 1.0 | 10.0 + 10.0 | 43.2 | 200/2 h | 157 | 600-800 | 350-400 |
| 4 | 6 | 1 | 3 | | HK400 (SIT8174.0) Treated + S60 Glass Bubbles (SIT8174.0) Treated | 1.35 + 1.35 | 13.5 + 13.5 | 43.2 | 200/2 h | 160 | Not Tested | 200 |
| 5 | 6 | 1 | 3 | | HK400 (SIT8174.0) Treated + S60 Glass Bubbles (SIT8174.0) Treated | 1.0 + 1.0 | 10.0 + 10.0 | 43.2 | 200/2 h | 161 | Not Tested | 300 |

TABLE 9b-continued

Summary of Coating Details and Obtained Superhydrophobic Performance for
One-Step Coating Process (All data is for 4 inch × 4 inch aluminum plates)

| | | One-Step Coating Details | | | | | | | Performance | | |
|---|---|---|---|---|---|---|---|---|---|---|---|
| | | Polane (mL) | | | | Particle Amount | | Amount Sprayed per Plate | Cure (° F./ Time) | Contact Angle | Hand Rubs (800-g Load) | Taber Rubs (250-g Load) |
| Exp. | B | A | Reducer | Accelerator | Particle Type | (g) | (%) | | | | | |
| 6 | 6 | 1 | 3 | 2 | HK400 (SIT8174.0) Treated + S60 Glass Bubbles (SIT8174.0) Treated | 1.25 + 0.70 | 12.5 + 7.0 | 43.2 | 200/2 h | 162 | 1000+ | 500+ |

Example 10

The Effect of Filler Content on the Performance of Durable Superhydrophobic Coatings (Optimizing Filler Effect on Superhydrophobic (SH) Coating Durability)

A set of 4 inch×4 inch aluminum plates are prepared by coating with a base coat comprising a mixture of POLANE® A and POLANE® B (1:6) containing the indicated amounts of either S60 glass beads (3M™, St. Paul, Minn.) or XIOM-512 black (Xiom Corp, West Babylon, N.Y.) filler (from 10% to 60% w/w). After the base coat applied to the plates had air dried, they were top coated with 10 ml per plate of untreated M5 fumed silica (particle size, Cabot Corp., Billerica, Mass.) as a 2% w/v suspension in hexane. The top coated palates are dried for 90 min at 93° C. After cooling, the plates are first treated with 1-2 ml of 10% $SiCl_4$ in hexane, and after the hexane has evaporated with 1-2 ml of the silanizing agent SIT 8174.0 (1% in hexane). All coating applications were made using an air spray gun. After all visible hexane evaporates, the plates are given a final thermal curing at 93° C. for 2-8 hours.

After the final thermal cure samples are tested for durability by using a Taber Abraser with a 250 g load. All samples are also tested to for end-of-life by determining the roll-off angle with a plate set a 6° incline at 25 abrasion cycle increments. End-of-life is determined by the propensity of more than half of a set of water drops (typically 20 drops per test set) to stick to the area subject to abrasion testing when the plate is set at a 6° degree angle from level.

Figure 10:
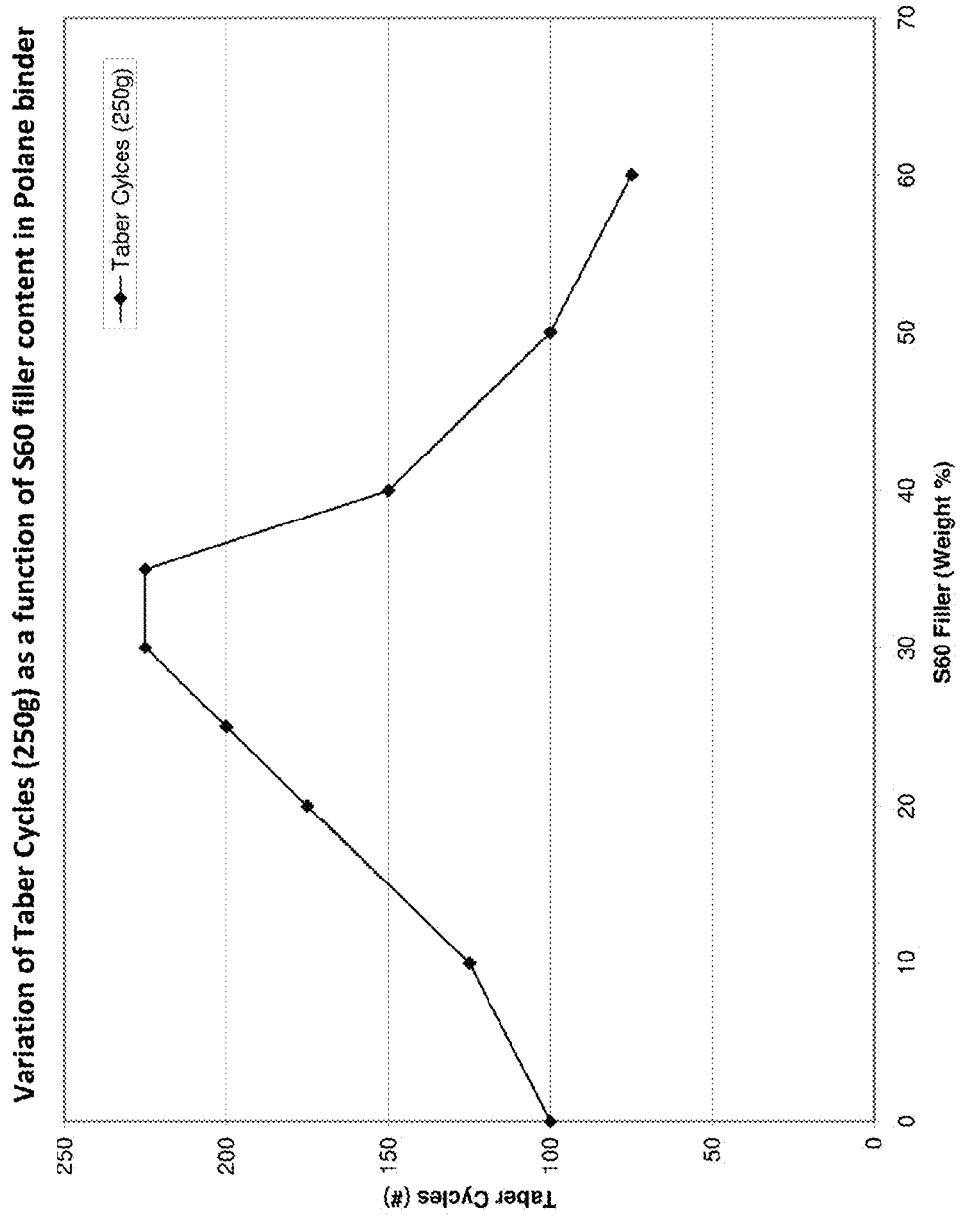
FIG. 10 (Panels 10a and 10b) are plots of the variation in abrasion resistance (measured by Taber cycle) as a function of first particle content on a percent weight basis; S60 second particles in Panel 10a (see Table 10b), or 512 Black second particles in Panel 10b (see table 10d).
Figure 10:
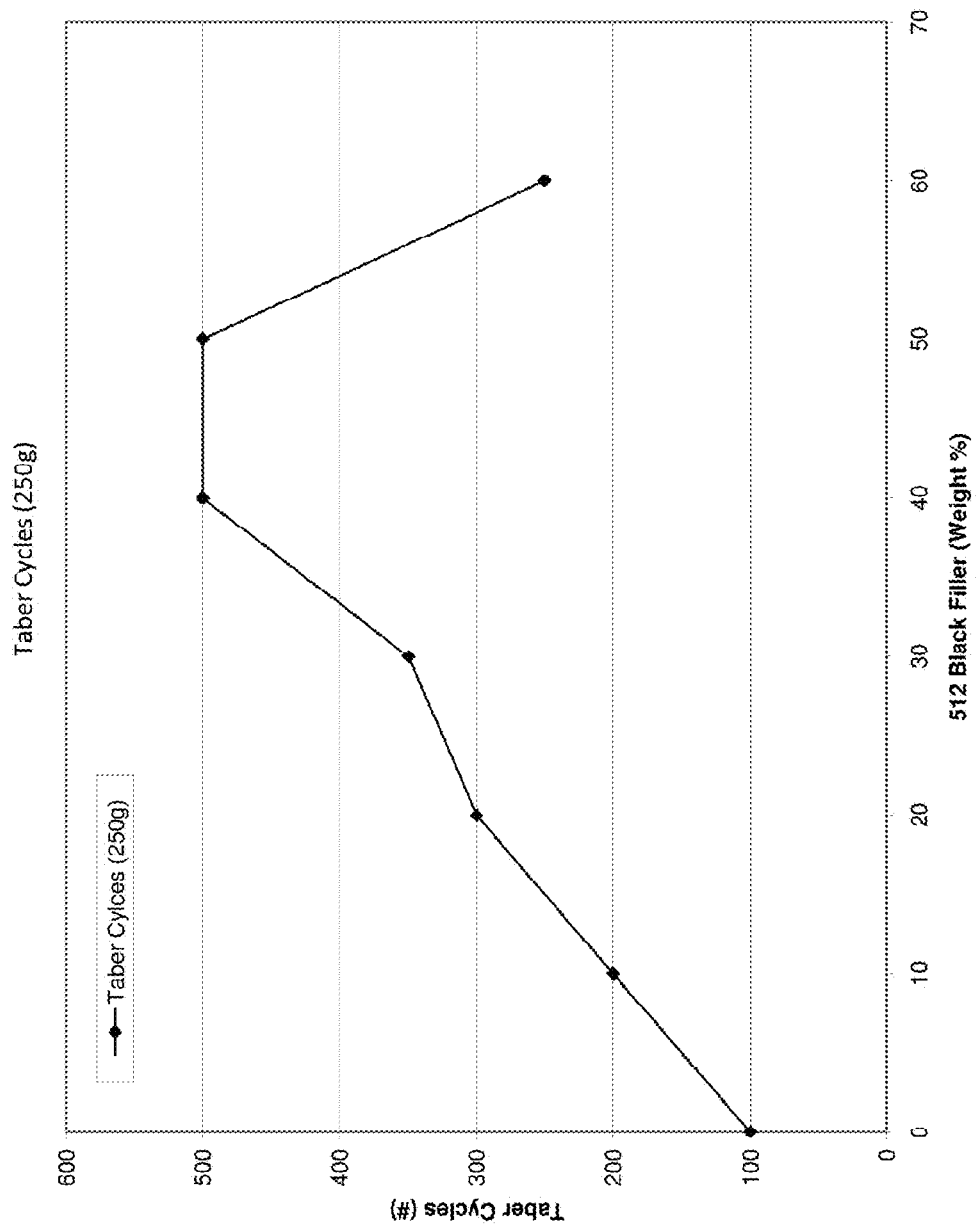

Data for coatings prepared with S60 filler is summarized in Tables 10a and 10b. Table 10a gives the coating compositions leading to a S60 content from 10 to 60%. Table 10b sets forth the weight change as a measure of abrasion resistance obtained after the indicated number of abrasion cycles on a Taber Abraser apparatus. Data for coatings prepared with 512 Black filler is summarized in Tables 10c and 10d. Table 10c gives the coating compositions leading to a 512 Black content from 10 to 60%. Table 10d sets forth the weight change as a measure of abrasion resistance obtained after the indicated number of abrasion cycles on a Taber Abraser apparatus. FIGS. 10a and 10b plot the number of abrasion cycles (Taber Abraser cycles) at the end-of-life (determined by a 6° degree roll-off analysis) as a function of the percentage of S60 or 512 Black in the coating composition. The data indicate that first particles can significantly enhance the performance of coatings.

TABLE 10a

Details Polane-binder preparations

| Polane Mixture | Polymer Solids (g) | Filler (S60 Glass) (g) | Percent S60 Comp |
|---|---|---|---|
| 10.0 g | 2.5 g | 0.275 | 10 |
| 10.0 g | 2.5 g | 0.625 | 20 |
| 10.0 g | 2.5 g | 1.072 | 30 |
| 10.0 g | 2.5 g | 1.670 | 40 |
| 10.0 g | 2.5 g | 2.500 | 50 |
| 10.0 g | 2.5 g | 3.750 | 60 |

TABLE 10b

Taber and Weight change data for various levels of S60 Glass filler

| % Comp | Taber Cycles at 6° end-of-life with 250 g load | Starting Weight (g) | Final Weight (g) | Weight Change (g) | Weight Change (%) | Weight Change % per Taber Cycle |
|---|---|---|---|---|---|---|
| 0 | 100 | 43.7847 | 43.774 | 0.0107 | 0.0244 | 0.00024 |
| 10 | 125 | 42.9316 | 42.9023 | 0.0293 | 0.0682 | 0.00055 |
| 20 | 175 | 43.1992 | 43.1704 | 0.0288 | 0.0667 | 0.00038 |
| 25 | 200 | 43.4265 | 43.3943 | 0.0322 | 0.0741 | 0.00037 |
| 30 | 225 | 43.1775 | 43.1453 | 0.0322 | 0.0746 | 0.00033 |
| 35 | 225 | 43.2781 | 43.2366 | 0.0415 | 0.0959 | 0.00043 |
| 40 | 150 | 43.3862 | 43.3402 | 0.0460 | 0.1060 | 0.00071 |
| 50 | 100 | 43.1617 | 43.1003 | 0.0614 | 0.1423 | 0.00142 |
| 60 | 75 | 43.0674 | 42.974 | 0.0934 | 0.2159 | 0.00289 |

TABLE 10c

Details Polane-binder preparations

| Polane Mixture | Polymer Solids (g) | Filler (512 Black) (g) | Percent 512 Comp |
|---|---|---|---|
| 10.0 g | 2.5 g | 0.275 | 10 |
| 10.0 g | 2.5 g | 0.625 | 20 |
| 10.0 g | 2.5 g | 1.072 | 30 |
| 10.0 g | 2.5 g | 1.670 | 40 |
| 10.0 g | 2.5 g | 2.500 | 50 |
| 10.0 g | 2.5 g | 3.750 | 60 |

TABLE 10d

Taber and Weight change data for various levels of 512 thermoplastic filler

| % Comp | Taber Cycles at 6° end-of-life with 250 g load | Starting Weight (g) | Final Weight (g) | Weight Change (g) | Weight Change (%) | Weight Change % per Taber Cycle |
|---|---|---|---|---|---|---|
| 0 | 100 | 43.7847 | 43.774 | 0.0107 | 0.0244 | 0.00024 |
| 10 | 200 | 43.775 | 43.748 | 0.0270 | 0.0617 | 0.00031 |
| 20 | 300 | 43.7771 | 43.7394 | 0.0377 | 0.0861 | 0.00029 |
| 30 | 350 | 43.847 | 43.8045 | 0.0425 | 0.0969 | 0.00028 |
| 40 | 500 | 43.5426 | 43.489 | 0.0536 | 0.1231 | 0.00025 |
| 50 | 500 | 43.8899 | 43.8331 | 0.0568 | 0.1294 | 0.00026 |
| 60 | 250 | 44.6785 | 44.617 | 0.0615 | 0.1377 | 0.00055 |

Example 11

Powder Coat Binder System for SH and OP Surfaces

11a) Two Part Superhydrophobic and Oleophobic Powder Coatings

Aluminum plates, 4 inches by 4-inches are used as test objects for assessment of powder coating binder systems. Table 11a summarizes some results obtained from the use of two powder coatings as binders for the preparation of HP/OP coatings and surfaces; GLSS70, a clear powder from Innotek Powder Coatings LLC (Big Spring, Tex.) and Tiger 39/80170 Black wrinkle powder (TIGER Drylac U.S.A., Reading, Pa.).

In each case, dry powders are sprayed on the aluminum plates as a base coat, followed by heating until the powder coatings begin to melt (details of the application are given in Table 11a). At the melt point, a top coat comprising fumed silica treated with polydimethylsiloxane (TS-720 CAB-O-SIL TS-720, Cabot Corp., Billerica, Mass.) as a 4.2% or 2.1% suspension in acetone is applied to the base coat by spraying. The top-coated plates are heated to 400° F. (about 200° C.) for 10 min. Plates treated with Innotek powder coating resulted in superhydrophobic behavior and achieved about 325 cycles (rubs) in the manual abrasion test conducted as in Example 1. Manual abrasion testing of sample 3, which was prepared with a top coating that contained 5% TS-720 and 20% of the Innotek base coat powder by weight, resulted in similar abrasion behavior (resistance to 325 abrasion cycles in the manual test). Tiger Black wrinkle powder also produced superhydrophobic coatings with lower abrasion resistance the manual abrasion test described in Example 1 (about 50 abrasion cycles). Overall, the highest durability based on this data arises when surfaces are heated to just above the powder coat melting point prior to applying the base and top coats, and curing of the top coat at a temperature near the melting point of the powder coat for about 2-3 min.

TABLE 11a

The Use of Powder Coatings as Binder for the Formation of Superhydrophobic, Hydrophobic and/or Oleophobic Coatings

| | Base Coat | Pretreatment | Top | Cure Treatment | Rubs w/Hand Tool (800-g Load) |
|---|---|---|---|---|---|
| 1. | Innotek GLSS 70 Clear Powder (dry spray) | Heat until powder just begins to melt top coat | 4.2% TS-720 in Acetone | 400° F.-10 min | 325 |
| 2. | Tiger 39/80170 Black Wrinkle Powder (dry spray) | | 4.2% TS-720 in Acetone | 400° F.-10 min | 50 |
| 3. | Innotek GLSS70 Clear Powder (dry spray) | | 5% TS-720 20% GLSS70 in Acetone | 400° F.-10 min | 350 |
| 4. | Innotek GLSS70 Clear Powder | Preheat base plate to 400° F. and immediately dry spray base coat and immediately top coat | 4.2% TS-720 in Acetone | 400° F. until melted | 500-750 |
| 5. | Innotek GLSS70 Clear Powder (spray dry base on cold plate) | Heat it to 400° F. until it begins to melt and apply top coat | 4.2% TS-720 in Acetone | 400° F.-2-3 min | 200 |
| 6. | Innotek GLSS70 Clear Powder (spray dry base on preheated plate) | Preheat plate to slightly above 400° F. before dry spraying base coat followed by immediate top coat | 4.2% TS-720 in Acetone | 400° F. until melted | 825 |

TABLE 11a-continued

The Use of Powder Coatings as Binder for the Formation of Superhydrophobic,
Hydrophobic and/or Oleophobic Coatings

| | Base Coat | Pretreatment | Top | Cure Treatment | Rubs w/Hand Tool (800-g Load) |
|---|---|---|---|---|---|
| 7. | Innotek GLSS70 Clear Powder | Preheat base plate to 400° F. before dry spraying base coat and immediately top coat (Preheat temperature may be below 400° F.) | 2.1% TS-720 in Acetone | 400° F. until melted Heated 5 additional minutes at 400° F. | 300 |

11b) Performance of Two Part Superhydrophobic and Oleophobic Powder Coatings

Table 11b summarizes further results with powder coatings. Again, aluminum plates, 4 inches by 4-inches are used as test objects for assessment of powder coating binder systems employing white Innotek powder coat G17SG101S70, (Innotek Powder Coatings LLC, Big Spring, Tex.). Plates are coated with G17SG101S70 applied to a cold plate, which is heated 10 min at the indicated temperatures, followed by a top coating with suspension of 4.2% TS-720 (fumed silica treated with polydimethylsiloxane) in the indicated solvent, and a final cure of at about 400° F. (see table). Manual abrasion testing conducted as in Example 1 indicated that some samples could resist over 900 abrasion cycles. When heating and cooling cycles are used prior to top coat application, some variation in the abrasion resistance can arise due to the extent of cooling the surfaces have experienced at the time of the top coat application (see e.g., samples 8 and 9).

Results of testing 90-1009R-H under similar conditions indicated that while superhydrophobic and oleophobic surfaces can be formed with that the material did not perform as well in abrasion testing. (data not shown)

Example 12

Effects of First Particles on Hydrophobic, Superhydrophobic and/or Oleophobic Powder Coat Performance Aluminum plates, 4 inches by 4-inches, are coated with Innotek G17SG101S70 containing the indicated first particles as a base coating. The first particles employed are selected from (1) extend spheres SL-150 (3M™, St. Paul, Minn.), (2) S60 HS glass bubbles (3M™, St. Paul, Minn.), (3) R&H 90-1009 Kynar plastic (Rohm & Haas, Philadelphia, Pa.), and (4) S/G extendo spheres (3M™, St. Paul, Minn.). The base coat was heated to 200-210° F., prior to applying a top coat of 4.2% TS-720 (fumed silica treated with polydimethylsiloxane) suspended in hexane. Plates bearing the topcoat are given a final cure at 400° F. for 6 min.

TABLE 11b

Experimental Coating Details for Use of Powder Coats as Binder Systems for
Preheat Temperature Optimization

| | Base Coat | Pretreatment | Top | Cure Treatment | Rubs w/Hand Tool (800-g Load) |
|---|---|---|---|---|---|
| 1. | Innotek G17SG101S70 White Powder | Spray base coat and heat to 225° F. and spray top coat | 4.2% TS-720 in Acetone | 400° F.-5 min | 925 |
| 2. | Innotek G17SG101S70 White Powder | Spray base coat and heat to 242° F. and spray top coat | 4.2% TS-720 in Ethanol | Heat to 387° F. surface temperature | 300 |
| 3. | Innotek G17SG101S70 White Powder | Spray base and heat to 230° F. and spray top coat (plates had cooled to 149° F. when put in for final heat) | 4.2% TS-720 in Acetone | Heat to 392° F. | 600 |
| 4. | 90-1009 R-H Powder | Spray base and heat to 243° F. and spray top coat | 4.2% TS-720 in Acetone | 460° F.-15 min | 200 |
| 5. | Innotek G17SG101S70 White Powder | Spray base and heat to 175° F. and spray top coat | 4.2% TS-720 in Hexane | 400° F.-6 min | 850 |
| 6. | Innotek G17SG101S70 White Powder | Spray base and heat to 300° F. and spray top coat | 4.2% TS-720 in Hexane | 400° F.-6 min | 250 |
| 7. | Innotek G17SG101S70 White Powder | Spray base and heat to 250° F. and spray top coat | 4.2% TS 720 in Hexane | 400° F.-6 min | 800 |
| 8. | Innotek G17SG101S70 White Powder | Spray base and heat to 200° F. and let cool and apply top coat | 4.2% TS-720 in Hexane | 400° F.-6 min | 150 |
| 9. | Innotek G17SG101S70 White Powder | Spray base and heat to 200° F. and let cool and apply top coat | 4.2% TS-720 in Hexane | 400° F.-6 min | 750 |

TABLE 12a

The Preparation and Performance of Coatings Prepared With Powder Coating Binder Systems

| | Base Coat | Filler | Pretreatment | Top | Cure Treatment | Rubs w/Hand Tool (800-g Load) |
|---|---|---|---|---|---|---|
| 1. | Innotek G17SG101S70 White Powder | Extendo spheres SL-150 10% in Innotek base | Spray base coat and heat surface to 200-210° F. | 4.2% TS-720 in Hexane | 400° F.-6 min | 950 |
| 2. | Innotek G17SG101S70 White Powder | S60 HS glass bubbles 10% in Innotek base | Spray base coat and heat surface to 200-210° F. | 4.2% TS-720 in Hexane | 400° F.-6 min | 650 |
| 3. | Innotek 6175G101S70 White Powder | S60/10000 glass bubbles 10% in Innotek base | Spray base coat and heat surface to 200-210° F. | 4.2% TS-720 in Hexane | 400° F.-6 min | 700 |
| 4. | 90-1009 R-H Powder | R&H 90-1009 Kynart plastic 10% in base | Spray base coat and heat surface to 200-210° F. | 4.2% TS-720 in Hexane | 400° F.-6 min | 750 |
| 5. | Innotek GI7SG101S70 White Powder | Extendo spheres SL-150 - 10% IM3OK glass - 10% bubbles in base | Spray base coat and heat surface to 200-210° F. | 4.2% TS-720 in Hexane | 400° F.-6 min | 700 |
| 6. | Innotek G17SG101S70 White Powder | Extendo spheres SL-150 15% in base | Spray base coat and heat surface to 200.210° F. | 4.2% TS-720 in Hexane | 400° F.-6 min | 1100 |
| 7. | Innotek G17SG101S70 White Powder | Extendo spheres SL-150 20% in base | Spray base coat and heat surface to 200-210° F. | 4.2% TS-720 in Hexane | 400° F.-6 min | 1200 |
| 8. | Innotek G17S6101S70 White Powder | Extendo spheres SL-150 25% in base | Spray base coat and heat surface to 200-210° F. | 4.2% TS-720 in Hexane | 400° F.-6 min | 1800 |
| 9. | Innotek G17S6101S70 White Powder | Extendo spheres 5L-150 30% in base | Spray base coat and heat surface to 200-210° F. | 4.2% TS-720 in Hexane | 400° F.-6 min | 1200 |
| 10. | Innotek GI7SG101S70 White Powder | Extendo spheres SGC1367 10% in Innotek base | Spray base coat and heat surface to 200-210° F. | 4.2% TS-720 in Hexane 4.2% TS-720 in Hexane | 400° F.-6 min | 1100 |
| 11. | Innotek G17SG101S70 White Powder | Extendo spheres SGC1367 15% in base | Spray base coat and heat surface to 200-210° F. | 4.2% TS-720 in Hexane | 400° F.-6 min | 1300 |
| 12. | Innotek G17SG101S70 White Powder | Extendo spheres SGC1367 20% in base | Spray base coat and heat surface to 200-210° F. | 4.2% TS-720 in Hexane | 400° F.-6 min | 900 |
| 13. | Innotek G17S6101S70 White Powder | Extendo spheres SGC1367 25% in base | Spray base coat and heat surface to 200-210° F. | 4.2% TS-720 in Hexane | 400° F.-6 min | 1000 |

Example 12b

The Preparation and Performance of G17SG101S70 Powder Coating as a Binder

Aluminum plates, 4 inches by 4-inches, preheated to 210° F. are coated with a base coat of Innotek G17SG101S70 containing SL-150 extendo spheres, 25% weight to volume at the indicated coverage rates (weight after drying at 200-210° F.). After top coating with TS-720 as indicated the plates are cured at about 400° F. and subject to abrasion testing. All abrasion testing data are obtained using the manual abrasion test described in Example 1, see Table 12b.

TABLE 12b

Experimental Coating Details for Use of Powder Coats as Binder Systems for Relative Amounts of Base and Top Coats

| | Base Coat | Filler | Pretreatment | Top | Cure Treatment | Rubs w/Hand Tool (800-g Load) |
|---|---|---|---|---|---|---|
| 1. | Innotek G17SG101S70 White Powder | Step 1: Extendo spheres SL-150 25% in base Sprayed 12.03 g of this as base coat Step 2: Applied 13.82 g of base coat of above blend again | Heated surface to 210° F. | 4.2% TS-720 in Hexane Applied once after 210° F. Go to Step 2 4.2% TS-720 in Hexane | 400° F.-7 min | 1600 |

TABLE 12b-continued

Experimental Coating Details for Use of Powder Coats as Binder Systems for Relative Amounts of Base and Top Coats

| | Base Coat | Filler | Pretreatment | Top | Cure Treatment | Rubs w/Hand Tool (800-g Load) |
|---|---|---|---|---|---|---|
| 2. | Innotek G17SG101S70 White Powder | Step 1: Extendo spheres SL-150 25% in base Sprayed 11.88 g of this as base coat Step 2: Applied 3.71 g of base coat of above blend again | Heated surface to 215° F. | 4.2% TS-720 in Hexane Applied once after 210° F. Go to Step 2 4.2% TS-720 in Hexane | 400° F.-7 min | 1000 |
| 3. | Innotek G17SG101S70 White Powder | Extendo spheres SL-150 25% in base Sprayed 1198 g of this, as base coat | Heated surface to 205-215° F. | 4.2% TS-720 in Hexane | 400° F.-7 min | 1100 |
| 4. | Innotek G17SG101S70 White Powder | Extendo spheres SL-150 25% in base Sprayed 8.74 g of this as base coat | Heated surface to 205-215° F. | 4.2% TS-720 in Hexane | 400° F.-7 min | 1300 |
| 5. | Innotek G17SG101S70 White Powder | Extendo spheres SL-150 25% in base Sprayed 5.97 g of this as base coat | Heated surface to 205-215° F. | 4.2% TS-720 in Hexane | 400° F.-7 min | 1600 |

Example 13

SH and OP Effect Surface Preparation Using Thermal Deposition Processes

Aluminum or carbon steel plates 6 inches×6 inches×0.25 inches are sprayed with one of the materials recited in Table 13 using thermal (high-velocity oxyfuel (HVOF)) application processes. In all cases, excellent bonding of the sprayed materials to both aluminum and steel substrates is noted. The deposited surface was resistant to scratched, even when pressed with a sharp hardened metal objects (e.g., scissors). As deposited, coatings uniformly covered the surface giving rise to a sandpaper-like texture with the degree of coarseness depended on the size of the powder employed.

TABLE 13a

Materials and Thermal Spray Processes used to Prepare Test Plates

| Material | Thermal Spray System |
|---|---|
| Zirconia stabilized | Rokide gun |
| $Al_2O_3$ | Rokide gun |
| 80-20 Ni—Cr | Rokide gun |
| 316 Stainless steel | HVOF |
| Tungsten carbide/cobalt | HVOF |
| Chromium carbide/nickel | HVOF |
| Nickel aluminide (IC-50) | HVOF |

The surfaces prepared using the HVOF-spray process are treated by brushing on SIT8174 silane (Gelest, Inc., Pottstown, Pa.) as al % solution in hexane. Alternatively, the surfaces of some plates are sprayed with a suspension of polydimethylsiloxane treated fumed silica (TS-720, 4.2% w/v in hexane) as opposed to treatment with the silanizing agent SIT8174. Following application of the indicated silane or fumed silica, the plates are cured at room temperature for 24 h. After curing, all metal surfaces are found to be superhydrophobic, irrespective of the metallic or metal oxide coating applied. The surface treatment given to plates and the results from manual abrasion testing determined as in Example 1 are given in Table 13b.

TABLE 13b

Rub Durability Data for Superhydrophobic Coatings Prepared by Thermal Spray Processes

| | Rubs using Hand Tool (800-g Load) | | | |
|---|---|---|---|---|
| | Silane SIT8174 | | Silane SIT8174 + 4.2% TS-720 in Hexane | |
| Material | Aluminum | Steel | Aluminum | Steel |
| $ZrO_2$ Stabilize | — | 500 | 750 | — |
| $Al_2O_3$ | 300 | 300 | 600 | 550 |
| 316SS | — | — | 820 | 1000 |
| W-Carbide-Co | — | 350 | 400 | — |
| Cr-Carbide-Ni | 200 | 200 | 600 | — |
| IC-50 | 400 | 350 | 700 | — |

Example 14

Coating Application Methods and Exemplary Products

The polymer coatings described herein may be applied by spraying, brushing or dipping objects to be coated. Using such methods polymer based coatings may be applied to both simple and complex shaped surfaces;

Coatings applied to simple and complex surfaces by spray-on processes include both one step and two step coatings. The coatings can be applied to surfaces for a variety of purposes including corrosion resistance and reduced resistance to water flow (drag). The SH coating can be applied to reduce water film formation and accumulation of condensation, even on surfaces with complex shapes such as steam turbine blades. The SH coatings can also be applied where high durability and corrosion resistance is desired, such as on slip resistant flooring in demanding environments Coatings may also be applied by dipping object including electrical switches of the type used in food industry processing and packaging lines. Non-wetting SH coatings are particularly suitable for such facilities as they are typically cleaned by washing on a daily basis, and water seepage into switches can cause current leakages or shorts leading to unwanted production line shutdowns. The switches may be coated in a two step process with Self-Etching Primer or POLANE® as the binders.

Where dipping is not a suitable alternative, coatings may be applied by painting or brushing coatings on the surface. One example of an object that is suited to coating by brushing or painting of coatings is heat exchanger for clothes dryers. A coating of Self-Etching Primer with a top coat of 4% of TS-720 in ethanol is applied by a two step process and is anticipated to keep lint from accumulating on the heat exchanger.

Example 15

Resistance to Ice Formation and Adherence to Coated Surfaces

Aluminum plates 4 inches by 4-inches are prepared and one is coated with a superhydrophobic coating of POLANE® B containing 20% S60 glass bead filler as base coat with 4% TS-720 in hexane as top coat applied in a two step process. Both plates are cooled to about −20° C. for 1 hour in a refrigerated enclosure. Water is cooled to until ice formation starts (0° C.). The cooled water is dropped on to the uncoated and coated plates so that it runs down the surface to determine if the cooled surfaces permit ice formation and adherence. Significant amounts of the cooled water freeze on to the uncoated aluminum plate. In contrast, water running down the surface of the plate coated with the superhydrophobic coating has little if any ice form on it. Moreover, the ice which does form on the coated plate is not tightly bound and readily comes loose, which contrast to the results observe with the uncoated aluminum plate.

Example 16

Coating Electric Transmission Cable

16a) Individual segments (12-inches long) of 19 strand aluminum electrical transmission cables are spray coated using a two-step coating process. The first coat consisted of POLANE® A: POLANE B® (1:6 v/v) and POLANE® reducer as needed for ease of spraying) to which 20% w/v of 512 black thermoplastic filler is added. The top coat consisted of a 4% M5 (w/v) silica that is pretreated with Gelest Silane SIT8174.0 (Example 5, Method B) suspended in hexane. After coating, the cables were cured at 93° C. for 60 min in an electric oven.

The coated cable segments are all superhydrophobic with contact angles exceeding 150° (visual examination).

16b) Flexibility at Ambient Temperature (23° C.)

A segment of cables prepared in 16a is bent to 35° to simulated coiling operation. Bending to a 35° angle does not produce any delamination, cracking, chipping, or pealing of the coating, or degradation of superhydrophobic performance 16c) Flexibility at Freezing Temperatures (−30° C.)

A segment of the coated cable prepared in 16a is cooled in the freezer to about −29° C. (about −20° F.) for about 1.5 hours and then bent to an angle of 48°. Bending to that angle does not produce any flaking or delamination. Bend angles exceeding 35°, however, do tend to cause the individual strands of the cable to separate, and create openings large enough for water to enter the cable.

16d) Superhydrophobicity and Thermal Cycling

An unbent (straight) segment of the coated cable is subjected to a thermal cycling test. The cable is placed on a hot plate and the cable temperature is monitored by a non-contact temperature gun. When cable surface temperature reaches 170° C., it is removed from the hot plate and cooled to room temperature (about 18° to 23° C.) using an air gun. The same cycle is repeated 10 times with no loss of superhydrophobicity. Thermal cycling testing data is presented in Table 16.

TABLE 16

Thermal Cycling Data on Superhydrophobic Coated Electrical transmission cable

| Thermal Cycle # | Time at Temperature | Temperature deg C. | Time after Air Cooling | Temperature deg C. |
| --- | --- | --- | --- | --- |
| 1 | 10:21 | 170 | 10:25 | 23 |
| 2 | 10:27 | 170 | 10:29 | 22 |
| 3 | 10:31 | 170 | 10:33 | 23 |
| 4 | 10:35 | 170 | 10:37 | 23.5 |
| 5 | 10:39 | 170 | 10:41 | 23 |
| 6 | 10:43 | 170 | 10:45 | 23.8 |
| 7 | 10:47 | 170 | 10:49 | 22.9 |
| 8 | 10:51 | 170 | 10:53 | 20 |
| 9 | 10.55 | 170 | 10:57 | 21 |
| 10 | 10:59 | 170 | 0:14 | 21 |

Example 17

The Preparation of Superhydrophobic, Hydrophobic and/or Oleophobic Tapes, Ribbons, or Sheets Superhydrophobic, hydrophobic and/or oleophobic tapes, ribbons and sheets can be prepared using any flat, essentially two-dimensional material. In some embodiments the sheets can have an adhesive applied to one surface (see Example 17a) prior to applying the hydrophobic, superhydrophobic, or oleophobic coating, or can be coated with adhesive on the opposing surface after superhydrophobic, hydrophobic and/or oleophobic coating applications have been conducted (see Example 17b). The two dimensional materials can be in the form of sheets or narrow strips (e.g., adhesive strips that can be formed into rolls after their preparation or "tapes") or even patterns, that can be made out of any suitably flexible material including, but not limited to, metals such as aluminum or tin, fiberglass, or plastic.

The materials are treated to increase the hydrophobicity/oleophobicity of at least a portion of one (or possibly both surfaces (and even the edges, which have nominal area).

Example 17a

Tapes and sheets (e.g., adhesive sheets) may be prepared from materials essentially two dimensional materials that are have an adhesive coating on one side ("pre-glued"). In some embodiments the pre-glued surface is covered with paper or other film that can be pealed away to expose the adhesive.

The surface(s) of the materials not bearing the adhesive are treated to increase the hydrophobicity and/or oleophobicity. In some embodiments hydrophobicity and/or oleophobiocity is increased using polymer coatings employing binders such as those described in Examples 2 through 12. In such process, tape surfaces are sprayed with polymeric binders including Self-Etching Primer, POLANE® B, LUMIFLON® using one-step or two step processes. Where two-step processes are employed, the top surface of the binder layer (base coat) is coated with either a treated fumed silica or silica nanogel (e.g., silicas such as TS-720 treated with agents that produce hydrophobic or oleophobic behavior). Where a fumed silica or silica nanogel is untreated with agents that provide hydrophobic or superhydrophobic properties, the fumed silica or silica nanogel can be treated with a reagent (e.g., silanizing agent such as SIT8174 from Gelest, Pottstown, Pa.) to increase the hydrophobicity and/or oleophobicity of the surface after silica application to the binder. The application of agents to increase the hydrophobicity and/or oleophobicity of untreated fumed silica or silica nanogels applied to the binder is typically conducted after 24 hours of room temperature curing of the binder/silica composite. The agents (e.g., silanizing agents such as SIT8174) may be applied by any suitable method including brushing or spraying as described above.

Where the polymer binder contains one or block copolymer polymers and particles of fumed silica or silica nanogel treated with agents that produce hydrophobic, superhydrophobic and/or oleophobic behavior (e.g., TS-720 or other silicas treated with silanizing agents bearing hydrophobic functionalities) the materials may be coated in a one-step process. In such a process the binder, block copolymer and treated silica(s) are mixed in and the entire blend is applied to the desired materials surface and cured under ambient (room temperature) conditions.

To speed the curing process the tapes, ribbons or sheets may be warmed to temperatures that do not affect the adhesive or binder (e.g., causing either the adhesive or binder to melt, flow to locations where it was not originally applied, or become brittle).

The surfaces of tapes, ribbons and sheets treated in the above-described manner will generally be hydrophobic if silanizing agents bearing alkyl functionalities are employed. The same surfaces will generally display superhydrophobic and oleophobic behavior where silanizing agents have fluorinated alkyl groups at the end furthest from the Si atom to which they are attached.

Example 17b

Ribbons and sheets of hydrophobic, superhydrophobic, and oleophobic materials may be prepared from essentially two dimensional materials that are have an have no adhesive coating on any side prior to the application of hydrophobic, superhydrophobic and/or oleophobic coatings ("non-glued" sheets and ribbons). Ribbons and sheets may be used without the application of adhesives or may have adhesives applied subsequent to the applications of coatings (e.g., converting ribbons into tapes). The same processes may be used for making sheets and ribbons of materials hydrophobic, superhydrophobic and/or oleophobic that are employed for the preparation of pre-glued tapes and sheets described in Example 14a can be employed. When applied, adhesives can be applied by any known means, including spraying, brushing or rolling the materials on surfaces. Surfaces having adhesives applied may be protected by the application of an easily removable material such as a separating paper applied to the adhesive coated surfaces.

Example 18

The Use of Durable HP/OP Coatings or Tape or Ribbons Comprising a Durable HP/OP Coating to Form Spill-Resistant Borders Example 18a A Durable HP/OP Coatings as Spill Resistant Border Around the outer perimeter of a 4 inch by 4 inch glass plate, a one half-inch border of Polane B containing first particles of XIOM 512 thermoplastic (10-100 microns) about 20% by weight is applied as a base coat. A top coat of TS-720 silica (Cabosil, Billerica, Mass.) as a 4.5% w/v suspension in ethanol is applied. The plate is air dried in followed by curing at 200° F. for 30-60 min. The plate retains water to a height greater than 5 mm as determined by the method in part b of this example.

Example 18b Adhesive Aluminum Tape Coated with an HP/OP Coating as a Spill Resistant Barrier Aluminum tape, about one-half inch wide coated with the Polane based coating is applied around the top outside edge of a 4 inch by 4 inch square aluminum plate to form a spill-resistant border. The plate is tested for its water retaining capacity, by filing the plate at its center with water until the water overflowed the tape border. The height of water retained by the tape barrier was determined by dividing the volume of water retained by the plate by the area of the plate within the border. A water height of about 5.7 mm, can be retained on aluminum plates prepared as described. In the absence of a hydrophobic/superhydrophobic tape border, or in the presence of an untreated aluminum tape border, aluminum plates will not retain significant amounts of water.

Example 19

Hydrodynamic Drag Reduction

Two 24 inch×48 inch×⅜ inch aluminum plates (Plate A and Plate B) for drag reduction testing were prepared as follows:

Both Plates A and B were prepared using Self-Etching Primer as the binder with 4% w/v of 512 thermoplastic (10-100 µm) as the filler. The base coat used 18 ml of binder/filler mixture per square foot. Following the air gun spraying of the base coat, the plates were sprayed with a top coat of 4.2% of TS-720.

Plate A was heated at 400° F. for 10 min in a continuous infrared oven. This plate had a brownish surface appearance.

Plate B was air dried and tested in this condition. This plate had a gray-white color after drying.

The plates are assessed for water droplet contact angle hysteresis, surface air fraction, hydrodynamic drag reduction, and related parameters.

Example 19a Contact Angle and Contact Angle Hysteresis

Water droplet contact angles and hysteresis are determined using deionized water (~5 µL in volume, ~2 mm in diameter for a spherical droplet) on both Plate A and Plate B using a KSV CAM 100 contact angle meter. Table 19a summarizes the results.

TABLE 19a

Summary of Test Results

| Sample Type | Base Material | Number of Samples | Number of trails | Contact Angle (°) | Deviation | Hysteresis |
|---|---|---|---|---|---|---|
| Plate A | Aluminum | 2 | 2 | 140.34<br>136.90 | ±0.24<br>±0.41 | 6.73 ± 2.5 |
| Plate B | Aluminum | 2 | 2 | 161.98<br>161.63 | ±4.06<br>±0.45 | 15.37 ± 2.5 |

The surface morphologies of the coatings on Plates A and B are also examined using a scanning electron microscope. The surface morphology of Plate A is rougher than that of Plate B, suggesting that the higher contact angle on the Plate B is due to its higher surface roughness.

Example 19b

Projected Surface Air Fraction

Projected surface air fraction was determined based upon the contact angle assessment in Example s19a by using the Cassie-Baxter equation (cos $\theta = f_{SL} \cos \theta_0 - 1 + f_{SL}$, where $\theta$ denotes an apparent contact angle on an interface of solid and gas, $f_{SL}$ a fraction of wet surface (i.e., solid-liquid fraction), and $\theta_0$ a contact angle on a referential smooth rolled aluminum surface).

The estimated air (gas) fraction ($f_{LG} = 1 - f_{SL}$) on the superhydrophobic surface of Plates A and B, which is a critical factor influencing hydrodynamic drag reduction, is summarized in Table 19b. That table summarizes the expected surface air fraction of the coated plates. The surface air fractions are estimated for varying referential contact angles ($\theta_0$=80-110°) for a smooth surface. The results suggest that higher drag reduction effect would be achieved with Plate B due to the higher air fraction.

TABLE 19b

Expected Surface Air Fraction

| Substrate | Apparent Contact Angle (°) (Ave.) | Reference Contact Angle (°) | Surface Air Fraction, $f_{LG}$ |
|---|---|---|---|
| Plate A | 140 | 80 | 0.801 |
| | | 90 | 0.766 |
| | | 100 | 0.717 |
| | | 110 | 0.644 |
| Plate B | 161 | 80 | 0.954 |
| | | 90 | 0.946 |
| | | 100 | 0.934 |
| | | 110 | 0.917 |

Example 19c

Measurement of Hydrodynamic Drag of SH-Coated Flat Plates

Figure 11:
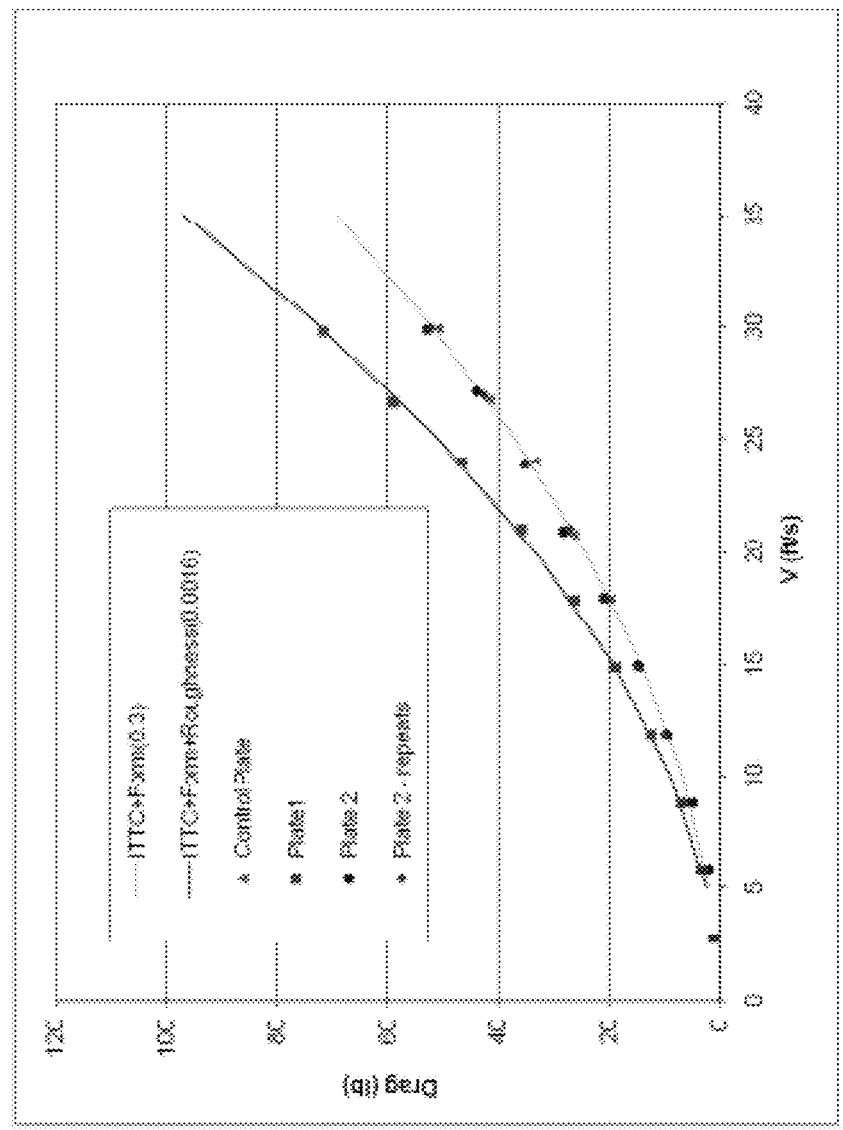
FIG. 11 panels (a) and (b) show the results of testing plates A and B at various water flow speeds covering both laminar and turbulent flows. Three plates are tested: a control, which has a smooth reference surface with no coating; Plate A (indicated as plate 1 in the figure); and Plate B (indicated as plate 2 in the figure) describe in Example 19.
Figure 11:
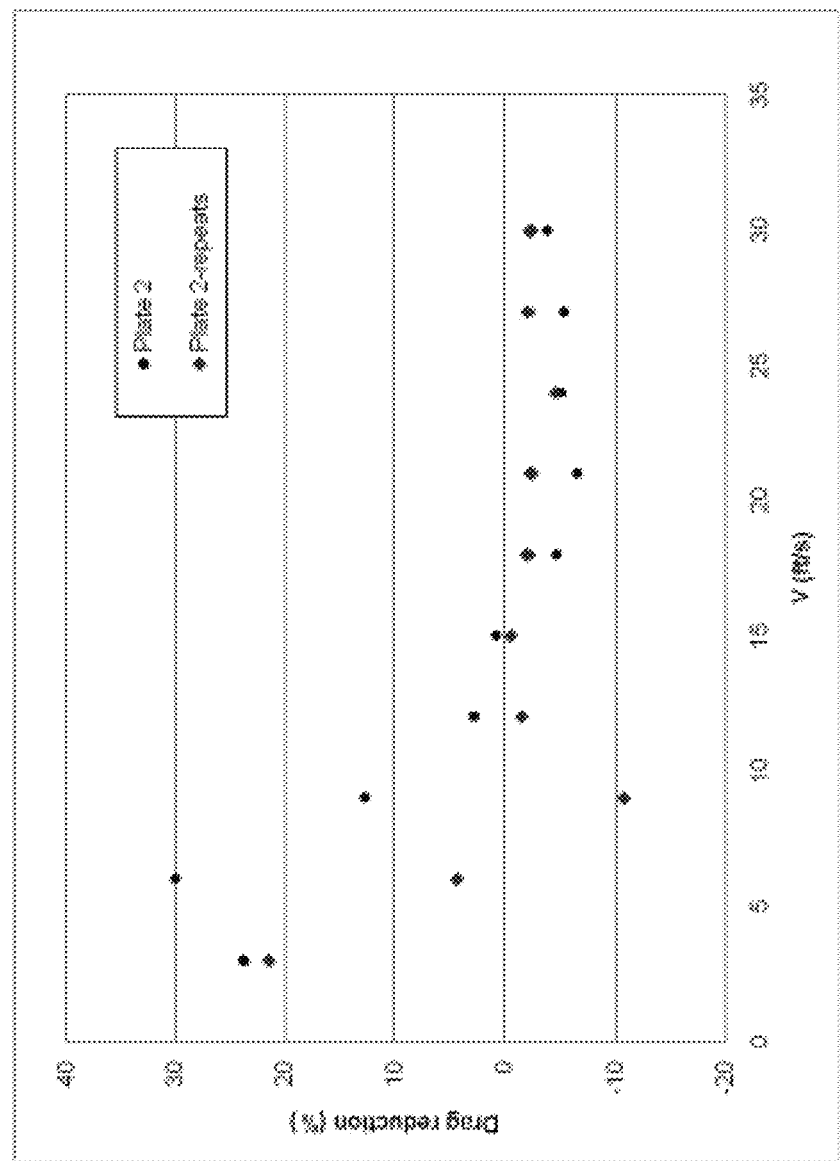

The hydrodynamic drag reduction of plates A and B are measured in a high-speed water towing tank system employing a monorail supported, cable driven, sample support capable of speeds of 0-60 ft/s). FIG. 11 panels (a) and (b) show the results of testing plates A and B at various water flow speeds covering both laminar and turbulent flows. Three plates were tested (Control: smooth reference surface with no coating, Plate A and Plate B).

The measured drag and the drag reduction observed for the plates relative to the control plate is plotted FIG. 11 (b). The drag was increased on Plate A (compared to that of a smooth control surface, suggesting that the surface of the Plate A is wetted and that there is no slip effect due to the presence of surface air. The surface coating on Plate A creates and effective surface roughness of 0.0016, using the ITTC (International Towing Tank Conference) friction line for a standard fully turbulent friction coefficient. The superhydrophobic coating of Plate B (achieves a significant drag reduction, up to 30%, especially at low speeds where the flow is laminar. Plate B is tested twice, the first data set is by varying the water speed from a low to high. For the second set of data for Plate B was obtained by varying the water speed from high to a low. Both tests show the drag reduction at the low speed for Plate B.

Figure 12:
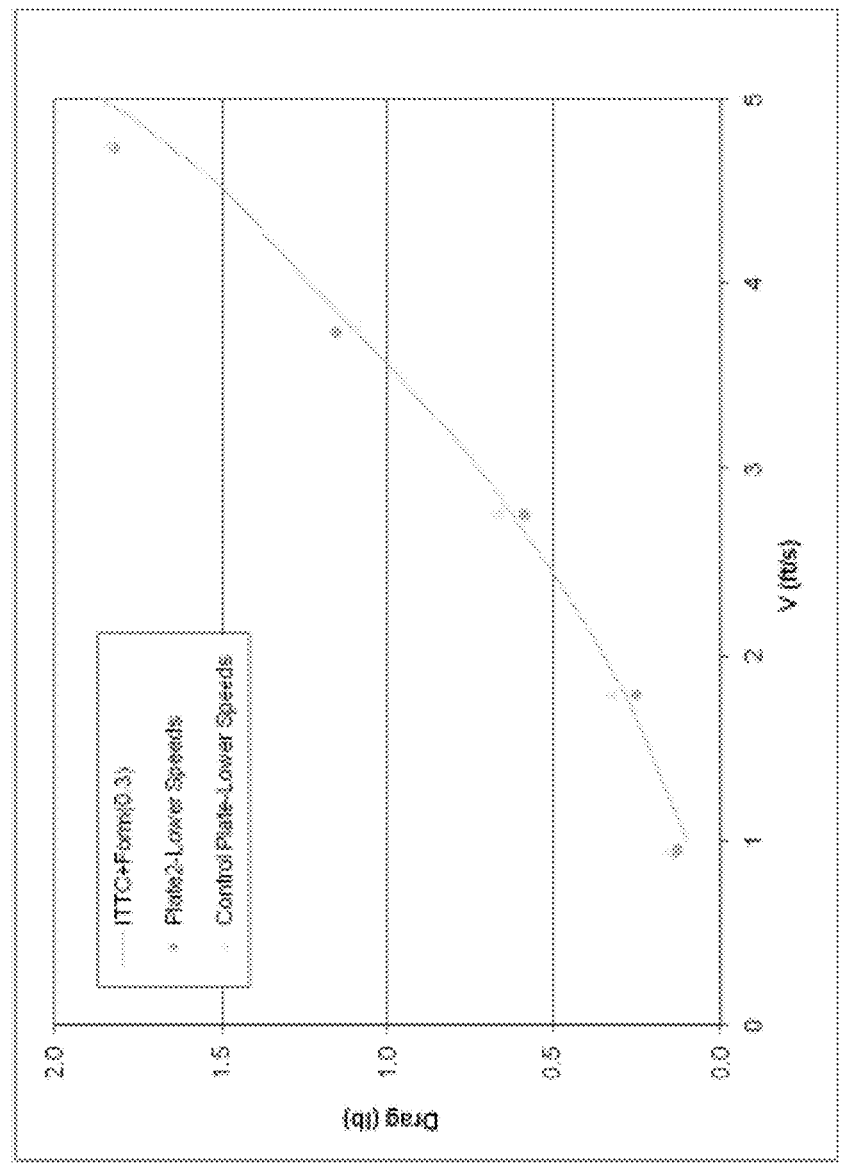
FIG. 12: Panel (a) is a plot of total drag measured at varying water speeds and Panel (b) is a plot of drag reduction produced by HP/OP coatings for the plates described in Example 19, compared to an uncoated aluminum plate that is otherwise identical to the coated plates.
Figure 12:
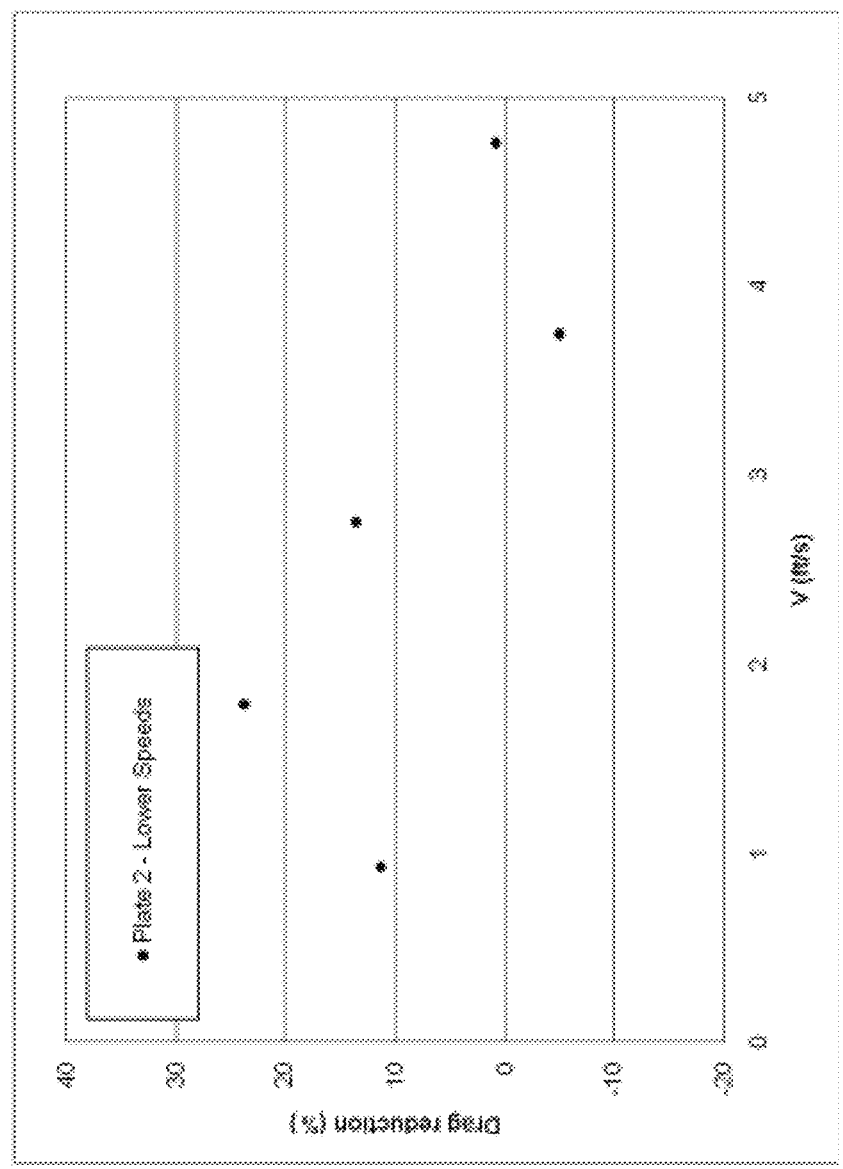

Drag reduction at lower speed is tested on Plate B beginning at lower speeds than the data used in FIG. 11. FIG. 12 is a plot of the measured drag (Panel (a)) and the drag reduction (Panel (b)) observed for the coated Plate B with respect to a smooth control surface. As with the low speed water data plotted in FIG. 8, the data which is plotted in FIG. 9 show significant drag reduction in the range of 30% at the low speed.

Inspection of Plates A and B following hydrodynamic drag measurements reveals the presence of air bubbles, typically 0.1-0.3 mm in size, were retained on Plate B. In contrast to Plate B, Plate A did not retain a coating of such bubbles.

Example 20

Superhydrophobic Coating Durability Testing by Ultrasonic Technology

Samples are coated using a two step process. The base coat employs POLANE B® as a binder and Corvel Black as filler; and is followed by a top coat of M5 silica pretreated with Geleast silanizing agent SIT8174 (Example 5, Method B) suspended at 4% w/v in hexane. The coated sample is submerged in tetrahydrafuran (THF) and sonicated for 10 min using a UP400S Sonicator from Hielscher-Ultrasound Technology, Ringwood, N.J., (400 W, 24 kHz unit run at 100% amplitude and for a single 10 min cycle). Following sonication, the coatings are dried and found to be completely intact with no loss of superhydrophobic performance (water contact angles of at least 150°).

Example 21 Liquid Nitrogen Testing of Superhydrophobic Coatings

Two aluminum plates are coated using a two step process. The first plate (A) is coated with POLANE® B and S60 glass beads as base coat, followed by the application of M5 pretreated with Gelest silane SIT8174 (Example 5, Method B) suspended at 4% w/v in hexane as the top coat. A second aluminum plate (b) is coated in an identical fashion as the first substituting 512 thermoplastic beads for the S60 glass beads as the filler.

The plates are cooled in liquid nitrogen (−196° C.) and subjected to a bend test in which the plates are bent several degrees at a time as rapidly as possible with repeated cooling in liquid nitrogen to reach the indicated angles. The first plate was successfully bent to an angle of 120° without noting any delamination or cracking of the coating. The second plate was successfully bent to an angle of 140° without delamination or cracking of the coating. Both plates retain their superhydrophobicity after liquid nitrogen cooling and bending.

Example 22 Superhydrophobic Coatings Applied to a Flexible Rubber Surface

As a test of the ability to coat flexible surfaces, a toilet plunger with a rubber end is coated using a two step process using POLANE® B and S60 glass beads as base coat, followed by the application of M5 pretreated with Gelest silane SIT8174 (Example 5, Method B) as the top coat. The coating is applied to the plunger's rubberized end (both inside and outside) and the adjacent portion of the handle to the extent that it will become wet in use. The coated plunger is cured at room temperature for 24 hours.

The plunger is subject to repeated cycles of plunging (50 uses) without showing any wetting or damage to the coating on the plunger head or the handle area. The coated plunger minimized or eliminated dripping and surface contamination by materials that could adhere to the plunger in use.

Example 23 Superhydrophobic Coatings Applied to Bed Pans and Bedside Commodes A bed pan made from polypropylene is coated using a two step process using POLANE® B and S60 glass beads as base coat, followed by the application of M5 pretreated with Gelest silane SIT8174 (Example 5, Method B) as the top coat. The coating is applied both inside and outside.

A bedside commode made of high density polyethylene is coated in the same fashion as the bed pan.

The coated bed pan and commode do not become wet during use and avoids the adherence of fecal matter to their surfaces. Treated pans and commodes are easier than their untreated counterparts to clean, which avoids the need for pressure washing and the spreading of bacteria from incompletely cleaned surfaces.

Example 24 Science Fun and Training Kits Application of Superhydrophobic Coating The superhydrophobic phenomenon may not only be employed in many useful and interesting applications, but it also serves the purpose of science education and training in areas including: Second particles and nanotechnology; surface tension; contact angles and their measurement; solvents; and methods of preparing and applying superhydrophobic coatings.

Kits are assembled comprising a one-step coating composition and instructions Alternatively kits are assembled to comprise the materials needed to applying a superhydrophobic coating in a two-step process and instruction.

Kits may further include on or more of: applicators, such as paint brushes; mixing implements; and containers.

In addition to providing coating materials and instructions on how to apply the coating, the instructions may also include information on how to observe superhydrophobic phenomena and/or the basic scientific method.

Example 25 Evaluation of Surface Roughness and Coating Thickness

A series of coatings prepared by the methods described herein are evaluated for roughness using a Mahr PocketSurf PS1 from Mahr Federal Inc. (Providence, R.I. 02905) and for thickness using a Positector 6000 from Delfelsko Corp. (Ogdensburg, N.Y). Both the arithmetical mean roughness (Ra) and the ten point mean roughness (Rz) are obtained. The average roughness Ra values of several coatings vary from 0.3-17.69 microns. The average roughness Rz values of several coatings vary from 1.91-78.53 microns. For each plate, both the low and high coating thickness values were measured. The low values of the coating thickness varied from 17.5-147.5 microns. The high values of thickness vary from 35-185 microns. Details are provide in Table 25.

TABLE 25

Summary of Surface Roughness and Thickness Measurements for Coatings made with Different Binders and Particles

| Coating | | Roughness Data (microns) | | | | | | AVG Ra | AVG Rz | STDEV | Coating Thickness Range (Low) mils | Coating Thickness Range (High) mils | Coating Thickness Range (Low) microns | Coating Thickness Range (High) microns |
|---|---|---|---|---|---|---|---|---|---|---|---|---|---|---|
| | | T1 | T2 | T3 | T4 | T5 | T6 | | | | | | | |
| Etch Primer No Filler Ts-720 | | | | | | | | | | | | | | |
| | Ra | 0.848 | 0.032 | 0.258 | 0.094 | | | 0.31 | 1.91 | 0.37 | 0.7 | 1.4 | 17.5 | 35 |
| | Rz | 5.33 | 0.23 | 1.4 | 0.67 | | | | | 2.33 | | | | |
| Bare Aluminum | | | | | | | | | | | | | | |
| | Ra | 0.33 | 0.45 | 0.22 | 0.342 | | | 0.34 | 2.26 | 0.09 | 0 | 0 | | |
| | Rz | 2.27 | 2.56 | 1.35 | 2.76 | | | | | 0.54 | | | | |
| Polane 20% IM300 Glass polane TS720 | | | | | | | | | | | | | | |
| | Ra | 0.589 | 0.046 | 0.354 | 0.934 | | | 0.48 | 2.84 | 0.38 | 3.3 | 4.6 | 82.5 | 11.5 |
| | Rz | 3.67 | 0.281 | 2.21 | 5.21 | | | | | 2.10 | | | | |
| Etch Primer Only | | | | | | | | | | | | | | |
| | Ra | 0.561 | 0.519 | 0.574 | 0.564 | 0.542 | | 0.55 | 4.01 | 0.02 | 1 | 1.5 | 25 | 37.5 |
| | Rz | 4.06 | 3.65 | 4.05 | 4.35 | 3.95 | | | | 0.25 | | | | |
| Polane 20% 9400 Hymod Ts720 | | | | | | | | | | | | | | |
| | Ra | 0.49 | 0.083 | 1.334 | 0.441 | | | 0.59 | 3.14 | 0.53 | 2.2 | 5.5 | 55 | 137.5 |
| | Rz | 2.82 | 0.43 | 6.41 | 2.89 | | | | | 2.45 | | | | |
| Polane Only | | | | | | | | | | | | | | |
| | Ra | 0.62 | 0.611 | 0.492 | 0.66 | | | 10.50 | 2.6775 | 0.07 | 1 | 1.5 | 25 | 37.5 |
| | Rz | 2.66 | 2.24 | 2.2 | 3.61 | | | | | 0.65 | | | | |
| 10% IM30K Glass Polane TS720 | | | | | | | | | | | | | | |
| | Ra | 0.942 | 0.718 | 0.982 | 0.863 | | | 0.88 | 5.91 | 0.12 | 0.9 | 1.65 | 22.5 | 41.25 |
| | Rz | 6.53 | 5.6 | 6.01 | 5.51 | | | | | 0.47 | | | | |
| Polane + 4% TS720 Ts720 | | | | | | | | | | | | | | |
| | Ra | 2.213 | 1.753 | 0.078 | 0.123 | | | 1.04 | 8.33 | 1.10 | 1.15 | 2 | 28.75 | 50 |
| | Rz | 15 | 17 | 0.6 | 0.72 | | | | | 8.89 | | | | |
| Etch + 20% Hymod 9400D Ts720 | | | | | | | | | | | | | | |
| | Ra | 0.397 | 0.125 | 1.887 | 2.199 | | | 1.15 | 9.38 | 1.04 | 1.1 | 2.7 | 27.5 | 67.5 |
| | Rz | 4.13 | 0.59 | 17.2 | 15.5 | | | | | 8.20 | | | | |
| Polane + 5% M5 TS720 | | | | | | | | | | | | | | |
| | Ra | 1.396 | 1.129 | 0.913 | 1.297 | | | 1.18 | 6.70 | 0.21 | 2.1 | 3.9 | 52.5 | 97.5 |
| | Rz | 6.84 | 7.36 | 5.8 | 6.78 | | | | | 0.65 | | | | |

TABLE 25-continued

Summary of Surface Roughness and Thickness Measurements for Coatings made with Different Binders and Particles

| Coating | T1 | T2 | T3 | T4 | T5 | T6 | AVG Ra | AVG Rz | STDEV | Coating Thickness Range (Low) mils | Coating Thickness Range (High) mils | Coating Thickness Range (Low) microns | Coating Thickness Range (High) microns |
|---|---|---|---|---|---|---|---|---|---|---|---|---|---|
| Polane No filler TS720 | | | | | | | | | | | | | |
| Ra | 1.287 | 1.434 | 1.616 | 1.873 | | | 1.55 | 9.36 | 0.25 | 1.8 | 2.4 | 45 | 60 |
| Rz | 7.13 | 9.09 | 11.6 | 9.61 | | | | | 1.84 | | | | |
| Polane 700T Water Base nanogel | | | | | | | | | | | | | |
| Ra | 1.555 | 1.706 | 1.899 | 2.627 | | | 1.95 | 10.07 | 0.47 | 1.05 | 1.3 | 26.25 | 32.5 |
| Rz | 8.13 | 10.8 | 9.23 | 12.1 | | | | | 1.74 | | | | |
| Etch + 4% M5 TS720 | | | | | | | | | | | | | |
| Ra | 1.486 | 2.771 | 1.624 | 2.009 | | | 2.05 | 15.02 | 0.53 | 1.35 | 2.6 | 33.75 | 65 |
| Rz | 10.7 | 19 | 14.7 | 13.8 | | | | | 3.15 | | | | |
| Etch + 4% Acematt 400 | | | | | | | | | | | | | |
| Ra | 1.206 | 1.646 | 1.478 | 4.24 | | | 2.14 | 17.22 | 1.41 | 1.4 | 2.3 | 35 | 57.5 |
| Rz | 7.98 | 11.3 | 15.9 | 33.7 | | | | | 11.46 | | | | |
| Etch + 4% TS720 Ts720 | | | | | | | | | | | | | |
| Ra | 4.08 | 3.752 | 4.806 | 4.853 | 3.373 | | 4.37 | 29.43 | 0.54 | 1.2 | 2 | 30 | 50 |
| Rz | 26.9 | 24.5 | 29.2 | 37.1 | 16.9 | | | | 5.46 | | | | |
| S60 Polane M5 Hex SiCl4 8174 | | | | | | | | | | | | | |
| Ra | 6.601 | 6.097 | 7.985 | 7.61 | | | 7.07 | | 0.87 | 1.75 | 33 | 43.75 | 82.5 |
| Rz | 26 | 29.5 | 33.1 | 27.5 | | | | | | | | | |
| Wood 140Mo polane M5/Hex8174sicl4 | | | | | | | | | | | | | |
| Ra | 7.32 | 8.476 | 6.436 | 8.579 | | | 7.70 | 38.23 | 1.02 | 4.1 | 5.1 | 102.5 | 127.5 |
| Rz | 35.8 | 41.6 | 31.8 | 43.7 | | | | | 5.43 | | | | |
| CowelBlack M-5 8174 | | | | | | | | | | | | | |
| Ra | 9.027 | 8.431 | 9.929 | 8.05 | | | 8.37 | 50.90 | 0.81 | 5.9 | 7.4 | 147.5 | 185 |
| Rz | 49.1 | 48.9 | 62.7 | 42.9 | | | | | 8.33 | | | | |
| 512 W polane M5/hex Sicl4 8174 | | | | | | | | | | | | | |
| Ra | 11.01 | 12.48 | 13 | 14.17 | | | 12.67 | 76.68 | 1.31 | 3.9 | 5.2 | 97.5 | 130 |
| Rz | 68 | 77.9 | 74.7 | 86.1 | | | | | 7.52 | | | | |
| 512 B Polane M-5/Hex SiCl4 8174 | | | | | | | | | | | | | |
| Ra | 17.64 | 17.64 | 18.03 | 14.95 | 18.61 | 19.24 | 17.69 | 78.53 | 1.47 | 5.5 | 6.9 | 137.5 | 172.5 |
| Rz | 86.9 | 75.3 | 70.4 | 70.4 | 71.2 | 97 | | | 11.02 | | | | |

Example 26 Baseline Contact Angles for Three Binder Systems

Aluminum plates, 4 inches×4 inches, are coated with one of three different binders in the absence of any added first or second particles. After curing at 200° F. for 30-60 min, contact angle for each of the plates with water at about 18 to about 22° C. is measured. The results indicate the following contact angles are found for the binders.

Self Etching Primer: Contact angle varies from 80.69-83.27°.

Polane B: Contact angle varies from 69.39-71.3°.

Lumiflon: Contact angle varies from 75.76-80.70.

Details are provided m Table 26

TABLE 26

Contact Angle for Water with Coatings Employing Three Binder Systems

| Plate | Contact Angle Left | Contact Angle Right | Volume (uL) | Angle (°) |
|---|---|---|---|---|
| Etch Primer | 80.32 | 81.05 | 3.21 | 80.69 |
| Etch Primer | 82.60 | 83.47 | 3.21 | 83.04 |
| Etch Primer | 83.56 | 82.98 | 3.14 | 83.27 |
| Polane | 70.93 | 71.67 | 3.51 | 71.30 |
| Polane | 69.97 | 70.00 | 4.00 | 69.99 |
| Polane | 69.74 | 69.03 | 3.03 | 69.39 |
| Lumiflon | 76.00 | 75.51 | 2.61 | 75.76 |
| Lumiflon | 77.54 | 78.71 | 2.52 | 78.13 |
| Lumiflon | 80.11 | 81.28 | 2.46 | 80.70 |

Plates were also tested for roll-off angle, in each case the binders have roll-off angles greater than 60 and less than 90 degrees and leave residual water on the surface.

Example 27

Fabrics with Durable Hydrophobic Properties

Fabric samples are treated with a silanizing agent alone, or with either $SiCl_4$ or $Si(OEt)_4$ followed by treatment with a silanizing agent, as indicated in Table 27. Two different silanizing agents were employed, (tridecafluoro-1,1,2,2-tetrahydrooctyl)trichlorosilane, which is a fluorinated silane, and n-octadecyltrichlorosilane, which is not fluorinated. The treatment process comprised applying 10% solutions of either $SiCl_4$ or $Si(OEt)_4$ in hexane, or combinations thereof, to fabric samples by brushing the solutions on the fabric. Following treatment with $SiCl_4$ or $Si(OEt)_4$ the fabric is cured at about 93° C. (about 200° F.) for 60 minutes (min.). Silanes are then brushed on the fabric as a 1% solution in hexane, and the fabric samples are again cured at about 93° C. (about 200° F.) for 60 min. Where acetic acid is employed it is used as a catalyst. Ten different fabrics having a variety of compositions are treated in this manner.

As an alternative to applying the agents by brushing, either the $SiCl_4$ or $Si(OEt)_4$, can also be applied by immersing the fabric in 10% solution of those agents in hexane under a pressure of 20 psi (pound per square inch) for 5 min. This step was carried out to enhance the attachment of $SiCl_4$ or $Si(OEt)_4$ to the fabrics.

Hydrophobicity of the fabrics is observed by observing the beading and non-wetting behavior of the fabric samples. The durability of the hydrophobicity is measured by washing in soapy water until non-wetting performance ends. Four different commercial detergents, Ajax, Dawn, Tide, and Tide with 5% bleach, are employed for the washing, which used the detergents in the amounts indicated by the suppliers. After each wash fabric samples are dried at about 93° C. (about 200° F.) for 15 min.

The data for each fabric sample's response to washing are presented in Table 27. Those data suggest that significant hydrophobicity, with resistance to washing, can be introduced into fabrics.

TABLE 27

Treatment Data for Fabrics

| fabric | initial Si treatment | silane treatment | wash cycles to failure | soap used | Process ID |
|---|---|---|---|---|---|
| nylon (yellow) | SiCl4 | 8174 | 8 | Ajax | Ross F1 |
| nylon (blue) | SiCl4 | 8174 | 5 | Ajax | Ross F1 |
| nylon (orange) | SiCl4 | 8174 | 5 | Ajax | Ross F1 |
| army fabric | SiCl4 | 8174 | 3 | Ajax | Ross F1 |
| polyester | SiCl4 | 8174 | 5 | Ajax | Ross F1 |
| acetate | SiCl4 | 8174 | 12 | Ajax | Ross F1 |
| velvet | SiCl4 | 8174 | 3 | Ajax | Ross F1 |
| vinyl | SiCl4 | 8174 | 1 | Ajax | Ross F1 |
| Cotton | | | 0 | | Ross F1 |
| nylon (yellow) | (SiO)x(OEt)3 | 8174 | 4 | Ajax | Ross F2 |
| nylon (blue) | (SiO)x(OEt)3 | 8174 | 5 | Ajax | Ross F2 |
| nylon (orange) | (SiO)x(OEt)3 | 8174 | 5 | Ajax | Ross F2 |
| army fabric | (SiO)x(OEt)3 | 8174 | 4 | Ajax | Ross F2 |
| polyester | (SiO)x(OEt)3 | 8174 | 3 | Ajax | Ross F2 |
| acetate | (SiO)x(OEt)3 | 8174 | 8 | Ajax | Ross F2 |
| velvet | (SiO)x(OEt)3 | 8174 | 1 | Ajax | Ross F2 |
| vinyl | (SiO)x(OEt)3 | 8174 | 1 | Ajax | Ross F2 |
| Cotton | | | 0 | | Ross F2 |
| nylon (yellow) | Si(EtO)4 | 8174 | 9 | Ajax | Ross F3 |
| nylon (blue) | Si(EtO)4 | 8174 | 9 | Ajax | Ross F3 |
| nylon (orange) | Si(EtO)4 | 8174 | 9 | Ajax | Ross F3 |
| army fabric | Si(EtO)4 | 8174 | 2 | Ajax | Ross F3 |
| polyester | Si(EtO)4 | 8174 | 4 | Ajax | Ross F3 |
| acetate | Si(EtO)4 | 8174 | 10 | Ajax | Ross F3 |
| velvet | Si(EtO)4 | 8174 | 1 | Ajax | Ross F3 |
| vinyl | Si(EtO)4 | 8174 | 1 | Ajax | Ross F3 |
| Cotton | | | 0 | | Ross F3 |
| nylon (yellow) | none | 8174 | 12 | Ajax | Ross F4 |

TABLE 27-continued

Treatment Data for Fabrics

| fabric | initial Si treatment | silane treatment | wash cycles to failure | soap used | Process ID | |
|---|---|---|---|---|---|---|
| nylon (blue) | none | 8174 | 4 | Ajax | Ross F4 | |
| nylon (orange) | none | 8174 | 12 | Ajax | Ross F4 | |
| army fabric | none | 8174 | 1 | Ajax | Ross F4 | |
| polyester | none | 8174 | 2 | Ajax | Ross F4 | |
| acetate | none | 8174 | 4 | Ajax | Ross F4 | |
| velvet | none | 8174 | 1 | Ajax | Ross F4 | |
| vinyl | none | 8174 | 1 | Ajax | Ross F4 | |
| Cotton | | | 0 | | Ross F4 | |
| nylon (yellow) | SiCl4 | 6640 | 6 | Ajax | Ross F5 | |
| nylon (blue) | SiCl4 | 6640 | 6 | Ajax | Ross F5 | |
| nylon (orange) | SiCl4 | 6640 | 4 | Ajax | Ross F5 | |
| army fabric | SiCl4 | 6640 | 1 | Ajax | Ross F5 | |
| polyester | SiCl4 | 6640 | 2 | Ajax | Ross F5 | |
| acetate | SiCl4 | 6640 | 4 | Ajax | Ross F5 | |
| velvet | SiCl4 | 6640 | 1 | Ajax | Ross F5 | |
| vinyl | SiCl4 | 6640 | 1 | Ajax | Ross F5 | |
| cotton | SiCl4 | 6640 | 1 | Ajax | Ross F5 | |
| nylon (yellow) | Di oil based (soaked for 5 min.) | none | 2 | Ajax | Ross DF1 | |
| nylon (blue) | Di oil based (soaked for 5 min.) | none | 0 | Ajax | Ross DF1 | dead at start |
| nylon (orange) | Di oil based (soaked for 5 min.) | none | 0 | Ajax | Ross DF1 | dead at start |
| army fabric | Di oil based (soaked for 5 min.) | none | 0 | Ajax | Ross DF1 | dead at start |
| polyester | Di oil based (soaked for 5 min.) | none | 1 | Ajax | Ross DF1 | |
| acetate | Di oil based (soaked for 5 min.) | none | 0 | Ajax | Ross DF1 | dead at start |
| velvet | Di oil based (soaked for 5 min.) | none | 0 | Ajax | Ross DF1 | dead at start |
| vinyl | Di oil based (soaked for 5 min.) | none | 0 | Ajax | Ross DF1 | dead at start |
| cotton | Di oil based (soaked for 5 min.) | none | 0 | Ajax | Ross DF1 | dead at start |
| white fabric | Di oil based (soaked for 5 min.) | none | 0 | Ajax | Ross DF1 | dead at start |
| nylon (yellow) | Di water based (soaked for 10 min.) | none | 1 | Ajax | Ross DF2 | |
| nylon (blue) | Di water based (soaked for 10 min.) | none | 0 | Ajax | Ross DF2 | dead at start |
| nylon (orange) | Di water based (soaked for 10 min.) | none | 0 | Ajax | Ross DF2 | dead at start |
| army fabric | Di water based (soaked for 10 min.) | none | 0 | Ajax | Ross DF2 | dead at start |
| polyester | Di water based (soaked for 10 min.) | none | 0 | Ajax | Ross DF2 | dead at start |
| acetate | Di water based (soaked for 10 min.) | none | 0 | Ajax | Ross DF2 | dead at start |
| velvet | Di water based (soaked for 10 min.) | none | 0 | Ajax | Ross DF2 | dead at start |
| vinyl | Di water based (soaked for 10 min.) | none | 1 | Ajax | Ross DF2 | |
| cotton | Di water based (soaked for 10 min.) | none | 0 | Ajax | Ross DF2 | dead at start |
| white fabric | Di water based (soaked for 10 min.) | none | 0 | Ajax | Ross DF2 | dead at start |
| nylon (yellow) | Di oil based pressurized at 20 psi for 5 min. | none | 3 | Ajax | Ross DF3 | |
| nylon (blue) | Di oil based pressurized at 20 psi for 5 min. | none | 0 | Ajax | Ross DF3 | dead at start |
| nylon (orange) | Di oil based pressurized at 20 psi for 5 min. | none | 2 | Ajax | Ross DF3 | |
| army fabric | Di oil based pressurized at 20 psi for 5 min. | none | 0 | Ajax | Ross DF3 | dead at start |
| polyester | Di oil based pressurized at 20 psi for 5 min. | none | 2 | Ajax | Ross DF3 | |
| acetate | Di oil based pressurized at 20 psi for 5 min. | none | 0 | Ajax | Ross DF3 | dead at start |
| velvet | Di oil based pressurized at 20 psi for 5 min. | none | 0 | Ajax | Ross DF3 | dead at start |
| vinyl | Di oil based pressurized at 20 psi for 5 min. | none | 0 | Ajax | Ross DF3 | dead at start |
| cotton | Di oil based pressurized at 20 psi for 5 min. | none | 0 | Ajax | Ross DF3 | dead at start |
| white fabric | Di oil based pressurized at 20 psi for 5 min. | none | 0 | Ajax | Ross DF3 | dead at start |
| nylon (yellow) | pressurized SiCl4 at 20 psi for 5 min. | 8174 | 7 | Ajax | Ross F6 | |
| nylon (blue) | pressurized SiCl4 at 20 psi for 5 min. | 8174 | 18 | Ajax | Ross F6 | |
| nylon (orange) | pressurized SiCl4 at 20 psi for 5 min. | 8174 | 19 | Ajax | Ross F6 | |
| army fabric | pressurized SiCl4 at 20 psi for 5 min. | 8174 | 3 | Ajax | Ross F6 | |
| polyester | pressurized SiCl4 at 20 psi for 5 min. | 8174 | 6 | Ajax | Ross F6 | |
| acetate | pressurized SiCl4 at 20 psi for 5 min. | 8174 | 18 | Ajax | Ross F6 | |
| velvet | pressurized SiCl4 at 20 psi for 5 min. | 8174 | 1 | Ajax | Ross F6 | |
| vinyl | pressurized SiCl4 at 20 psi for 5 min. | 8174 | 5 | Ajax | Ross F6 | |
| cotton | pressurized SiCl4 at 20 psi for 5 min. | 8174 | 16 | Ajax | Ross F6 | 16 (tore apart) |
| white fabric | pressurized SiCl4 at 20 psi for 5 min. | 8174 | 3 | Ajax | Ross F6 | |
| nylon (yellow) | Si(EtO)4 pressurized at 20 psi for 5 min. | 8174 | 35 | Dawn | Ross F7 | |
| nylon (blue) | Si(EtO)4 pressurized at 20 psi for 5 min. | 8174 | 30 | Dawn | Ross F7 | |
| nylon (orange) | Si(EtO)4 pressurized at 20 psi for 5 min. | 8174 | 30 | Dawn | Ross F7 | |
| army fabric | Si(EtO)4 pressurized at 20 psi for 5 min. | 8174 | 2 | Dawn | Ross F7 | |
| polyester | Si(EtO)4 pressurized at 20 psi for 5 min. | 8174 | 35 | Dawn | Ross F7 | |
| acetate | Si(EtO)4 pressurized at 20 psi for 5 min. | 8174 | 30 | Dawn | Ross F7 | |
| velvet | Si(EtO)4 pressurized at 20 psi for 5 min. | 8174 | dead at start | Dawn | Ross F7 | |
| vinyl | Si(EtO)4 pressurized at 20 psi for 5 min. | 8174 | 25 | Dawn | Ross F7 | |
| cotton | Si(EtO)4 pressurized at 20 psi for 5 min. | 8174 | 15 | Dawn | Ross F7 | |
| white fabric | Si(EtO)4 pressurized at 20 psi for 5 min. | 8174 | dead at start | Dawn | Ross F7 | |
| nylon (yellow) | Si(EtO)4 with acetic acid | 8174 | 8 | Tide | Ross F8 | |
| nylon (blue) | Si(EtO)4 with acetic acid | 8174 | 3 | Tide | Ross F8 | |
| nylon (orange) | Si(EtO)4 with acetic acid | 8174 | 7 | Tide | Ross F8 | |
| army fabric | Si(EtO)4 with acetic acid | 8174 | 1 | Tide | Ross F8 | |
| polyester | Si(EtO)4 with acetic acid | 8174 | 4 | Tide | Ross F8 | |
| acetate | Si(EtO)4 with acetic acid | 8174 | 0 | Tide | Ross F8 | dead at start |
| velvet | Si(EtO)4 with acetic acid | 8174 | 1 | Tide | Ross F8 | |
| vinyl | Si(EtO)4 with acetic acid | 8174 | 9 | Tide | Ross F8 | |

TABLE 27-continued

Treatment Data for Fabrics

| fabric | initial Si treatment | silane treatment | wash cycles to failure | soap used | Process ID | |
|---|---|---|---|---|---|---|
| cotton | Si(EtO)4 with acetic acid | 8174 | 0 | Tide | Ross F8 | dead at start |
| white fabric | Si(EtO)4 with acetic acid | 8174 | 2 | Tide | Ross F8 | |
| nylon (yellow) | Si(EtO)4 with acetic acid | 6640 | 10 | Tide | Ross F9 | |
| nylon (blue) | Si(EtO)4 with acetic acid | 6640 | 4 | Tide | Ross F9 | |
| nylon (orange) | Si(EtO)4 with acetic acid | 6640 | 9 | Tide | Ross F9 | |
| army fabric | Si(EtO)4 with acetic acid | 6640 | 4 | Tide | Ross F9 | |
| polyester | Si(EtO)4 with acetic acid | 6640 | 5 | Tide | Ross F9 | |
| acetate | Si(EtO)4 with acetic acid | 6640 | 1 | Tide | Ross F9 | |
| velvet | Si(EtO)4 with acetic acid | 6640 | 1 | Tide | Ross F9 | |
| vinyl | Si(EtO)4 with acetic acid | 6640 | 9 | Tide | Ross F9 | |
| cotton | Si(EiO)4 with acetic acid | 6640 | 1 | Tide | Ross F9 | |
| white fabric | Si(EtO)4 with acetic acid | 6640 | 5 | Tide | Ross F9 | |
| nylon (yellow) | SiCl4 | 8174 | 10 | Tide | Ross F10 | |
| nylon (blue) | SiCl4 | 8174 | 18 | Tide | Ross F10 | |
| nylon (orange) | SiCl4 | 8174 | 38 | Tide | Ross F10 | |
| army fabric | SiCl4 | 8174 | 4 | Tide | Ross F10 | |
| polyester | SiCl4 | 8174 | 3 | Tide | Ross F10 | |
| acetate | SiCl4 | 8174 | 45 | Tide | Ross F10 | |
| velvet | SiCl4 | 8174 | 2 | Tide | Ross F10 | |
| vinyl | SiCl4 | 8174 | 3 | Tide | Ross F10 | |
| cotton | SiCl4 | 8174 | 40 | Tide | Ross F10 | Tore Apart |
| white fabric | SiCl4 | 8174 | 1 | Tide | Ross F10 | |
| nylon (yellow) | Si(EtO)4 with acetic acid pressurized at 20 psi | 6640 | 12 | Tide | Ross F11 | |
| nylon (blue) | Si(EtO)4 with acetic acid pressurized at 20 psi | 6640 | 0 | Tide | Ross F11 | dead at start |
| nylon (orange) | Si(EtO)4 with acetic acid pressurized at 20 psi | 6640 | 10 | Tide | Ross F11 | |
| army fabric | Si(EtO)4 with acetic acid pressurized at 20 psi | 6640 | 1 | Tide | Ross F11 | |
| polyester | Si(EtO)4 with acetic acid pressurized at 20 psi | 6640 | 0 | Tide | Ross F11 | dead at start |
| acetate | Si(EtO)4 with acetic acid pressurized at 20 psi | 6640 | 1 | Tide | Ross F11 | |
| velvet | Si(EtO)4 with acetic acid pressurized at 20 psi | 6640 | 0 | Tide | Ross F11 | dead at start |
| vinyl | Si(EtO)4 with acetic acid pressurized at 20 psi | 6640 | 15 | Tide | Ross F11 | |
| cotton | Si(EtO)4 with acetic acid pressurized at 20 psi | 6640 | 0 | Tide | Ross F11 | dead at start |
| white fabric | Si(EtO)4 with acetic acid pressurized at 20 psi | 6640 | 0 | Tide | Ross F11 | dead at start |
| nylon (yellow) | SiCl4 | 8174 | | Tide with 5% | Ross F12 | |
| nylon (blue) | SiCl4 | 8174 | | Tide with 5% | Rosa F12 | |
| nylon (orange) | SiCl4 | 8174 | | Tide with 5% | Ross F12 | |
| army fabric | SiCl4 | 8174 | 4 | Tide with 5% | Ross F12 | |
| polyester | SiCl4 | 8174 | 3 | Tide with 5% | Ross F12 | |
| acetate | SiCl4 | 8174 | | Tide with 5% | Ross F12 | |
| velvet | SiCl4 | 8174 | 0 | Tide with 5% | Ross F12 | dead to start |
| vinyl | SiCl4 | 8174 | 4 | Tide with 5% | Ross F12 | |
| cotton | SiCl4 | 8174 | | Tide with 5% | Ross F12 | |
| white fabric | SiCl4 | 8174 | 1 | Tide with 5% | Ross F12 | |

The invention claimed is:

1. A method of preparing a hydrophobic coating on a substrate comprising:
   a) applying to said substrate a coating composition, comprising i) a binder, ii) first particles having a size of about 30 microns to about 225 microns, and iii) a solvent, to provide a base coating; and
   b) applying to said base coating a composition comprising second particles, wherein, prior to the application of the second particles to the base coating,
      i) the second particles have been modified with hexamethyldisilazane,
      ii) the second particles comprise covalently bound polydimethylsiloxane, or
      iii) the second particles comprise one or more covalently bound moieties independently selected from the group consisting of alkyl, haloalkyl, and perfluoroalkyl moieties, which one or more moieties are covalently bound to said second particles by reaction of particles with a silanizing agent of formula (I), said silanizing agent of formula (I) having the structure:

$$R_{4-n}Si-X_n \quad (I)$$

where n is an integer from 1 to 3;

each R is independently selected from
   (i) $C_{1\ to\ 20}$ alkyl optionally substituted with one or more fluorine atoms; or
   (ii) $-Z-((CF_2)_q(CF_3))_r$, wherein Z is a $C_{1-12}$ divalent alkane radical or a $C_{2-12}$ divalent alkene or alkyne radical, q is an integer from 1 to 12, and r is an integer from 1-4;
each X is independently selected from the group consisting of —H, —Cl, —I, —Br, —OH, —$OR^2$, $NHR^3$, and —$N(R^3)_2$;
each $R^2$ is an independently selected $C_{1\ to\ 4}$ alkyl or haloalkyl group; and
each $R^3$ is an independently selected H, $C_{1\ to\ 4}$ alkyl or haloalkyl group;
wherein the hydrophobic coating has a contact angle with water that is greater than about 120° at a temperature of 18° C. to 23° C.;
wherein the hydrophobic coating has a surface in contact with the substrate and an exposed surface comprising the binder that is not in contact with the substrate, the exposed surface having an arithmetical mean roughness from about 0.2 microns to about 20 microns, or a ten point mean roughness from about 1 micron to about 100 microns;
wherein, in the resulting hydrophobic coating, the first particles are primarily distributed within and coated with the binder and the second particles are primarily distributed on the exposed surface; and wherein the hydrophobic coating has a greater number of second particles on the exposed surface than on the surface in contact with the substrate.

2. The method of claim 1, wherein the binder comprises a polyurethane, lacquer, fluoropolymer, epoxy or thermoplastic powder coating.

3. The method of claim 2, wherein the binder comprises a polyurethane.

4. The method of claim 2, wherein the binder comprises a lacquer.

5. The method of claim 2, wherein the binder comprises a fluoropolymer or an epoxy.

6. The method of claim 1, wherein said first particles comprise a material selected from the group consisting of: cellulose, glass, metal oxides, metalloid oxides, plastics, carbides, nitrides, borides, spinels, diamond, fibers, and thermoplastic.

7. The method of claim 1, wherein said second particles comprise: a metal oxide, an oxide of a metalloid, a silicate, or a glass.

8. The method of claim 1, wherein said second particles comprise one or more alkyl, fluoroalkyl or perfluoroalkyl moieties that are covalently bound to the second particles directly or indirectly through one or more atoms bound to the second particles.

9. The method of claim 1, wherein, prior to the application of the second particles to the base coating, said second particles have been modified with an agent selected from the group consisting of: (tridecafluoro-1,1,2,2-tetrahydrooctyl) silane; (tridecafluoro-1,1,2,2-tetrahydrooctyl) trichlorosilane; (tridecafluoro-1,1,2,2-tetrahydrooctyl)triethoxysilane; (tridecafluoro-1,1,2,2-tetrahydrooctyl)trimethoxysilane; (heptadecafluoro-1,1,2,2-tetrahydrodecyl)dimethyl(dimethylamino)silane; (heptadecafluoro-1,1,2,2-tetrahydrodecyl)tris(dimethylamino)silane; n-octadecyltrimethoxysilane; n-octyltriethoxysilane; nonafluorohexyldimethyl(dimethylamino)silane; and polydimethylsiloxane; and wherein, following the modification, the second particles comprise at least one moiety selected from the group consisting of alkyl, haloalkyl, and perfluoroalkyl.

10. The method of claim 1, wherein the hydrophobic coating has an arithmetical mean roughness from about 0.2 microns to about 20 microns.

11. The method of claim 1, wherein said hydrophobic coating retains its hydrophobicity when subject to at least 200 abrasion cycles, as measured with a Taber Abrasion tester model 503 using CS-10 wheels and 250 g loads, wherein a surface is no longer considered to retain its hydrophobicity when more than half of the water droplets placed on the abraded surface are retained on the abraded surface when the abraded surface is inclined at an angle of 6°.

12. The method of claim 1, wherein said hydrophobic coating retains its hydrophobicity when subject to at least 100 abrasion cycles, as measured with a Taber Abrasion tester model 503 using CS-10 wheels and 250 g loads, wherein a surface is no longer considered to retain its hydrophobicity when more than half of the water droplets placed on the abraded surface are retained on the abraded surface when the abraded surface is inclined at an angle of 6°.

13. The method of claim 1, wherein the composition at step (b) further comprises a solvent.

14. The method of claim 1, wherein the second particles comprise silica or alumina.

15. The method of claim 1, wherein the hydrophobic coating has a contact angle with water that is greater than about 130° at a temperature of 18° C. to 23° C.

16. The method of claim 1, wherein said second particles that comprise one or more covalently bound moieties independently selected from the group consisting of alkyl, haloalkyl, and perfluoroalkyl moieties are second particles that have been modified with a silanizing agent of formula (I):

$$R_{4-n}Si-X_n \qquad (I)$$

where n is an integer from 1 to 3;

each R is an independently selected $-Z-((CF_2)_q(CF_3))_r$ group, wherein Z is a $C_{1-12}$ divalent alkane, q is an integer from 1 to 12, and r is an integer from 1-4;

each X is independently selected from the group consisting of $-H$, $-Cl$, $-I$, $-Br$, $-OH$, $-OR^2$, $-NHR^3$, and $-N(R^3)_2$;

each $R^2$ is an independently selected $C_{1\ to\ 4}$ alkyl or haloalkyl group; and each $R^3$ is an independently selected H, $C_{1\ to\ 4}$ alkyl or haloalkyl group.

17. The method of claim 1, wherein said second particles have a size of about 1 nanometer to 25 microns.

18. The method of claim 1, wherein the binder comprises an acrylic lacquer.

* * * * *